(12) United States Patent
Lerner et al.

(10) Patent No.: US 12,425,695 B2
(45) Date of Patent: Sep. 23, 2025

(54) METHODS AND USER INTERFACES FOR AUDITORY FEATURES

(71) Applicant: Apple Inc., Cupertino, CA (US)

(72) Inventors: Mitchell R. Lerner, San Francisco, CA (US); Elizabeth C. Cranfill, San Francisco, CA (US); Charles C. Hoyt, Pacifica, CA (US); Jeffrey D. Tanner, Walnut Creek, CA (US); Ian M. Fisch, Santa Cruz, CA (US); Jakub Mazur, Daly City, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 17/504,174

(22) Filed: Oct. 18, 2021

(65) Prior Publication Data

US 2022/0377431 A1    Nov. 24, 2022

Related U.S. Application Data

(60) Provisional application No. 63/197,452, filed on Jun. 6, 2021, provisional application No. 63/190,765, filed on May 19, 2021.

(51) Int. Cl.
*G06F 17/00* (2019.01)
*G06F 3/16* (2006.01)
(Continued)

(52) U.S. Cl.
CPC ......... *H04N 21/4852* (2013.01); *G06F 3/165* (2013.01); *H04N 21/4394* (2013.01)

(58) Field of Classification Search
CPC . H04N 21/4852; H04N 21/4394; G06F 3/165
(Continued)

(56) References Cited

U.S. PATENT DOCUMENTS 5,692,058 A  *  11/1997  Eggers ............... H03G 3/04
                                                  455/185.1
5,856,824 A      1/1999  Shieh
(Continued)

FOREIGN PATENT DOCUMENTS

CN      104956276 A      9/2015
CN      105374192 A      3/2016
(Continued)

OTHER PUBLICATIONS

Avid Protools 7 user manual; copyright 2005 (Year: 2005).*
(Continued)

*Primary Examiner* — Paul C Mccord
(74) *Attorney, Agent, or Firm* — DLA Piper LLP (US)

(57) ABSTRACT

The present disclosure generally relates to providing auditory features. An example method includes, at a computer system in communication with one or more input devices: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

36 Claims, 40 Drawing Sheets

(51) Int. Cl.
*H04N 21/439* (2011.01)
*H04N 21/485* (2011.01)

(58) Field of Classification Search
USPC .......................................................... 700/94
See application file for complete search history.

(56) References Cited

U.S. PATENT DOCUMENTS

| | | | |
|---|---|---|---|
| 6,140,987 A | 10/2000 | Stein et al. | |
| 6,232,957 B1 | 5/2001 | Hinckley | |
| 6,850,150 B1 | 2/2005 | Ronkainen | |
| 6,888,536 B2 | 5/2005 | Westerman et al. | |
| 7,318,198 B2 | 1/2008 | Sakayori et al. | |
| 7,730,223 B1 | 6/2010 | Bavor et al. | |
| 7,907,125 B2 | 3/2011 | Weiss et al. | |
| 8,234,395 B2 | 7/2012 | Millington | |
| 8,326,444 B1* | 12/2012 | Classen | G11B 27/105 381/106 |
| 9,582,178 B2 | 2/2017 | Grant et al. | |
| 9,680,982 B2 | 6/2017 | Fiedler | |
| 10,055,094 B2 | 8/2018 | Li et al. | |
| 10,142,122 B1 | 11/2018 | Hill et al. | |
| 10,237,141 B2 | 3/2019 | Sasaki et al. | |
| 10,284,980 B1 | 5/2019 | Woo et al. | |
| 10,303,422 B1 | 5/2019 | Woo et al. | |
| 10,310,725 B2 | 6/2019 | Smith et al. | |
| 10,436,977 B2 | 10/2019 | Bergman et al. | |
| 10,454,781 B2 | 10/2019 | Sasaki et al. | |
| 10,511,456 B2 | 12/2019 | Smith et al. | |
| 10,779,085 B1 | 9/2020 | Carrigan | |
| 2002/0152255 A1 | 10/2002 | Smith et al. | |
| 2004/0141009 A1 | 7/2004 | Hinckley et al. | |
| 2004/0143430 A1 | 7/2004 | Said et al. | |
| 2004/0218451 A1 | 11/2004 | Said et al. | |
| 2006/0026536 A1 | 2/2006 | Hotelling et al. | |
| 2006/0097991 A1 | 5/2006 | Hotelling et al. | |
| 2006/0161870 A1 | 7/2006 | Hotelling et al. | |
| 2006/0161871 A1 | 7/2006 | Hotelling et al. | |
| 2006/0189278 A1 | 8/2006 | Scott et al. | |
| 2007/0189544 A1* | 8/2007 | Rosenberg | H03G 3/32 381/104 |
| 2009/0007026 A1 | 1/2009 | Scott et al. | |
| 2009/0085878 A1 | 4/2009 | Heubel et al. | |
| 2009/0153289 A1 | 6/2009 | Hope et al. | |
| 2009/0166098 A1 | 7/2009 | Sunder et al. | |
| 2009/0231271 A1 | 9/2009 | Heubel et al. | |
| 2009/0306798 A1* | 12/2009 | Moeller | H04K 3/825 700/94 |
| 2010/0106981 A1* | 4/2010 | Sim | G06F 1/266 713/300 |
| 2010/0318917 A1 | 12/2010 | Holladay et al. | |
| 2011/0071656 A1 | 3/2011 | Mckiel, Jr. | |
| 2012/0066632 A1 | 3/2012 | Sundermeyer et al. | |
| 2012/0269361 A1 | 10/2012 | Bhow et al. | |
| 2013/0022218 A1 | 1/2013 | Miyazawa et al. | |
| 2013/0113822 A1 | 5/2013 | Putrevu et al. | |
| 2013/0141378 A1 | 6/2013 | Yumiki et al. | |
| 2013/0283161 A1 | 10/2013 | Reimann et al. | |
| 2014/0236325 A1 | 8/2014 | Sasaki et al. | |
| 2014/0288686 A1* | 9/2014 | Sant | G11B 27/038 700/94 |
| 2014/0363024 A1 | 12/2014 | Apodaca | |
| 2014/0380234 A1 | 12/2014 | Shim et al. | |
| 2015/0081072 A1 | 3/2015 | Kallai et al. | |
| 2015/0212705 A1 | 7/2015 | Sasaki et al. | |
| 2015/0256957 A1 | 9/2015 | Kim et al. | |
| 2015/0280669 A1* | 10/2015 | Vilermo | G10K 11/17885 381/107 |
| 2015/0319046 A1 | 11/2015 | Plummer et al. | |
| 2016/0004499 A1 | 1/2016 | Kim et al. | |
| 2016/0043962 A1 | 2/2016 | Kim et al. | |
| 2016/0070244 A1 | 3/2016 | Cipollo et al. | |
| 2016/0073197 A1 | 3/2016 | Hammer et al. | |
| 2016/0073482 A1 | 3/2016 | Fok et al. | |
| 2016/0092072 A1 | 3/2016 | So et al. | |
| 2016/0119734 A1* | 4/2016 | Sladeczek | H04S 7/301 381/26 |
| 2016/0139752 A1 | 5/2016 | Shim et al. | |
| 2016/0173318 A1 | 6/2016 | Ha et al. | |
| 2016/0253145 A1 | 9/2016 | Lee et al. | |
| 2016/0320849 A1 | 11/2016 | Koo | |
| 2016/0366481 A1 | 12/2016 | Lim et al. | |
| 2017/0017531 A1 | 1/2017 | Choi et al. | |
| 2017/0046025 A1 | 2/2017 | Dascola et al. | |
| 2017/0206779 A1 | 7/2017 | Lee et al. | |
| 2017/0251314 A1 | 8/2017 | Pye et al. | |
| 2017/0285788 A1 | 10/2017 | Park et al. | |
| 2017/0357390 A1* | 12/2017 | Alonso Ruiz | G06F 3/04886 |
| 2017/0357425 A1 | 12/2017 | Smith et al. | |
| 2017/0357434 A1 | 12/2017 | Coffman et al. | |
| 2017/0358320 A1* | 12/2017 | Cameron | G06F 3/0483 |
| 2017/0359189 A1 | 12/2017 | Smith et al. | |
| 2018/0204432 A1 | 7/2018 | Phillips | |
| 2019/0005959 A1* | 1/2019 | Cameron | G10L 21/055 |
| 2019/0056907 A1 | 2/2019 | So et al. | |
| 2020/0314496 A1 | 10/2020 | Wittke | |
| 2020/0382332 A1 | 12/2020 | Carrigan et al. | |
| 2020/0413197 A1 | 12/2020 | Carrigan et al. | |
| 2022/0374194 A1* | 11/2022 | Casarini | G06F 3/165 |
| 2023/0208921 A1* | 6/2023 | Dickins | H04L 67/141 381/95 |
| 2023/0394955 A1 | 12/2023 | Giuliani | |
| 2023/0403509 A1 | 12/2023 | Carrigan et al. | |
| 2024/0031759 A1* | 1/2024 | Watanabe | H04S 7/304 |
| 2024/0406632 A1 | 12/2024 | Carrigan et al. | |

FOREIGN PATENT DOCUMENTS

| | | |
|---|---|---|
| CN | 105474580 A | 4/2016 |
| CN | 105900376 A | 8/2016 |
| CN | 107533368 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| EP | 3038427 A1 | 6/2016 |
| EP | 3255536 A1 | 12/2017 |
| EP | 3445058 A1 | 2/2019 |
| EP | 3038427 B1 | 12/2019 |
| JP | 2004-96397 A | 3/2004 |
| JP | 2013-200879 A | 10/2013 |
| JP | 2016-63531 A | 4/2016 |
| JP | 2017-41008 A | 2/2017 |
| JP | 2017-212096 A | 11/2017 |
| KR | 10-2014-0148289 A | 12/2014 |
| KR | 10-2017-0008601 A | 1/2017 |
| KR | 10-2017-0100358 A | 9/2017 |
| KR | 10-2018-0034637 A | 4/2018 |
| KR | 10-2019-0002658 A | 1/2019 |
| KR | 10-2019-0014495 A | 2/2019 |
| KR | 10-2019-0057414 A | 5/2019 |
| WO | 2011/027964 A1 | 3/2011 |
| WO | 2014/128800 A1 | 8/2014 |
| WO | 2015/008409 A1 | 1/2015 |
| WO | 2015/114690 A1 | 8/2015 |
| WO | 2017/027526 A1 | 2/2017 |
| WO | 2017/058293 A1 | 4/2017 |
| WO | 2017/147081 A1 | 8/2017 |
| WO | 2017/218143 A1 | 12/2017 |
| WO | 2017/218192 A1 | 12/2017 |
| WO | 2018/144339 A2 | 8/2018 |
| WO | 2018/213401 A1 | 11/2018 |
| WO | 2021/231412 A1 | 11/2021 |

OTHER PUBLICATIONS

Yamaha DME designer 3.8 user manual; copyright 2004-2010 (Year: 2010).*

(56) References Cited

OTHER PUBLICATIONS

Sony Oxford user manual; copyright 1997 (Year: 1997).*
Protools 7 User Manual (Year: 2005).*
AKAI MPC 5000 manual; available for sale at least 2008-2012 (Year: 2008).*
Notice of Allowance received for U.S. Appl. No. 17/019,845, mailed on Jun. 5, 2023, 10 pages.
Notice of Acceptance received for Australian Patent Application No. 2021261941, mailed on Mar. 15, 2023, 3 pages.
Notice of Allowance received for Japanese Patent Application No. 2022-014389, mailed on Jan. 27, 2023, 4 pages (1 page of English Translation and 3 pages of Official Copy).
Office Action received for European Patent Application No. 20719301.2, mailed on Jan. 24, 2023, 9 pages.
Office Action received for Australian Patent Application No. 2021261941, mailed on Nov. 3, 2022, 3 pages.
Office Action received for Chinese Patent Application No. 202110235995.X, mailed on Sep. 30, 2022, 13 pages (7 pages of English Translation and 6 pages of Official Copy).
Brewster et al., "Multimodal 'Eyes-Free' Interaction Techniques Wearable Devices", CHI 2003, Interaction techniques for Constrained Displays, Apr. 5-10, 2003, pp. 473-480.
Brewster et al., "Tactons: Structured Tactile Messages for Non-Visual Information Display", 5th Australasian User Interface Conference, 2004, pp. 15-23.
Brewster et al., "Using Non-Speech Sounds in Mobile Computing Devices", First Workshop on Human-Computer Interaction with Mobile Devices, 1998, pp. 1-3.
Brown et al., "Multidimensional Tactons for Non-Visual Information Presentation in Mobile Devices", MobileHCI'06, Proceedings of the 8th conference on Human-computer interaction with mobile devices and services, Sep. 12-15, 2006, pp. 231-238.
Final Office Action received for U.S. Appl. No. 12/006,172, mailed on Mar. 2, 2012, 16 pages.
Helal et al., "Drishti: An Integrated Navigation System for Visually Impaired and Disabled", Fifth International Symposium on Wearable Computers (ISWC'01), IEEE, 2001, pp. 149-156.
International Preliminary Report on Patentability received for PCT Patent Application No. PCT/US2020/024390, mailed on Dec. 9, 2021, 20 pages.
Invitation to Pay Additional Fees and Partial International Search Report received for PCT Patent Application No. PCT/US2022/030110, mailed on Sep. 28, 2022, 16 pages.
Non-Final Office Action received for U.S. Appl. No. 12/006,172, mailed on Jun. 22, 2011, 23 pages.
Notice of Acceptance received for Australian Patent Application No. 2021201403, mailed on Oct. 22, 2021, 3 pages.
Notice of Allowance received for Chinese Patent Application No. 202011450203.2, mailed on Sep. 30, 2022, 4 pages (1 page of English Translation and 3 pages of Official Copy).
Notice of Allowance received for Japanese Patent Application No. 2021-026630, mailed on Jan. 7, 2022, 4 pages (1 page of English Translation and 3 pages of Official Copy).
Notice of Allowance received for Korean Patent Application No. 10-2021-7021047, mailed on Dec. 6, 2021, 3 pages (1 page of English Translation and 2 pages of Official Copy).
Office Action received for Chinese Patent Application No. 202011450203.2, mailed on Apr. 20, 2022, 9 pages (5 pages of English Translation and 4 pages of Official Copy).
Office Action received for Chinese Patent Application No. 202110235995.X, mailed on Mar. 22, 2022, 17 pages (9 pages of English Translation and 8 pages of Official Copy).
Office Action received for European Patent Application No. 20719301.2, mailed on Feb. 21, 2022, 9 pages.
Office Action received for European Patent Application No. 21160991.2, mailed on Mar. 24, 2022, 11 pages.
Pirhonen et al., "Gestural and Audio Metaphors as a Means of Control for Mobile Devices", CHI 2002, Minneapolis, Minnesota, Apr. 20-25, 2002.
Summons to Attend Oral Proceedings received for European Patent Application No. 21160991.2, mailed on Oct. 19, 2022, 10 pages.
Williamson et al., "Shoogle: Excitatory Multimodal Interaction on Mobile Devices", CHI 2007, San Jose, California, Apr. 28-May 3, 2007, pp. 121-124.
Xiaoyu et al., "Mobile Browsable Information Access for the Visually Impaired", AMCIS 2004 Proceedings. Paper 424, Dec. 31, 2004.
Zhao et al., "earPod: Eyes-free Menu Selection using Touch Input and Reactive Audio Feedback", CHI 2007 Proceedings of Alternative Interaction, Apr. 28-May 3, 2007, 10 pages.
International Search Report and Written Opinion received for PCT Patent Application No. PCT/US2022/030110 mailed on Nov. 18, 2022, 22 pages.
Office Action received for Korean Patent Application No. 10-2022-7001521, mailed on Dec. 26, 2022, 13 pages (6 pages of English Translation and 7 pages of Official Copy).
Applicant-Initiated Interview Summary received for U.S. Appl. No. 16/584,743, mailed on May 1, 2020, 5 pages.
Applicant-Initiated Interview Summary received for U.S. Appl. No. 16/586,002, mailed on Apr. 28, 2020, 5 pages.
Corrected Notice of Allowance received for U.S. Appl. No. 16/584,743, mailed on Dec. 30, 2020, 3 pages.
Extended European Search Report received for European Patent Application No. 21160991.2, mailed on Jul. 16, 2021, 14 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.
Invitation to Pay Additional Fees received for PCT Patent Application No. PCT/US2020/024390, mailed on Jun. 26, 2020, 15 pages.
Invitation to Pay Search Fees received for European Patent Application No. 20719301.2, mailed on Dec. 17, 2020, 5 pages.
Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Notice of Acceptance received for Australian Patent Application No. 2020257092, mailed on Aug. 27, 2021, 3 pages.
Notice of Allowance received for Japanese Patent Application No. 2020-558885, mailed on Jul. 26, 2021, 4 pages (1 page of English Translation and 3 pages of Official Copy).
Notice of Allowance received for Korean Patent Application No. 10-2020-7031319, mailed on Apr. 6, 2021, 5 pages (2 pages of English Translation and 3 pages of Official Copy).
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2021201403, mailed on Mar. 16, 2021, 3 pages.
Office Action received for Chinese Patent Application No. 202011450203.2, mailed on Sep. 1, 2021, 12 pages (6 pages of English Translation and 6 pages of Official Copy).
Office Action received for European Patent Application No. 20719301.2, mailed on Jan. 28, 2021, 15 pages.
Office Action received for Japanese Patent Application No. 2021-026630, mailed on Aug. 20, 2021, 7 pages (3 pages of English Translation and 4 pages of Official Copy).
Office Action received for Korean Patent Application No. 10-2020-7031319, mailed on Dec. 8, 2020, 14 pages (6 pages of English Translation and 8 pages of Official Copy).

(56) References Cited

OTHER PUBLICATIONS

Office Action received for Korean Patent Application No. 10-2021-7021047, mailed on Aug. 13, 2021, 5 pages (2 pages of English Translation and 3 pages of Official Copy).
Supplemental Notice of Allowance received for U.S. Appl. No. 16/584,743, mailed on Nov. 25, 2020, 2 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Office Action received for Korean Patent Application No. 10-2022-7001521, mailed on Jun. 21, 2023, 10 pages (5 page of English Translation and 5 pages of Official Copy).
Corrected Notice of Allowance received for U.S. Appl. No. 17/019,845, mailed on Aug. 7, 2023, 4 pages.
Office Action received for European Patent Application No. 20719301.2, mailed on Oct. 20, 2023, 11 pages.
Notice of Allowance received for Korean Patent Application No. 10-2022-7001521, mailed on Mar. 22, 2024, 7 pages (2 pages of English Translation and 5 pages of Official Copy).
International Preliminary Report on Patentability received for PCT Patent Application No. PCT/US2022/030110 mailed on Nov. 30, 2023, 17 pages.
International Search Report and Written Opinion received for PCT Patent Application No. PCT/US2023/024335, mailed on Sep. 21, 2023, 15 pages.
Office Action received for Australian Patent Application No. 2023203357, mailed on Feb. 14, 2024, 3 pages.
Office Action received for Japanese Patent Application No. 2023-022576, mailed on Feb. 26, 2024, 10 pages (5 pages of English Translation and 5 pages of Official Copy).
Office Action received for Korean Patent Application No. 10-2022-7001521, mailed on Dec. 19, 2023, 7 pages (3 pages of English Translation and 4 pages of Official Copy).
Notice of Acceptance received for Australian Patent Application No. 2023203357, mailed on May 16, 2024, 3 pages.
Corrected Notice of Allowance received for U.S. Appl. No. 18/235,291, mailed on Jul. 18, 2024, 3 pages.
Intention to Grant received for European Patent Application No. 20719301.2, mailed on Jul. 2, 2024, 9 pages.
Notice of Allowance received for U.S. Appl. No. 18/235,291, mailed on Jul. 3, 2024, 18 pages.
Corrected Notice of Allowance received for U.S. Appl. No. 18/235,291, mailed on Aug. 7, 2024, 2 pages.
Decision to Refuse received for Japanese Patent Application No. 2023-022576, mailed on Jul. 26, 2024, 6 pages (3 pages of English Translation and 3 pages of Official Copy).
Decision to Grant received for European Patent Application No. 20719301.2, mailed on Nov. 7, 2024, 3 pages.
International Preliminary Report on Patentability received for PCT Patent Application No. PCT/US2023/024335, mailed on Dec. 12, 2024, 12 pages.
Notice of Allowance received for Japanese Patent Application No. 2023-022576, mailed on Dec. 24, 2024, 4 pages (1 page of English Translation and 3 pages of Official Copy).
Extended European Search Report received for European Patent Application No. 24208135.4, mailed on Jan. 21, 2025, 13 pages.

\* cited by examiner

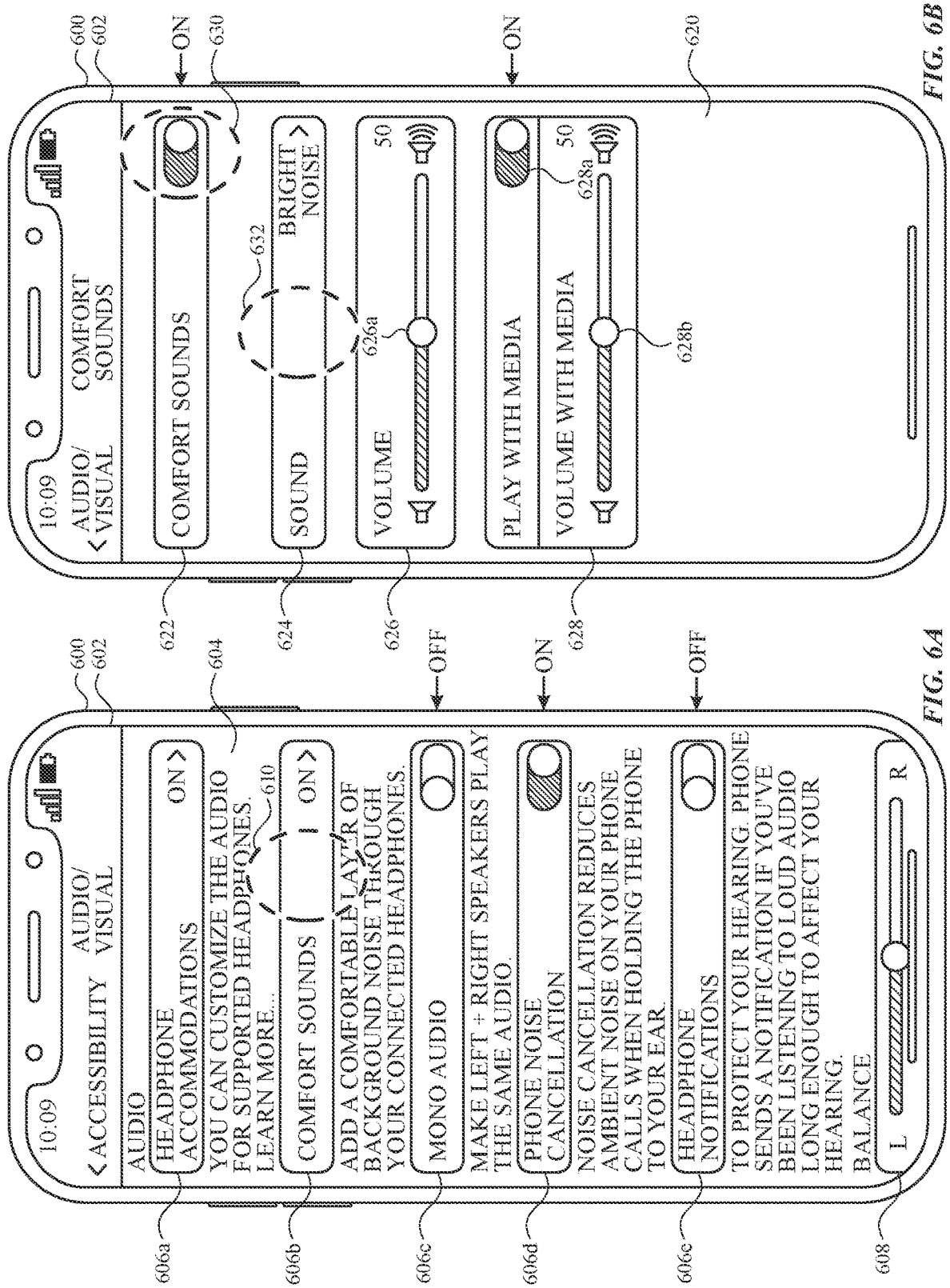

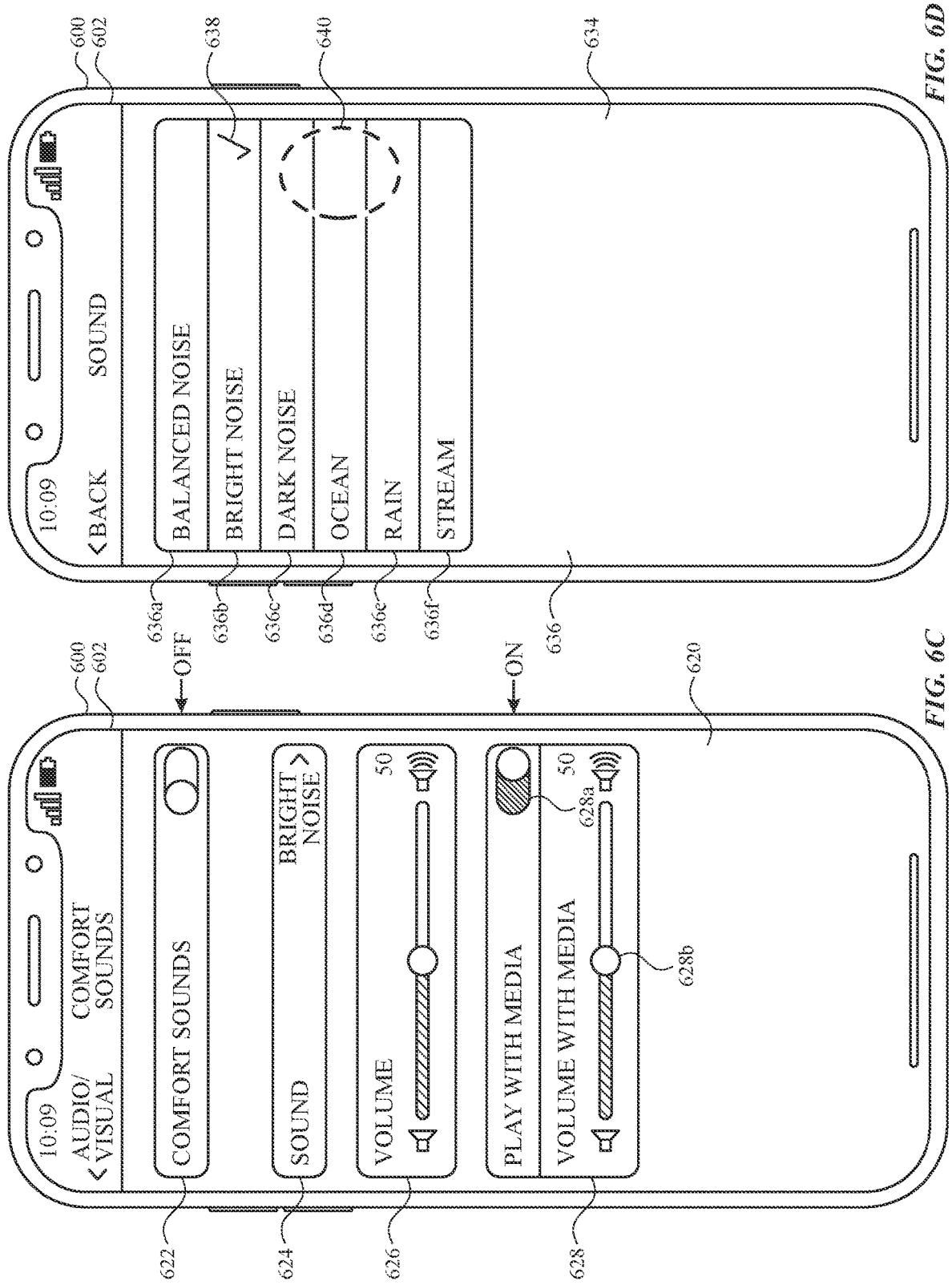

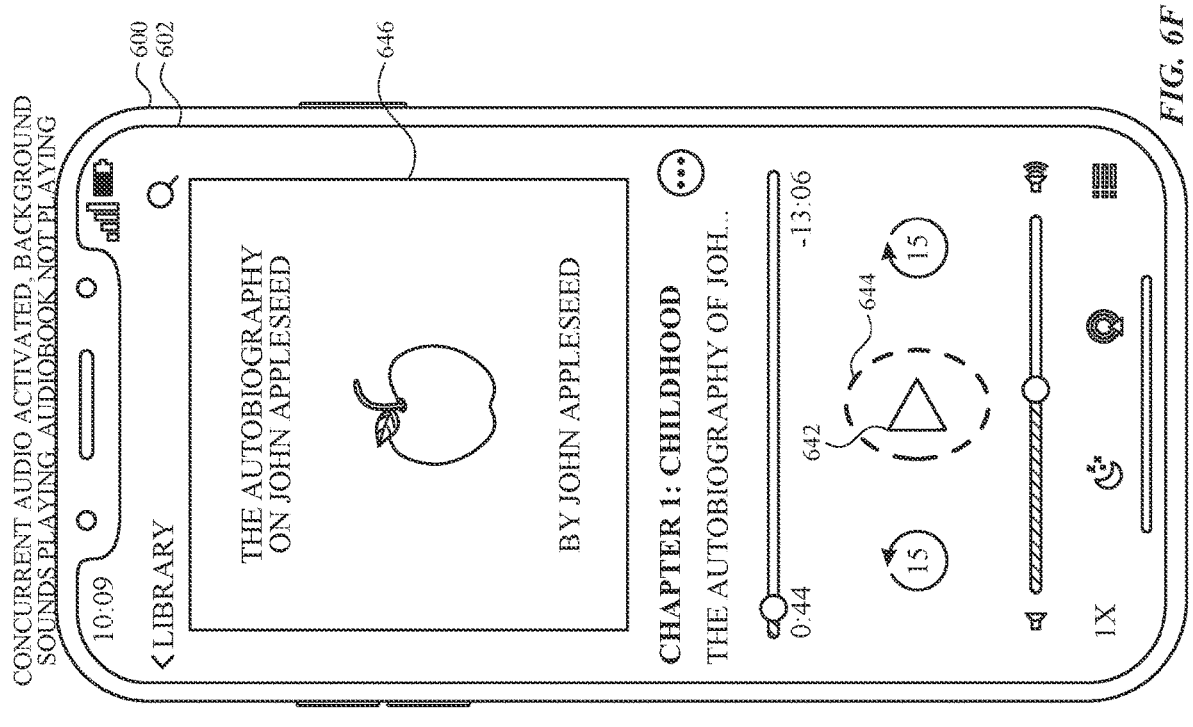
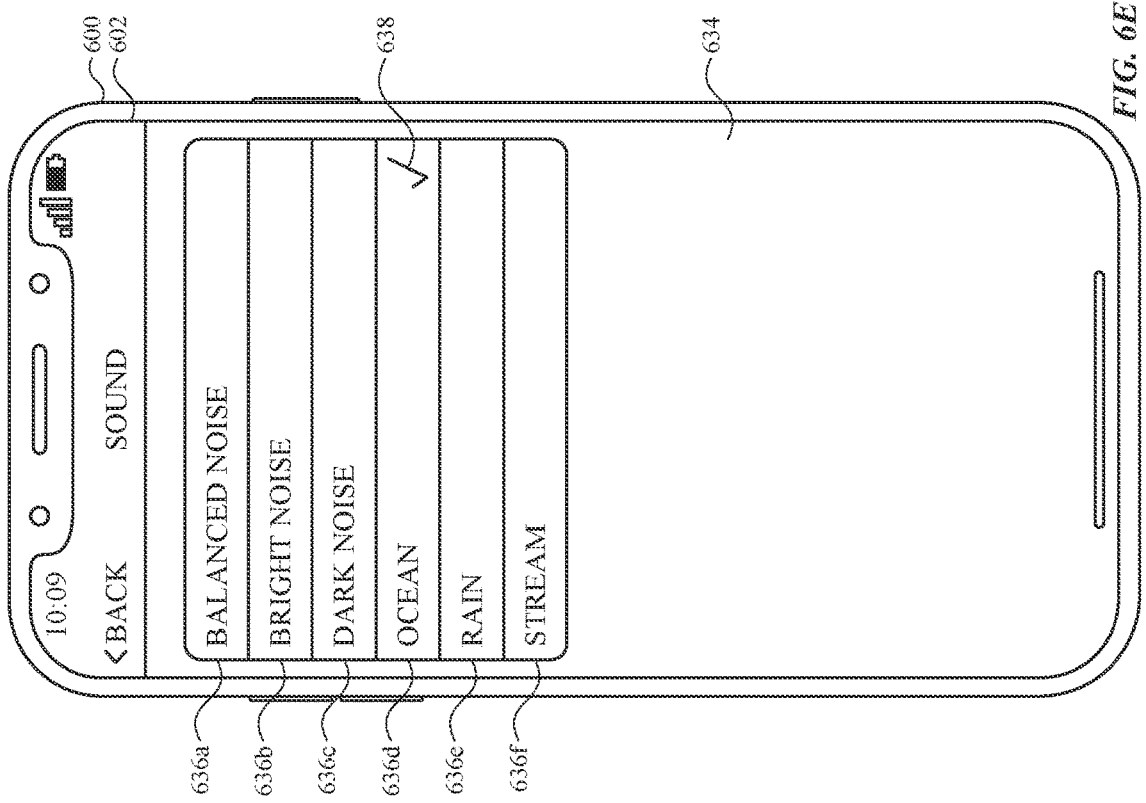
FIG. 6F
FIG. 6E

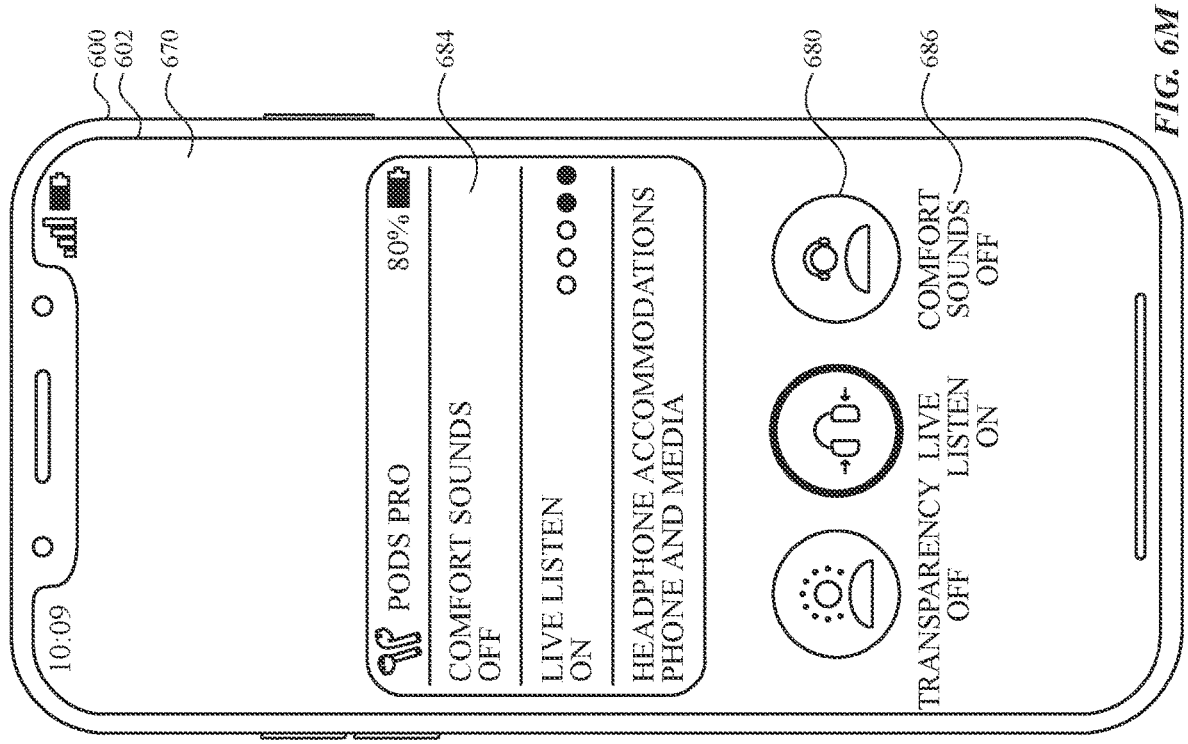

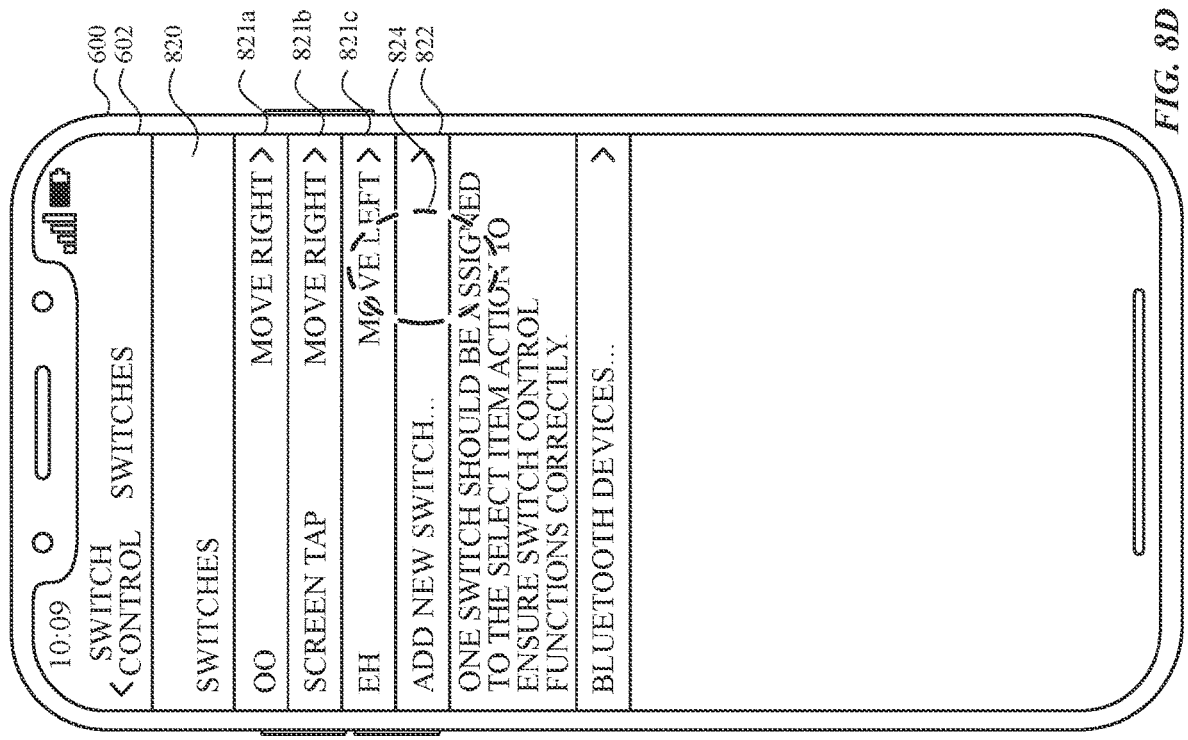
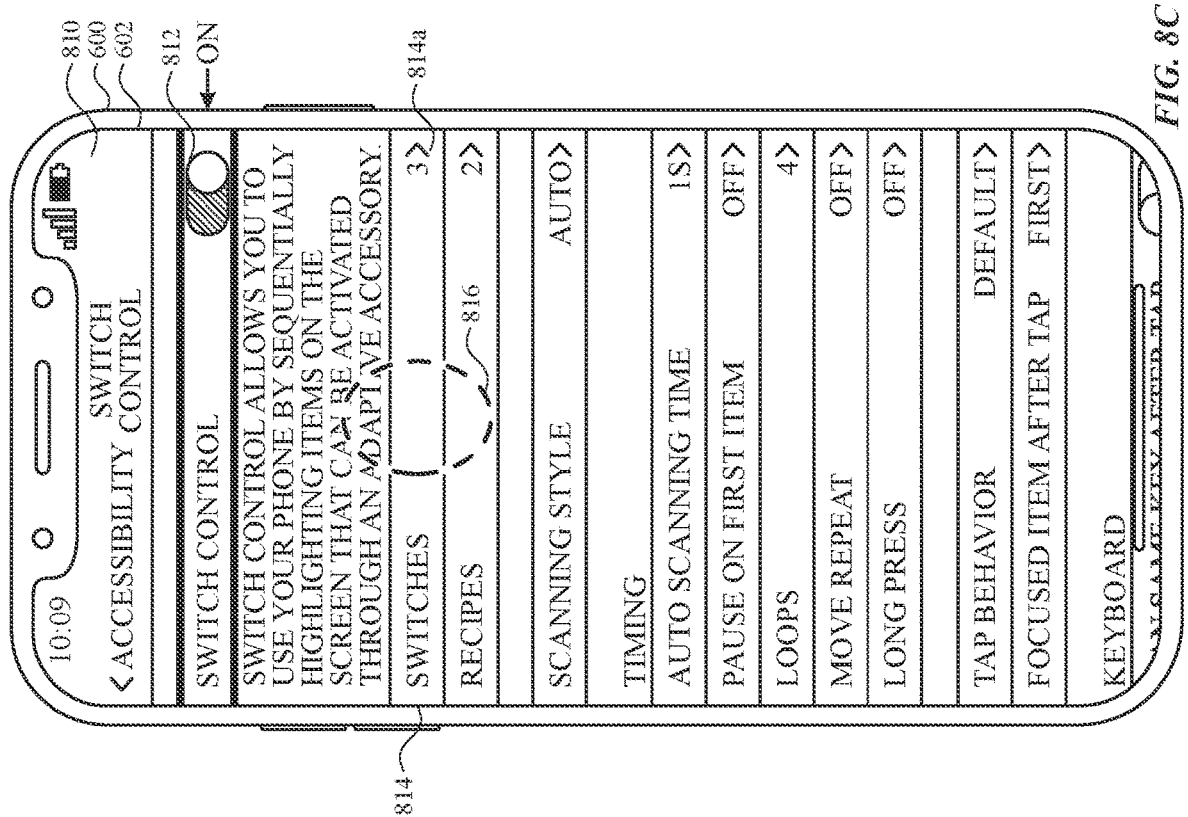
FIG. 8C
FIG. 8D

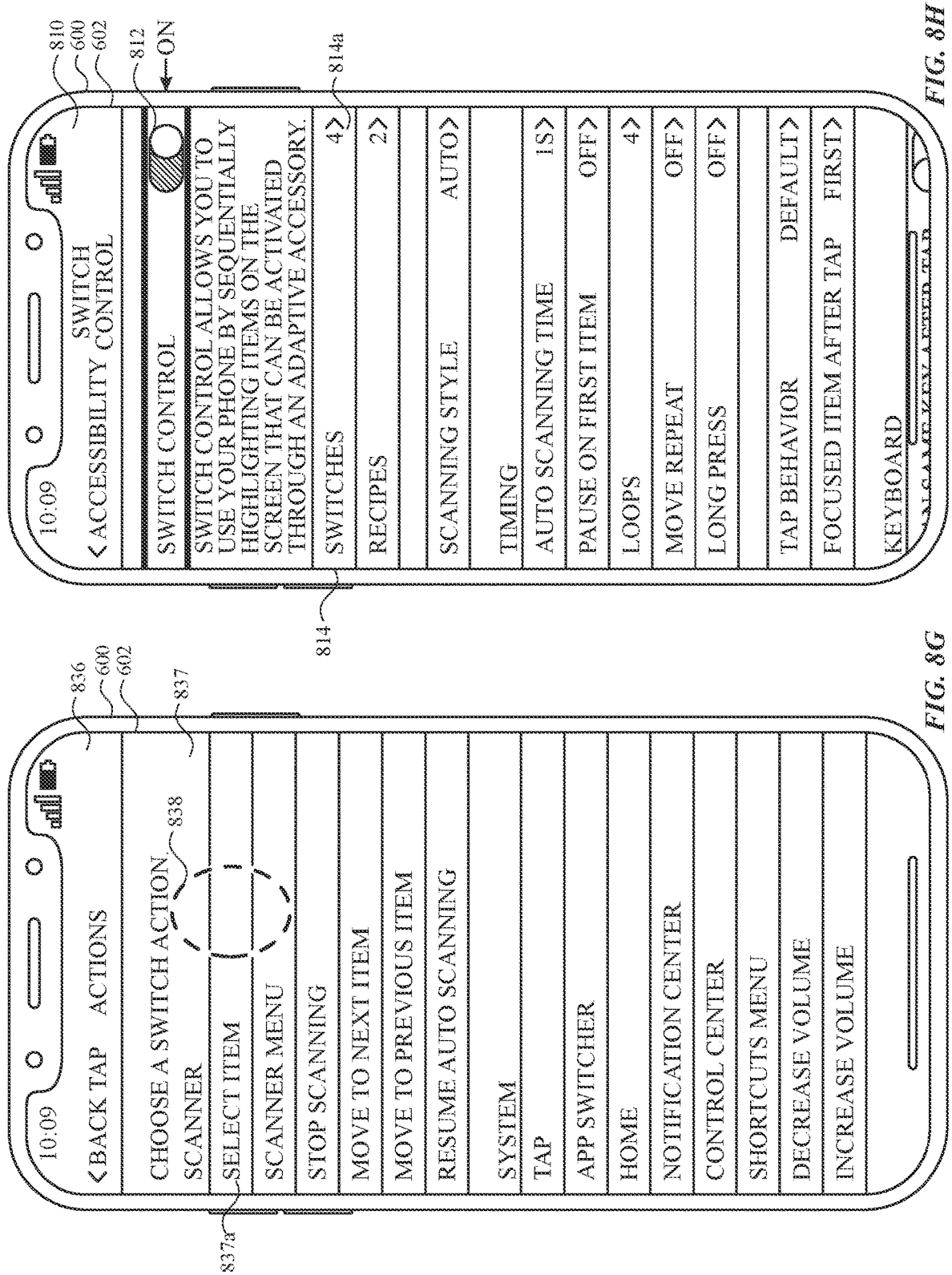

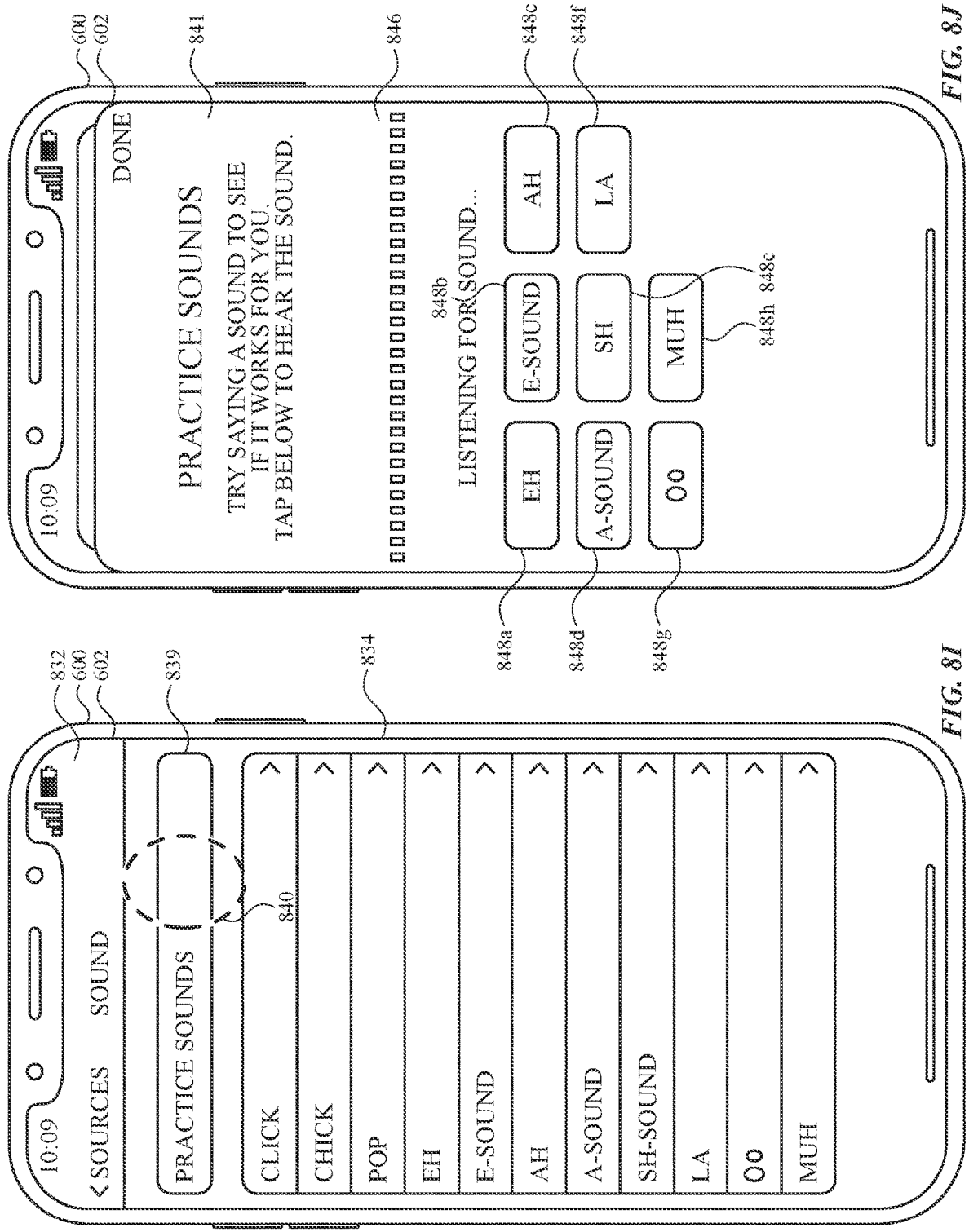

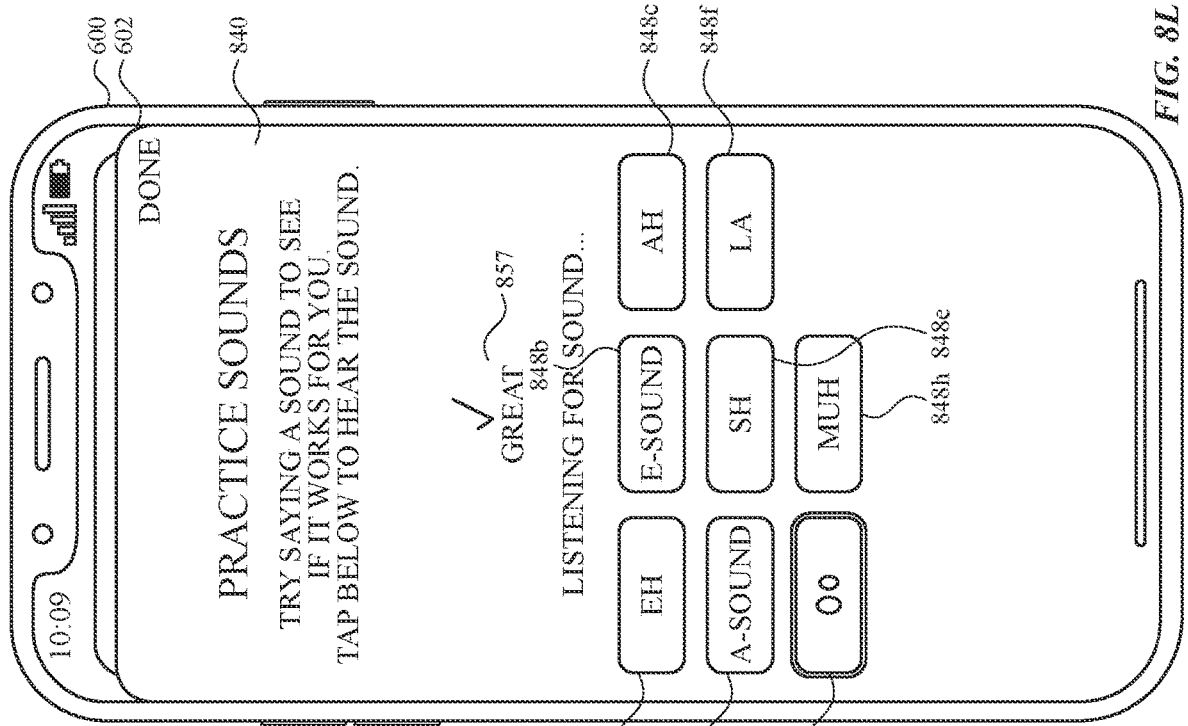
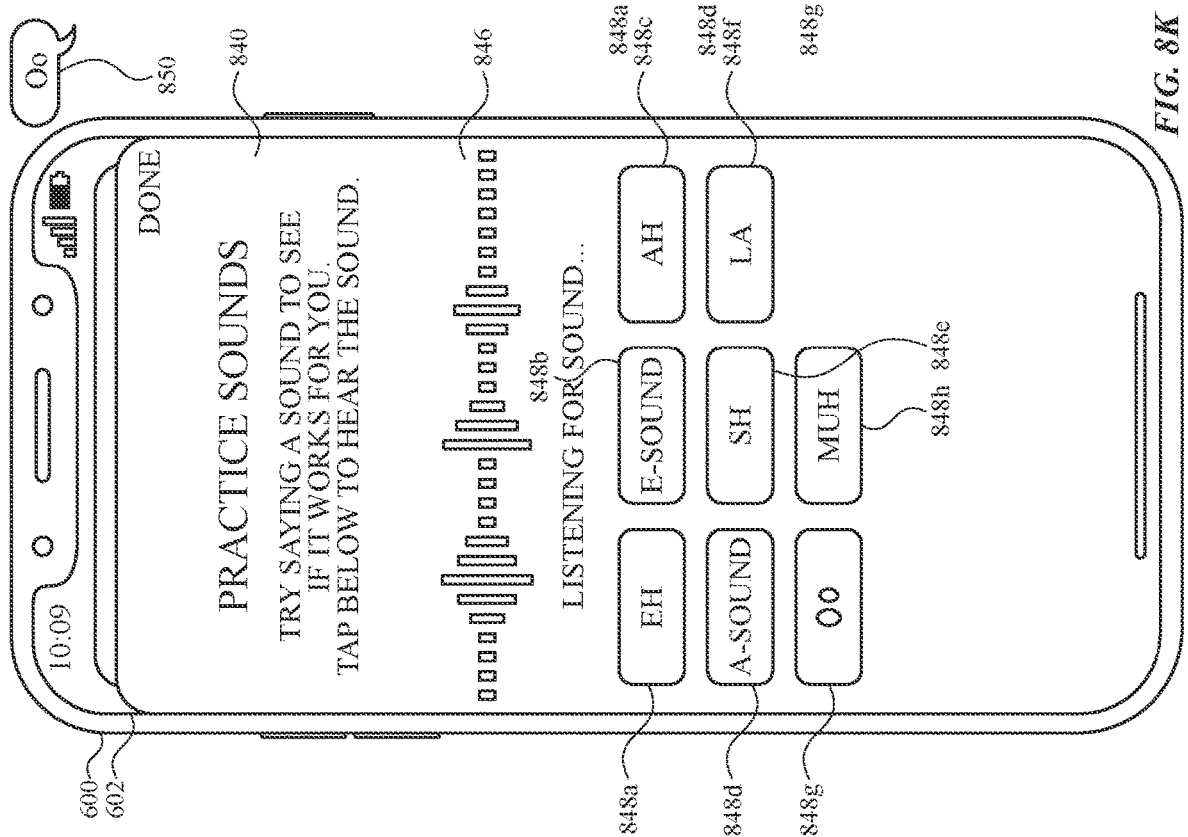

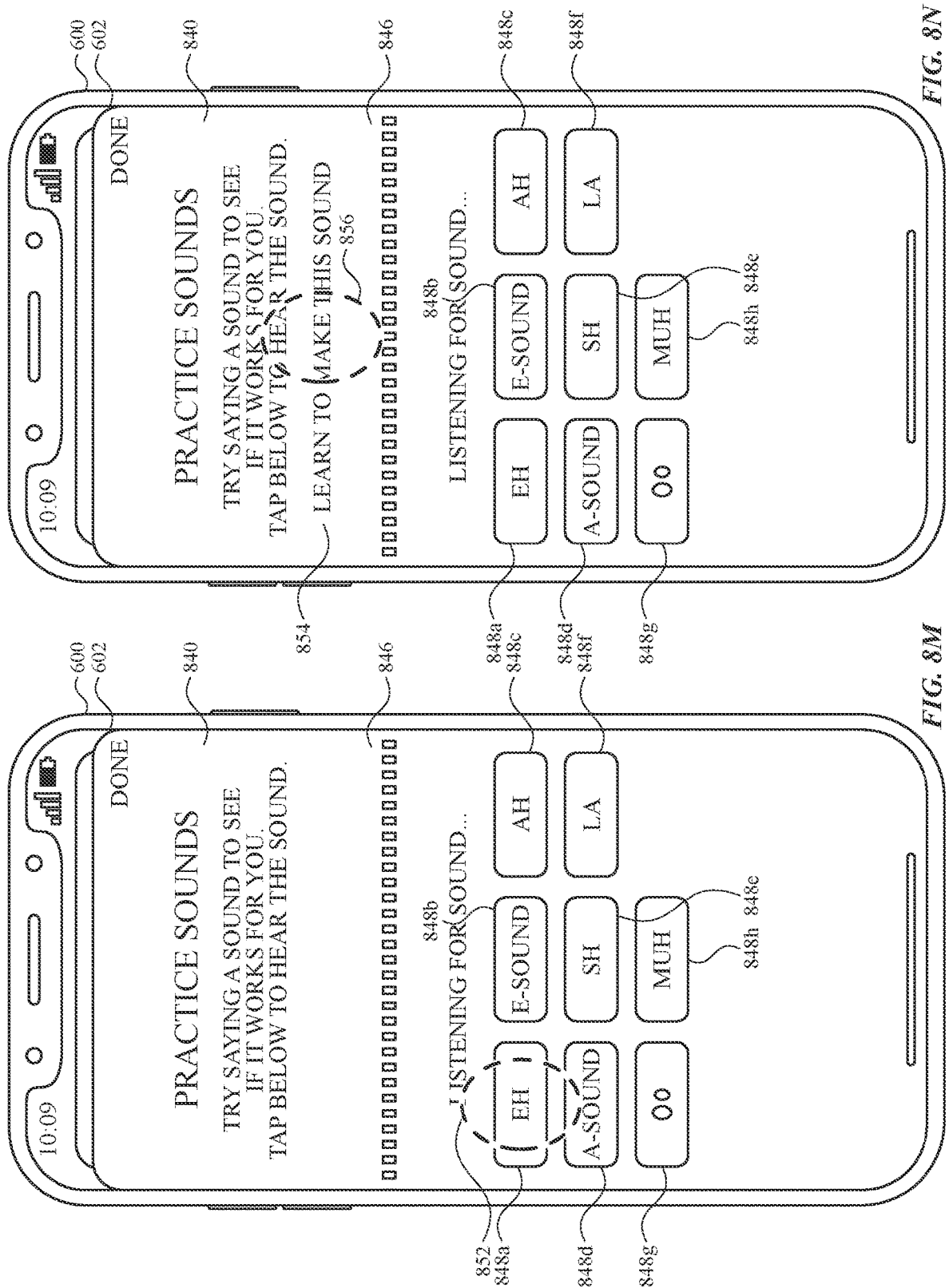

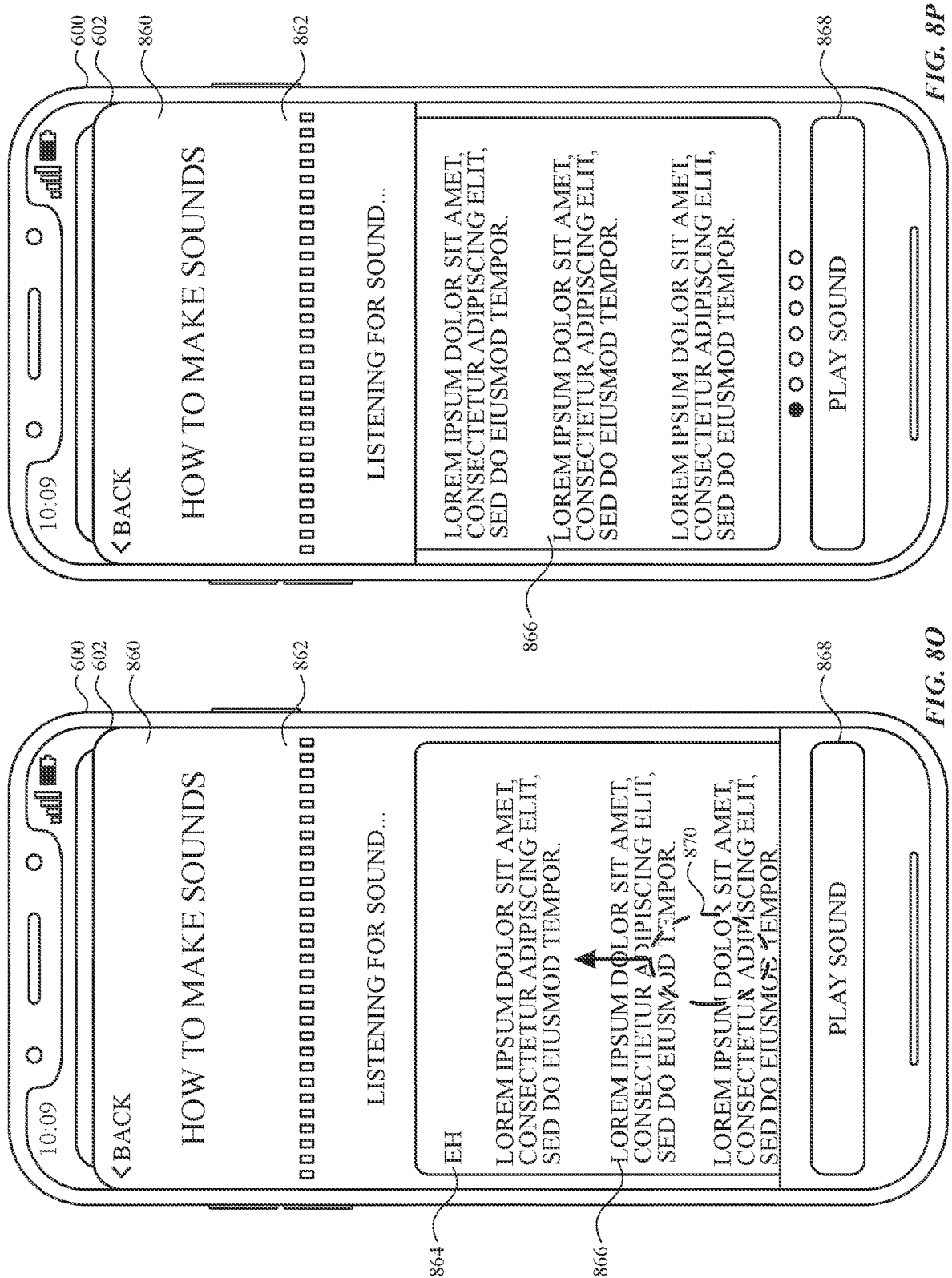

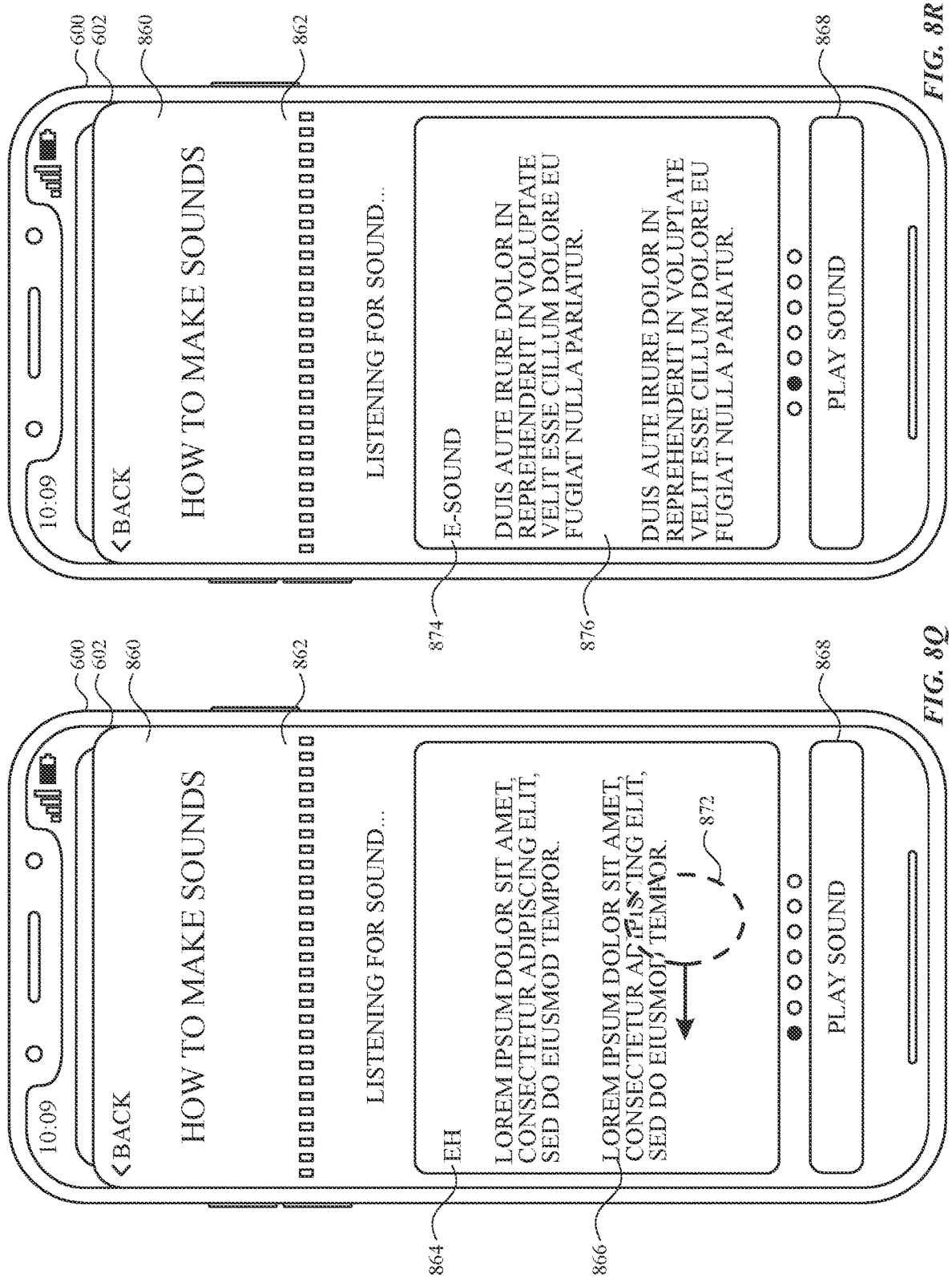

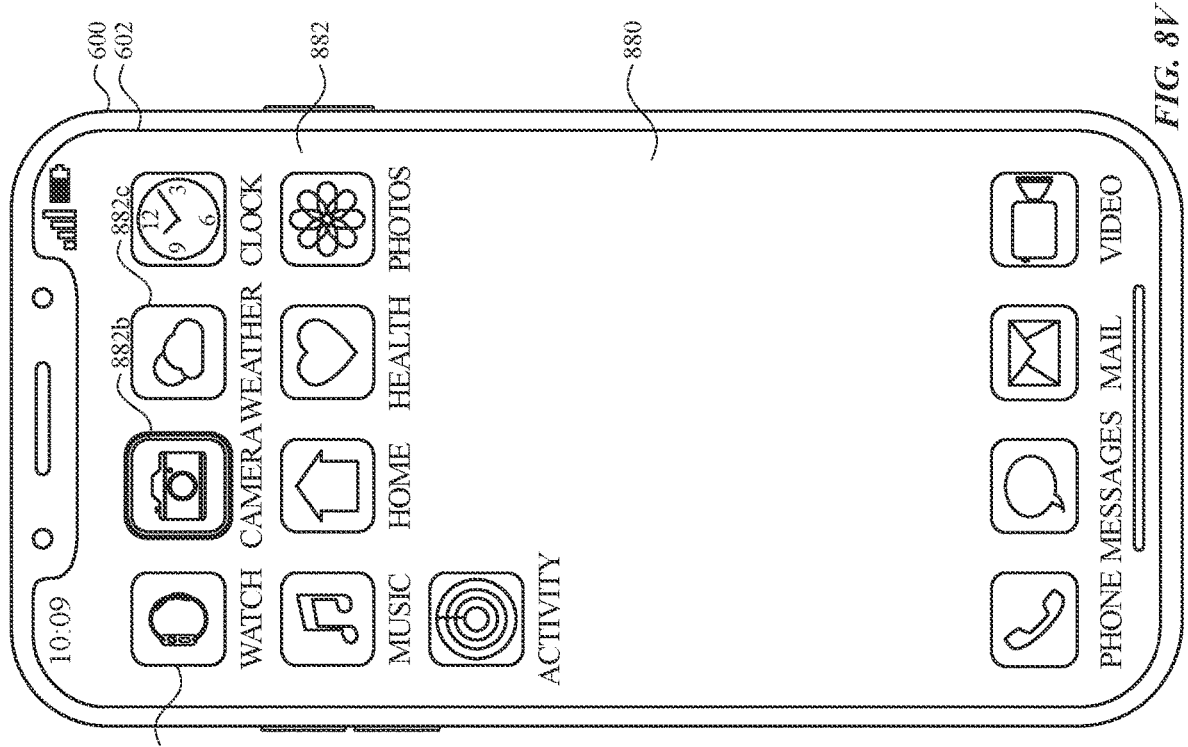
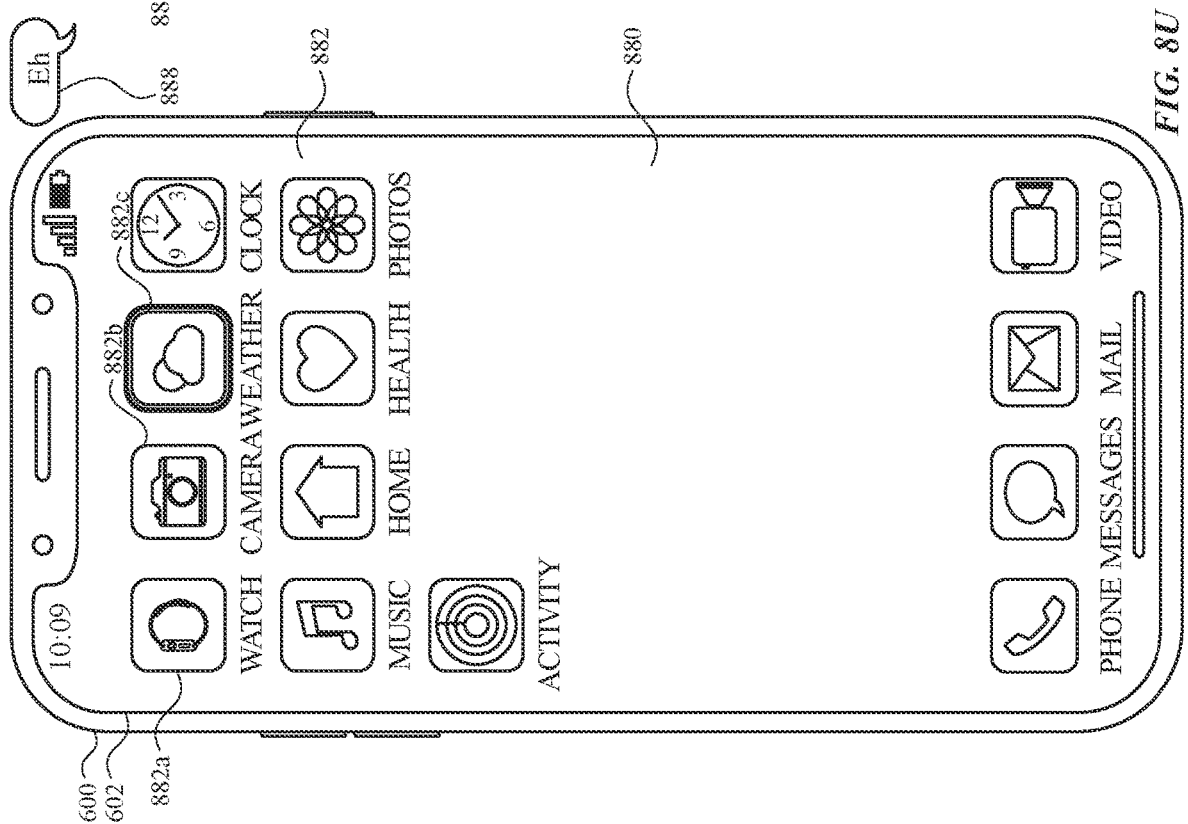

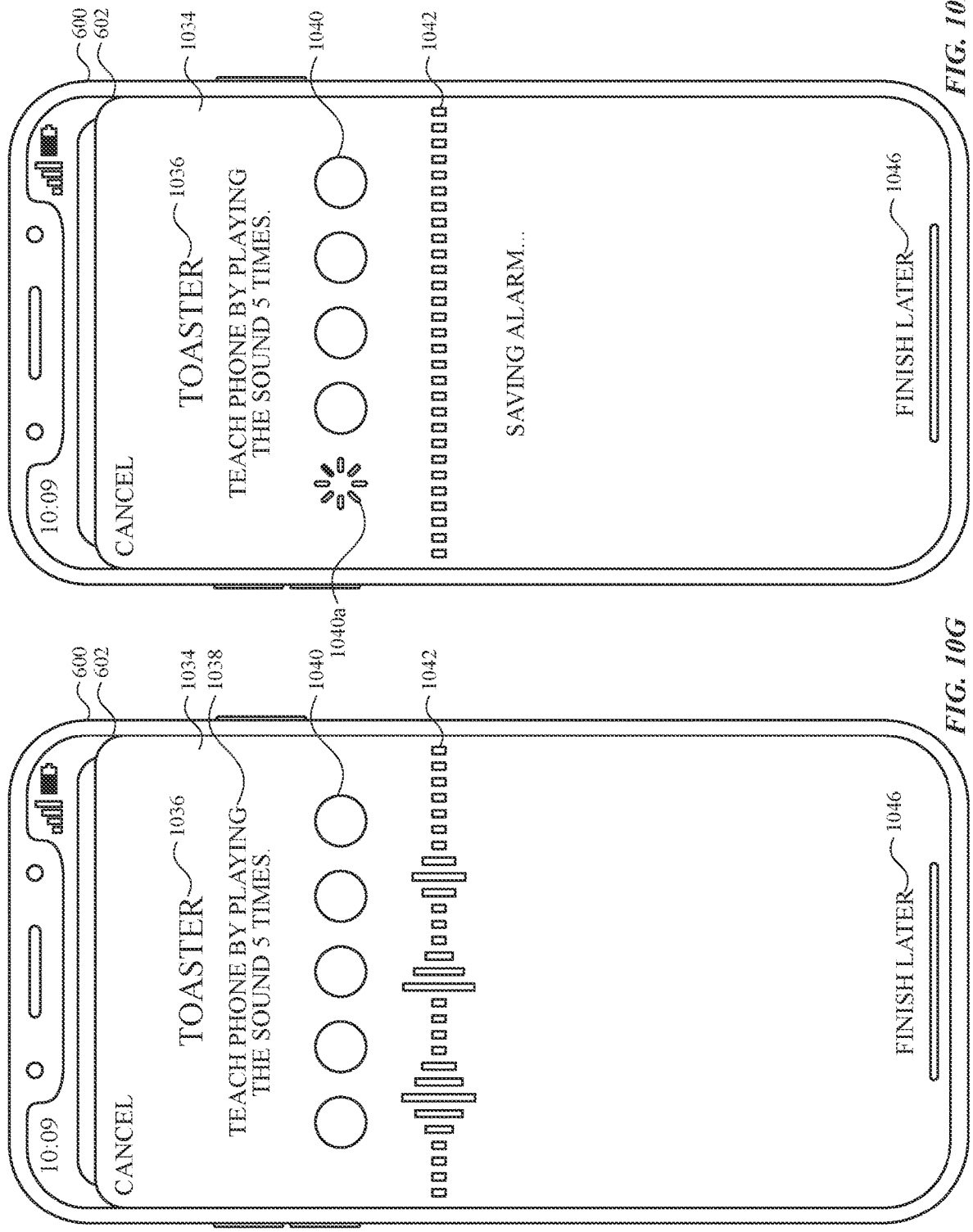

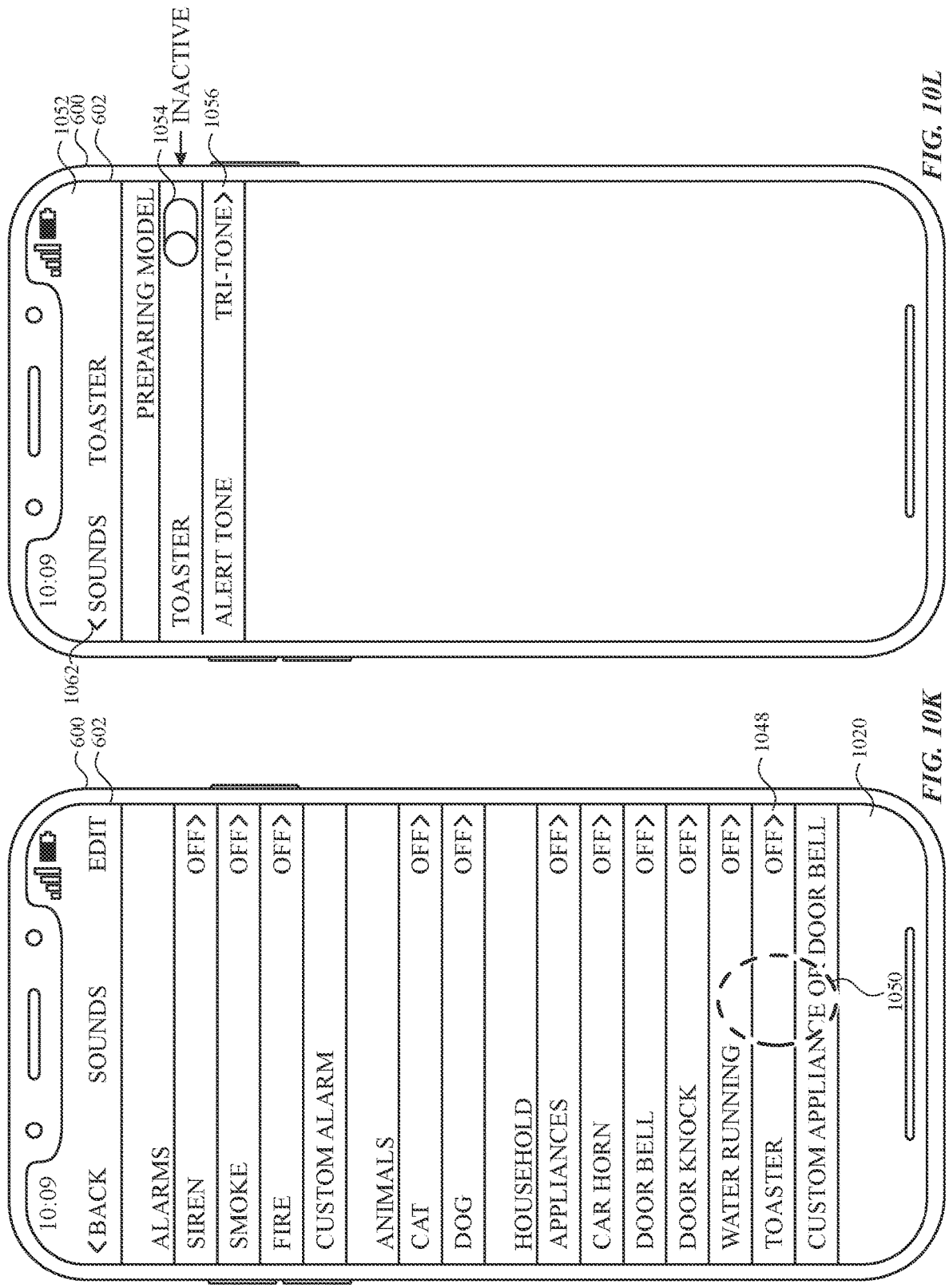

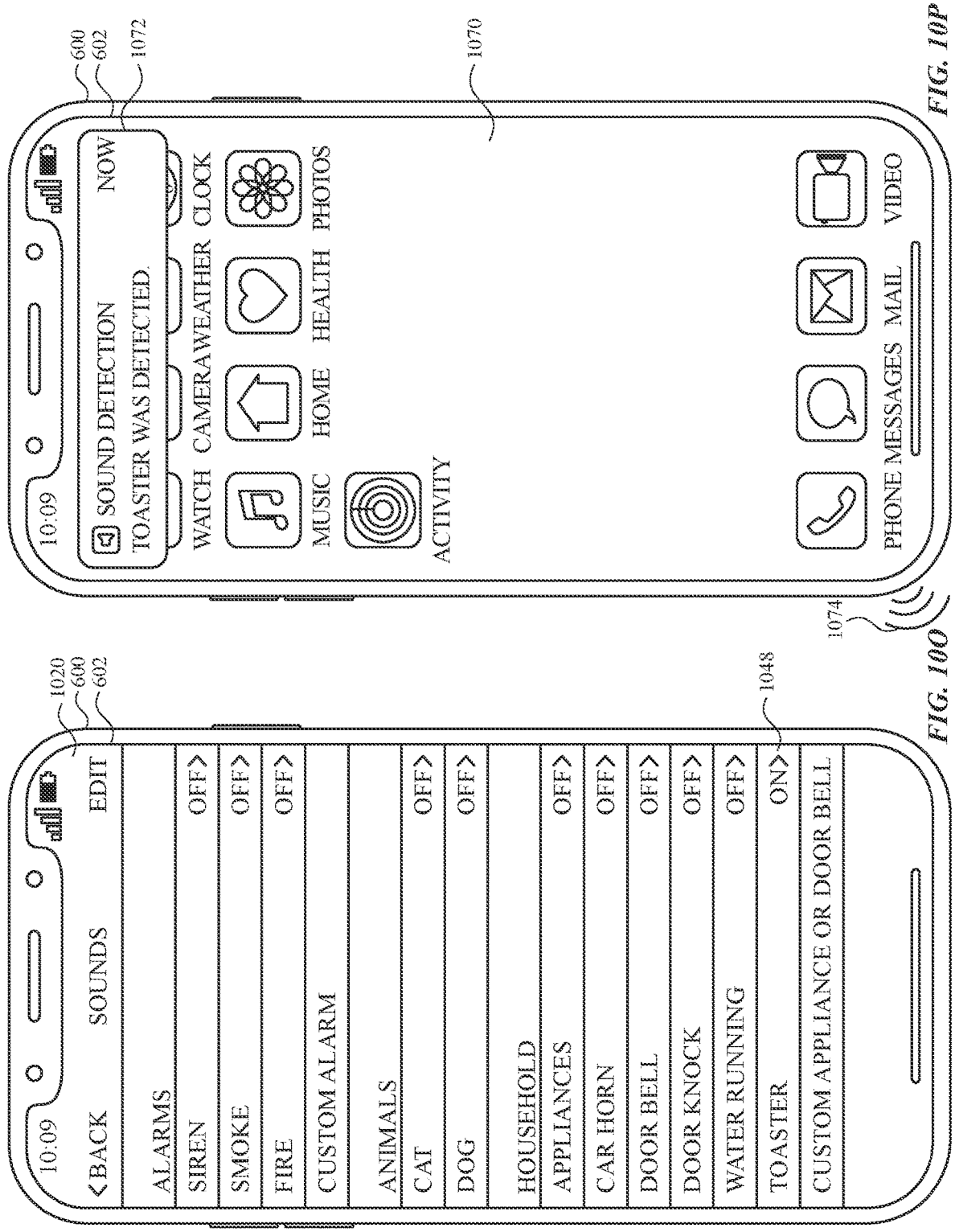

METHODS AND USER INTERFACES FOR AUDITORY FEATURES

CROSS-REFERENCE TO RELATED APPLICATIONS

This application claims priority to U.S. Patent Application No. 63/197,452, filed Jun. 6, 2021, "METHODS AND USER INTERFACES FOR AUDITORY FEATURES," and U.S. Provisional Application Ser. No. 63/190,765, filed May 19, 2021, entitled "METHODS AND USER INTERFACES FOR AUDITORY FEATURES." All of these applications are incorporated by reference herein in their entirety.

FIELD

The present disclosure relates generally to computer user interfaces, and more specifically to techniques for providing auditory features.

BACKGROUND

Personal electronic devices allow users to implement various functions of the electronic devices. In some instances, such functions provide an auditory feature to the user and/or allow a user to interact with electronic devices using auditory input.

BRIEF SUMMARY

Some techniques for providing auditory features using electronic devices, however, are generally cumbersome and inefficient. For example, some existing techniques use a complex and time-consuming user interface, which may include multiple key presses or keystrokes. As another example, some existing techniques may provide limited operability using auditory inputs. Accordingly, existing techniques require more time than necessary, wasting user time and device energy. This latter consideration is particularly important in battery-operated devices.

Accordingly, the present technique provides electronic devices with faster, more efficient methods and interfaces for providing auditory features. Such methods and interfaces optionally complement or replace other methods for providing auditory features. Such methods and interfaces reduce the cognitive burden on a user and produce a more efficient human-machine interface. For battery-operated computing devices, such methods and interfaces conserve power and increase the time between battery charges, for instance by reducing the number of inputs and/or time required to operate such devices.

Example methods are described herein. An example method includes, at a computer system in communication with one or more input devices: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

An example method includes at a computer system in communication with a display generation component and one or more input devices: while displaying, via the display generation component, a user interface including a set of user interface objects, receiving, via the one or more input devices, a first speech input associated with a first predetermined action; and in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example method includes at a computer system in communication with a display generation component and one or more input devices: performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

Example non-transitory computer-readable storage media configured to be executed by one or more processors of a computer system are described herein. An example non-transitory computer-readable storage medium configured to be executed by one or more processors of a computer system is in communication with one or more input devices and includes instructions for: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

An example non-transitory computer-readable storage medium configured to be executed by one or more processors of a computer system is in communication with a display generation component and one or more input devices and includes instructions for: while displaying, via the display generation component, a user interface including a set of user interface objects, receiving, via the one or more input devices, a first speech input associated with a first predetermined action; and in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example non-transitory computer-readable storage medium configured to be executed by one or more processors of a computer system is in communication with a display generation component and one or more input devices and includes instructions for: performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

Example transitory computer-readable storage media configured to be executed by one or more processors of a computer system are described herein. An example non-transitory computer-readable storage medium configured to be executed by one or more processors of a computer system is in communication with one or more input devices and includes instructions for: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

An example transitory computer-readable storage medium configured to be executed by one or more processors of a computer system is in communication with a display generation component and one or more input devices and includes instructions for: while displaying, via the display generation component, a user interface including a set of user interface objects, receiving, via the one or more input devices, a first speech input associated with a first predetermined action; and in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example transitory computer-readable storage medium configured to be executed by one or more processors of a computer system is in communication with a display generation component and one or more input devices and includes instructions for: performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

Example computer systems are described herein. An example computer system is configured to communicate with one or more input devices and includes: one or more processors; and memory storing one or more programs configured to be executed by the one or more processors, the one or more programs including instructions for: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

An example computer system is configured to communicate with a display generation component and one or more input devices and includes one or more processors; and memory storing one or more programs configured to be executed by the one or more processors, the one or more programs including instructions for: while displaying, via the display generation component, a user interface including a set of user interface objects, receiving, via the one or more input devices, a first speech input associated with a first predetermined action; and in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example computer system is configured to communicate with a display generation component and one or more input devices, comprising: one or more processors; and memory storing one or more programs configured to be executed by the one or more processors, the one or more programs including instructions for: performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

An example computer system is configured to communicate with one or more input devices and includes: means for, while playing an audio media item of a first type, receiving, via the one or more input devices, a request to play an audio media item of a second type; means for, in accordance with a determination that a set of concurrent audio criteria is satisfied, concurrently playing: the audio media item of the first type; and the audio media item of the second type; and means for, in accordance with a determination that the set of concurrent audio criteria is not satisfied: ceasing to play the audio media item of the first type; and playing the audio media item of the second type.

An example computer system is configured to communicate with a display generation component and one or more input devices and includes means for, while displaying, via the display generation component, a user interface including a set of user interface objects, receiving, via the one or more input devices, a first speech input associated with a first predetermined action; and means for, in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example computer system is configured to communicate with a display generation component and one or more input devices and includes means for performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

Example computer program products are disclosed herein. An example computer program product includes one or more programs configured to be executed by one or more processors of a computer system that is in communication with one or more input devices, the one or more programs including instructions for: while playing an audio media item of a first type, receiving, via the one or more input devices, a request to play an audio media item of a second type; in accordance with a determination that a set of concurrent audio criteria is satisfied, concurrently playing: the audio media item of the first type; and the audio media item of the second type; and in accordance with a determination that the set of concurrent audio criteria is not satisfied: ceasing to play the audio media item of the first type; and playing the audio media item of the second type.

An example computer program product includes one or more programs configured to be executed by one or more processors of a computer system that is in communication with a display generation component and one or more input devices, the one or more programs including instructions for: while displaying, via the display generation component, a user interface including a set of user interface objects, receiving, via the one or more input devices, a first speech input associated with a first predetermined action; and in response to receiving the first speech input: in accordance with a determination that a first user interface object of the set of user interface objects is currently selected, performing the first predetermined action based on the first user interface object; and in accordance with a determination that a second user interface object of the set of user interface objects is currently selected, performing the first predetermined action based on the second user interface object.

An example computer program product includes one or more programs configured to be executed by one or more processors of a computer system that is in communication with a display generation component and one or more input devices, the one or more programs including instructions for: performing a sound enrollment process including: receiving, via the one or more input devices, a set of one or more sound inputs that includes a first sound input; indicating whether the first sound input satisfies sound input criteria; in accordance with a determination that the set of one or more sound inputs satisfies a set of sound enrollment criteria, causing a model for identifying sounds of a first type corresponding to the set of one or more sound inputs to be generated; and in accordance with a determination that the set of one or more sound inputs does not satisfy the set of sound enrollment criteria, forgoing causing the model for identifying sounds of the first type corresponding to the set of one or more sound inputs to be generated.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing auditory features, thereby increasing the effectiveness, efficiency, and user satisfaction with such devices. Such methods and interfaces may complement or replace other methods for providing auditory features.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6M illustrate exemplary user interfaces for providing background sounds in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient, systems, methods, and interfaces for auditory features. Such techniques can reduce the cognitive burden on a user who utilizes auditory features, thereby enhancing productivity. Further, such techniques can reduce processor and battery power otherwise wasted on redundant or unnecessary user inputs.

Figure 6H:
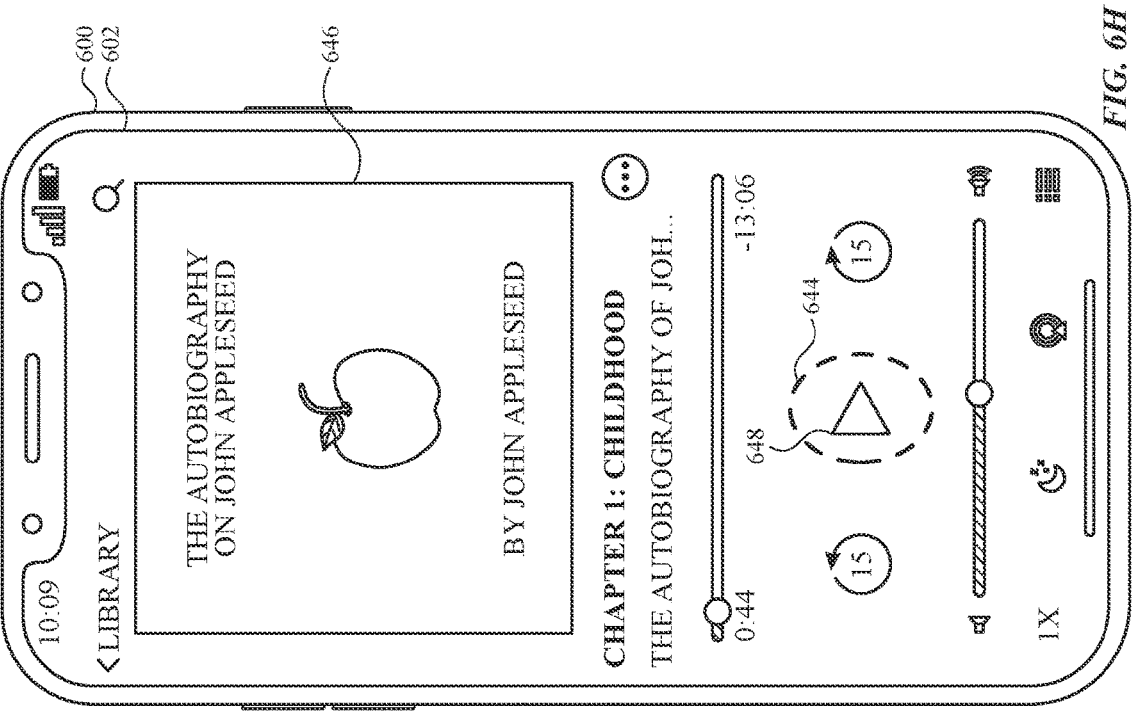
Figure 6G:
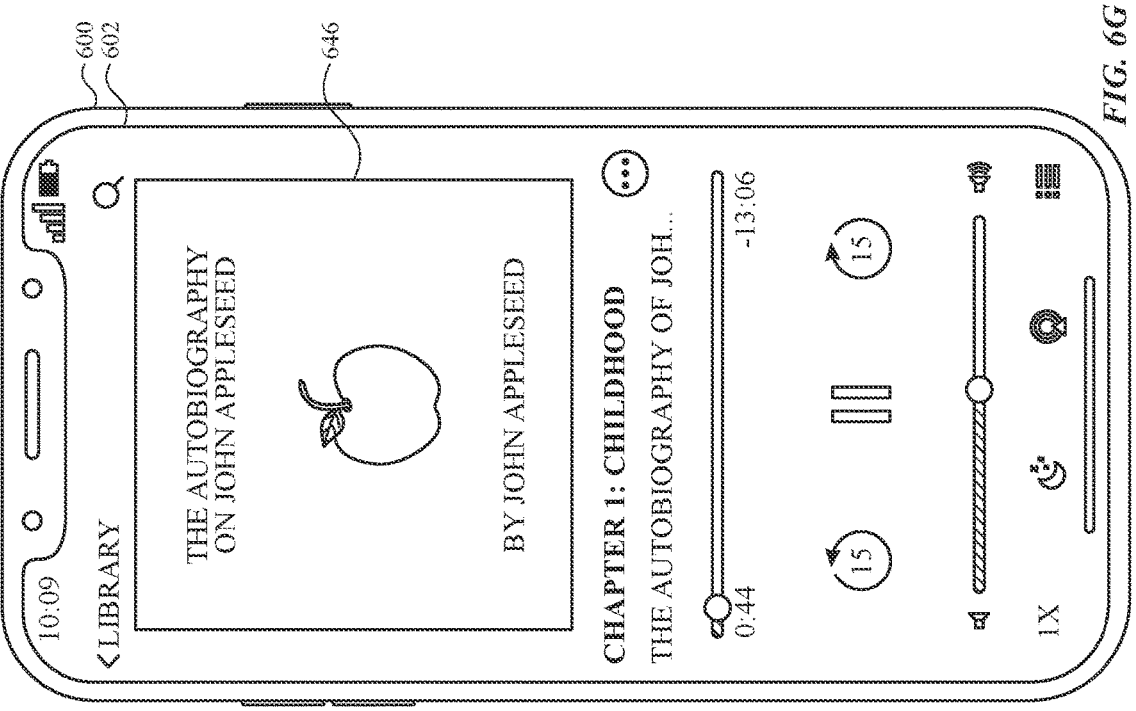
Figure 7:
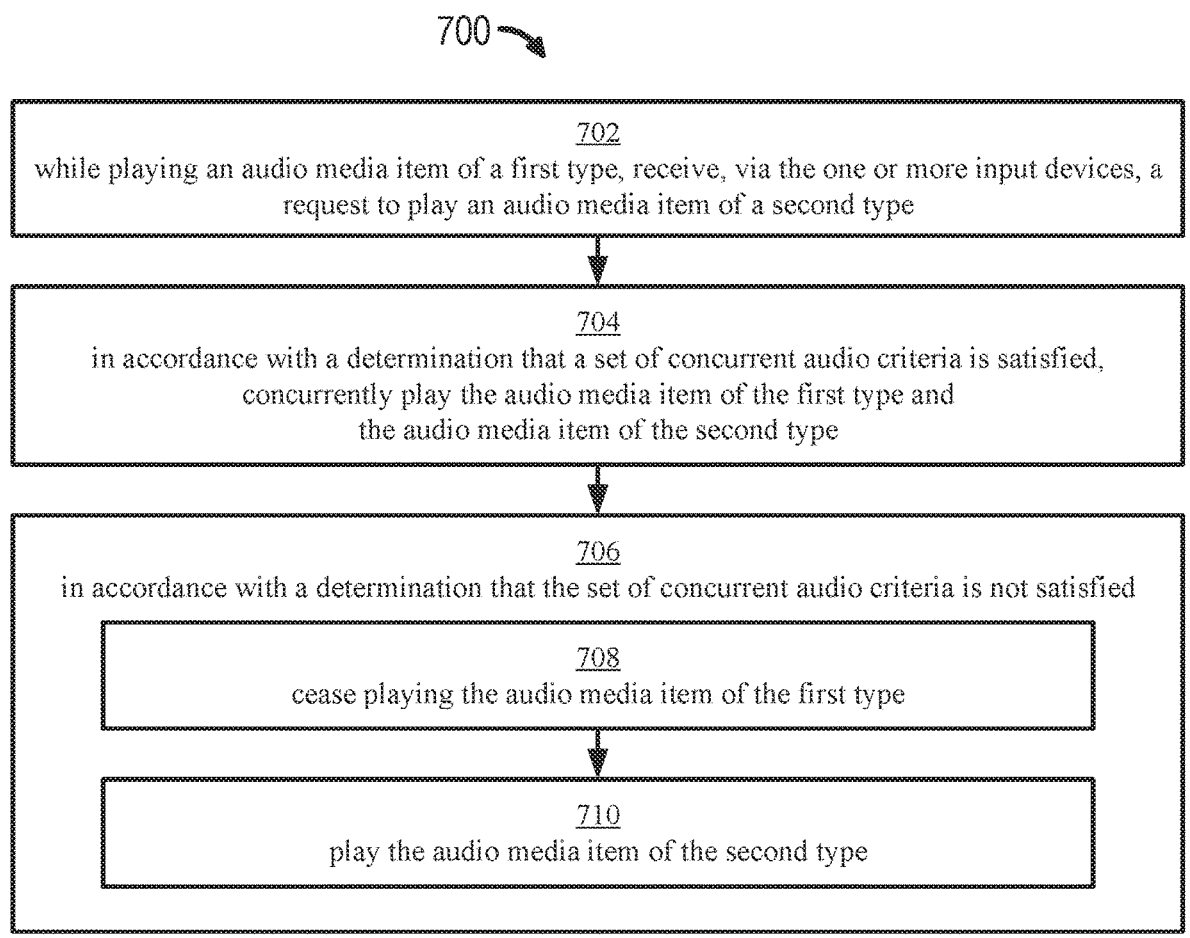
FIG. 7 is a flowchart of a process for providing background sounds in accordance with some embodiments.
Figure 8B:
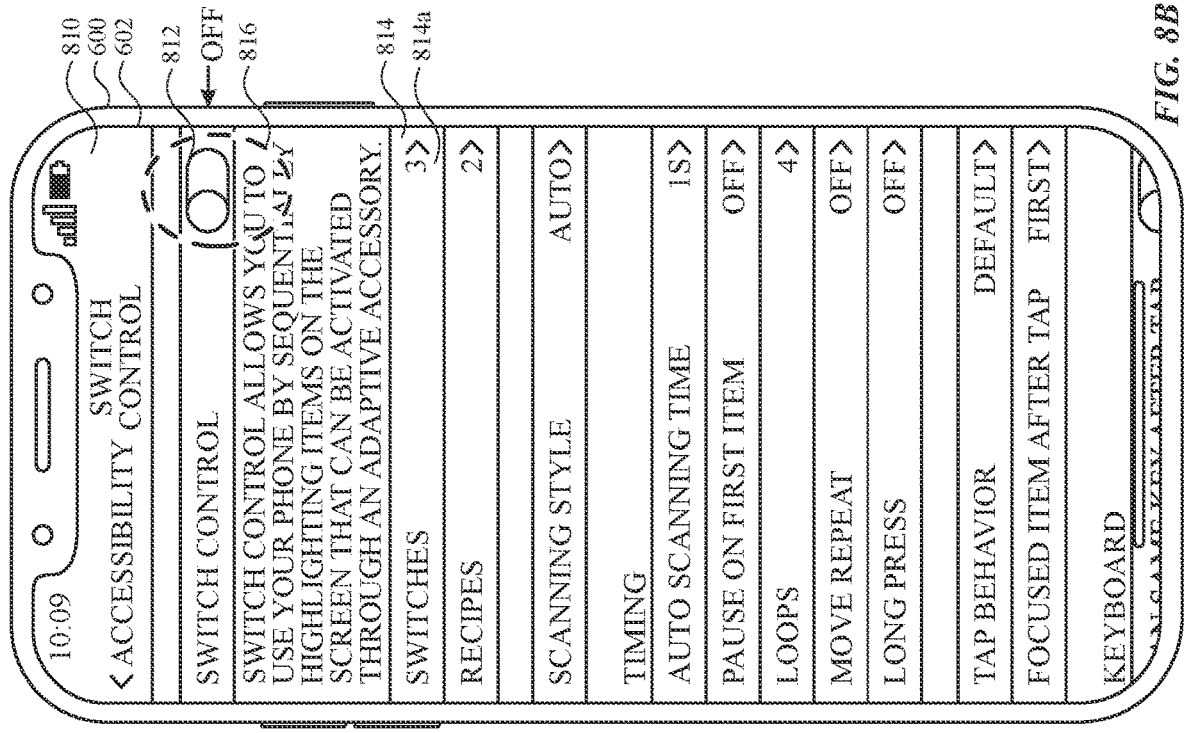
FIGS. 8A-8V illustrate exemplary user interfaces for providing auditory controls in accordance with some embodiments.
Figure 8A:
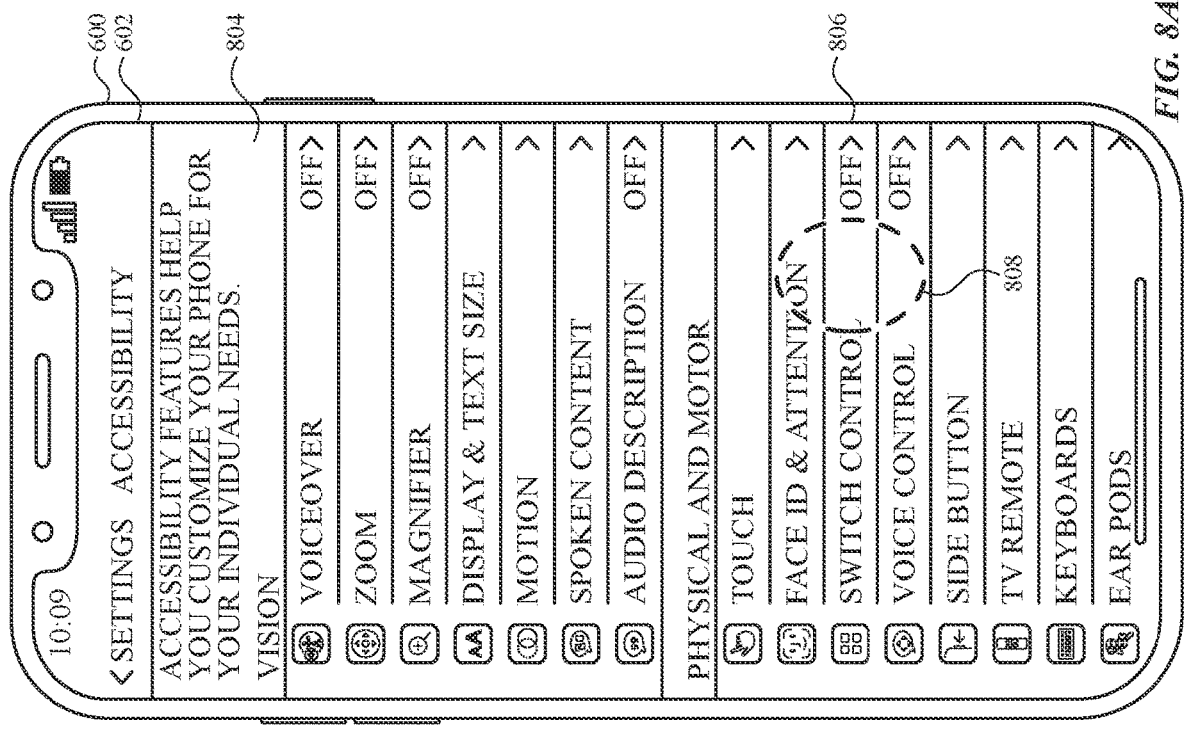
Figure 9:
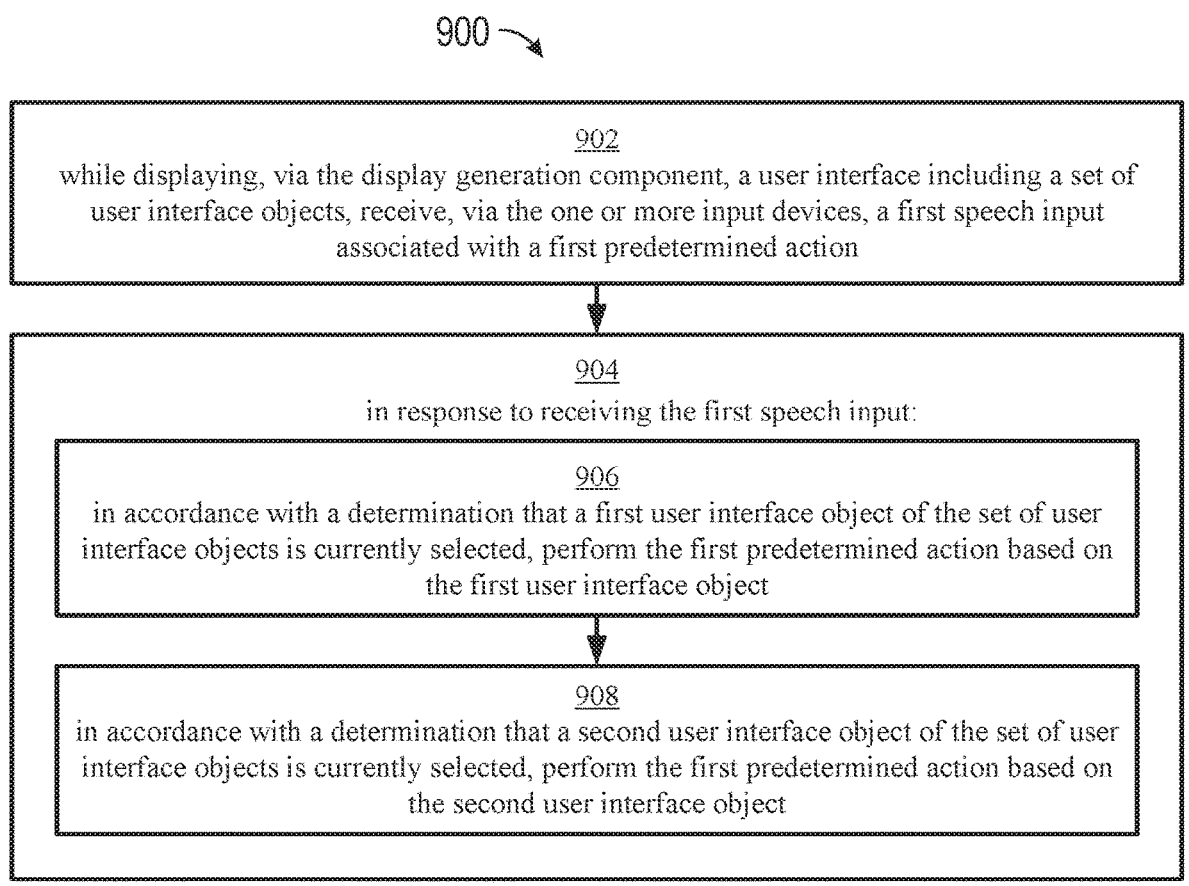
FIG. 9 is a flowchart of a process for providing auditory controls in accordance with some embodiments.
Figure 10B:
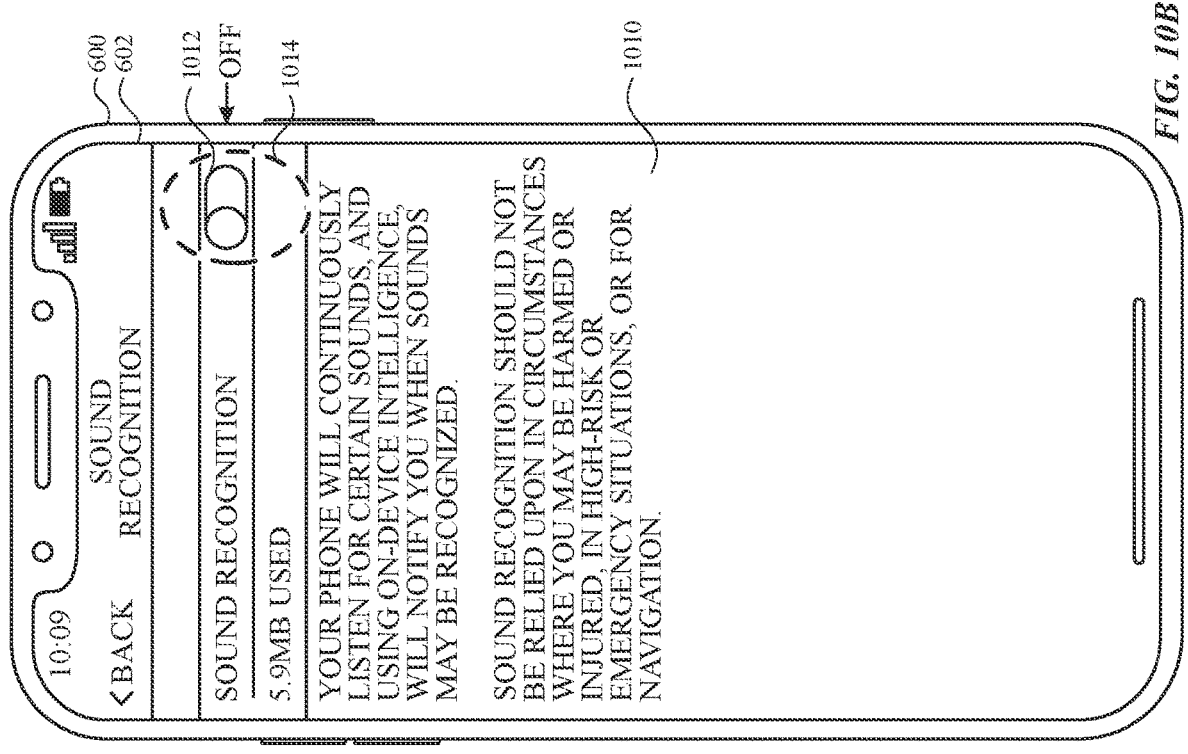
FIGS. 10A-10V illustrate exemplary user interfaces for providing notifications in accordance with some embodiments.
Figure 10A:
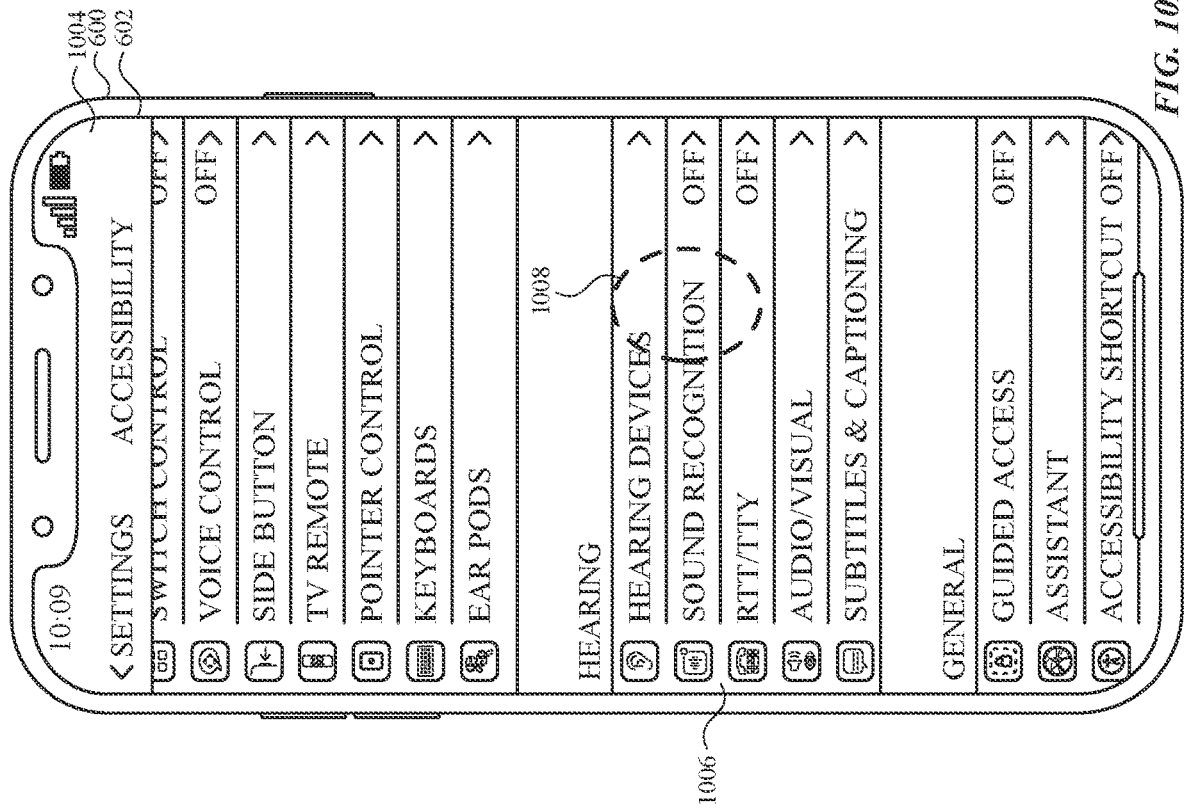
Figure 10D:
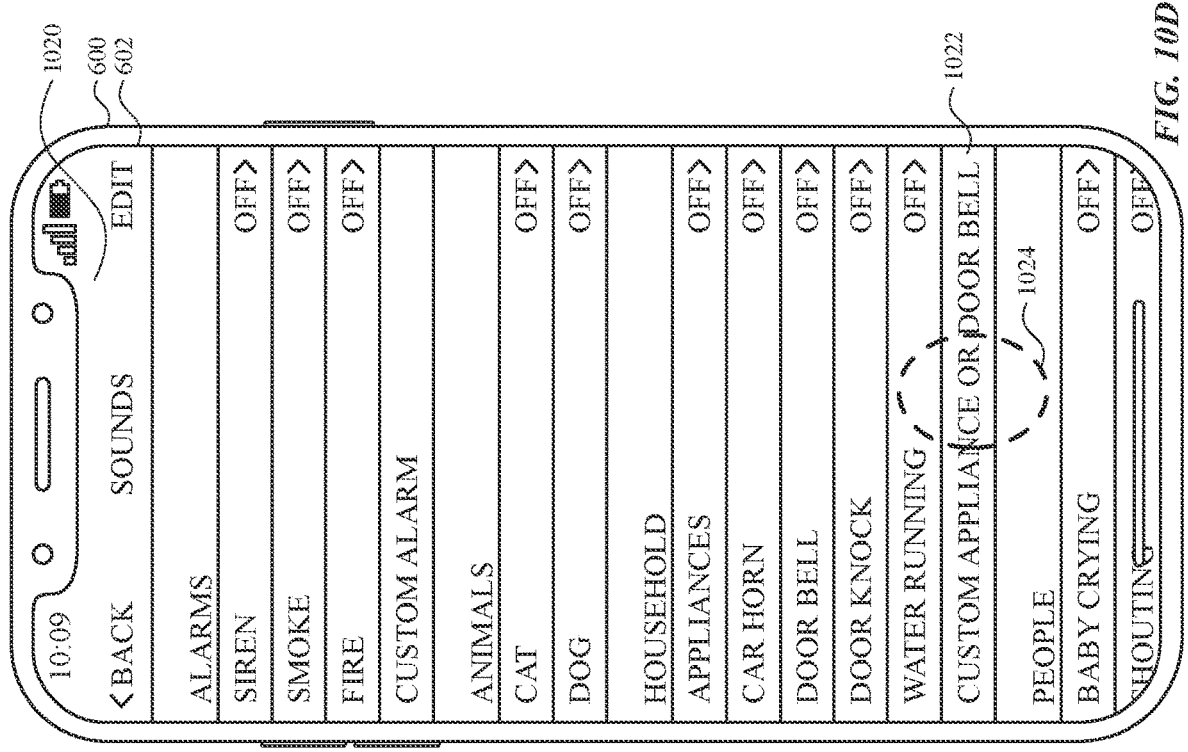
Figure 10C:
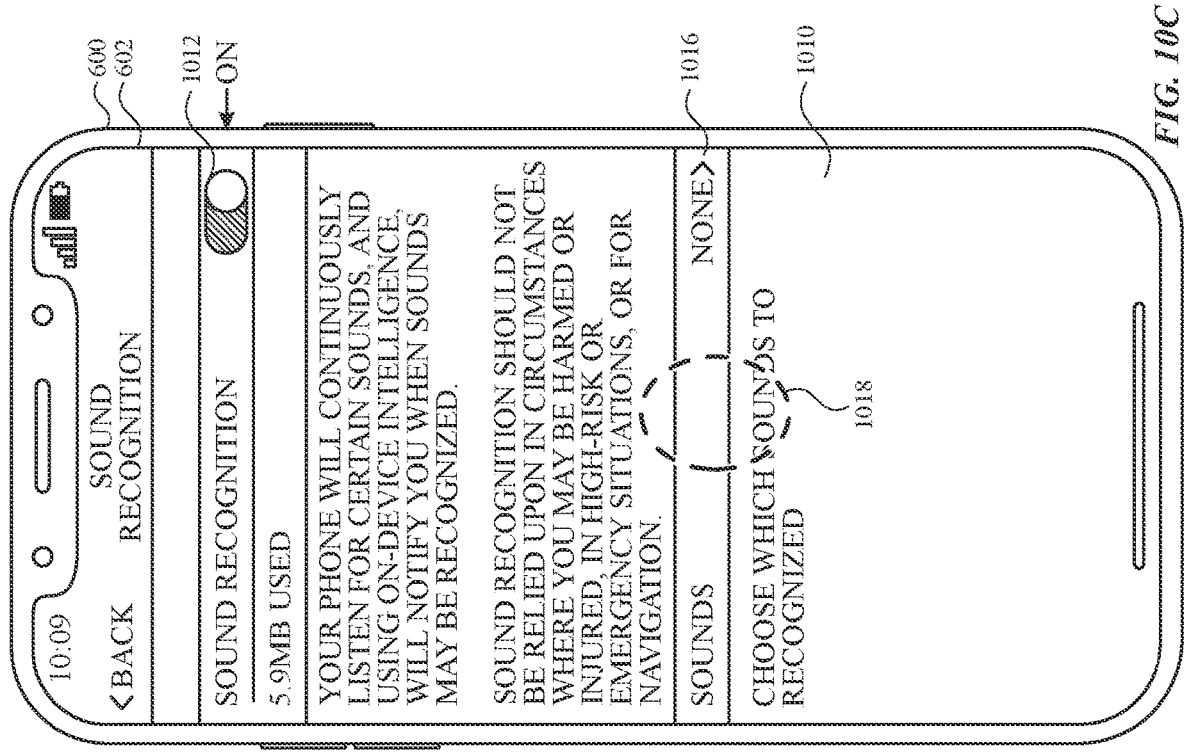
Figure 10F:
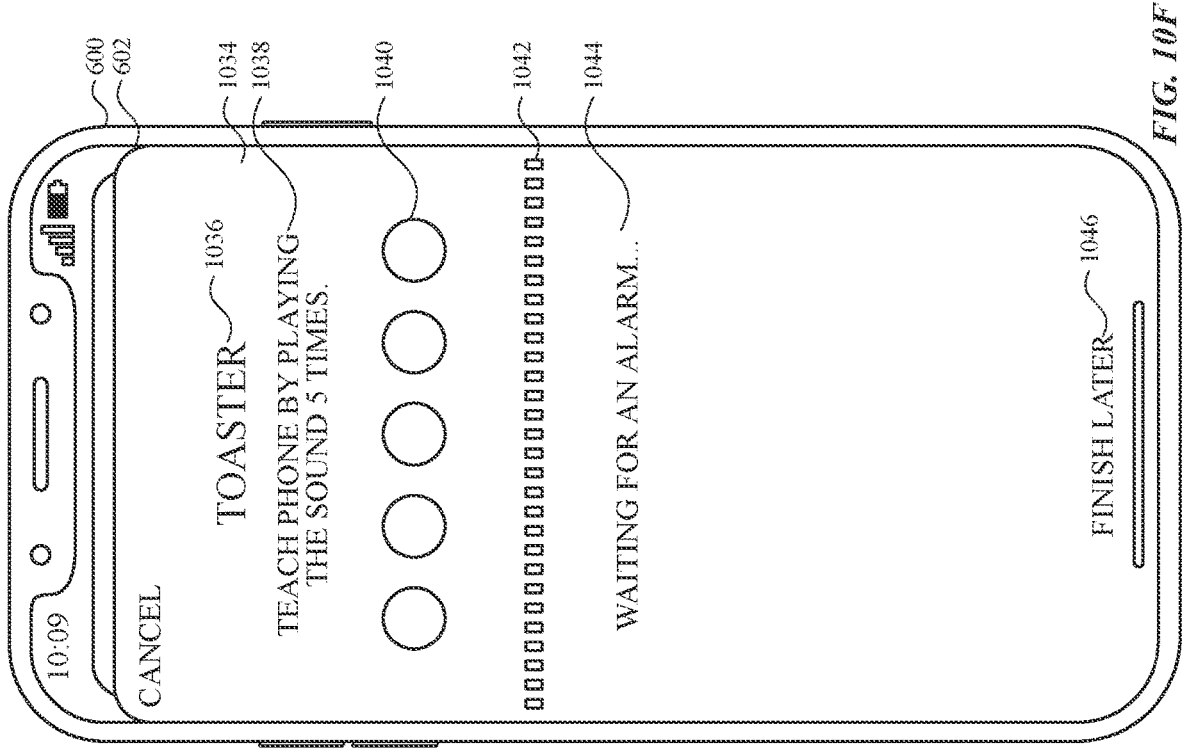
Figure 10E:
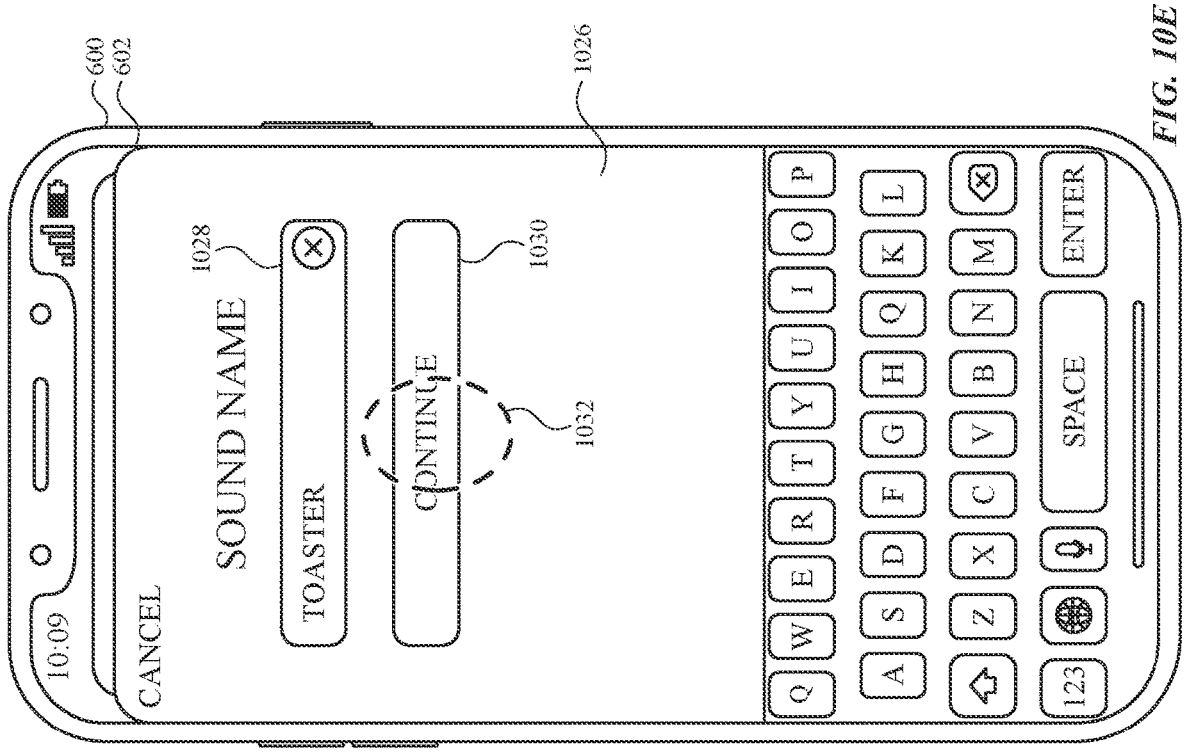
Figure 10I:
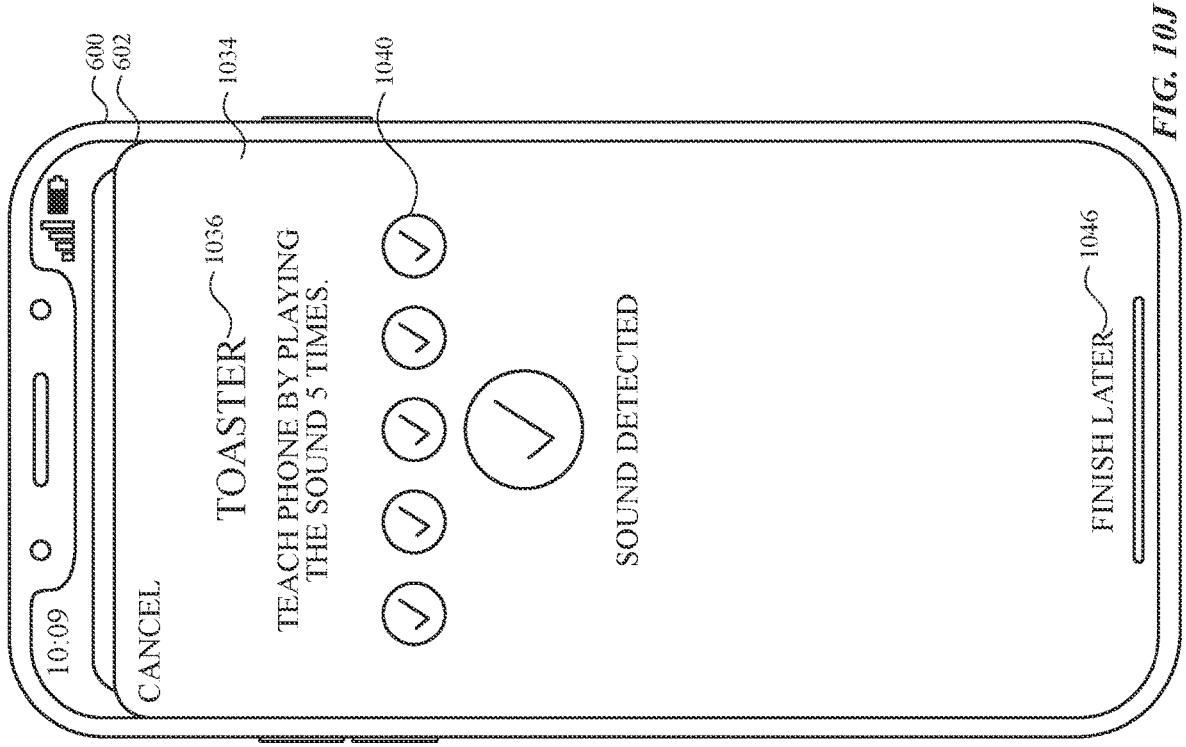
Figure 10J:
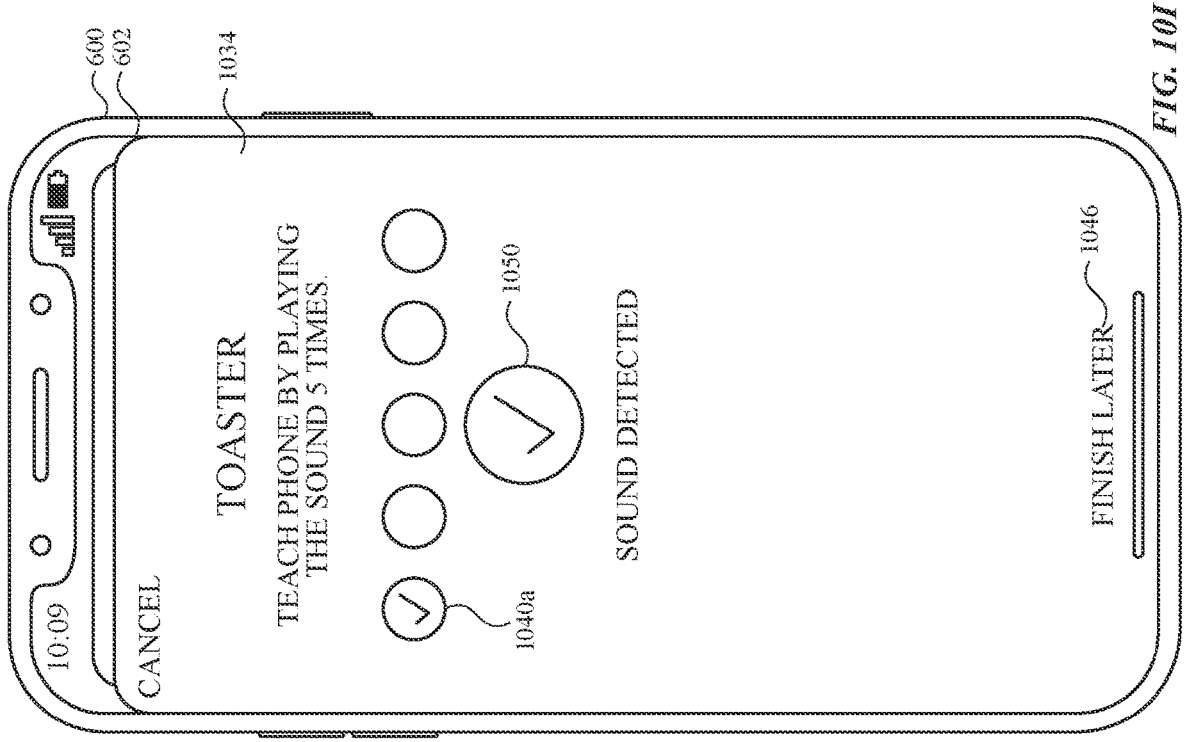
Figure 10N:
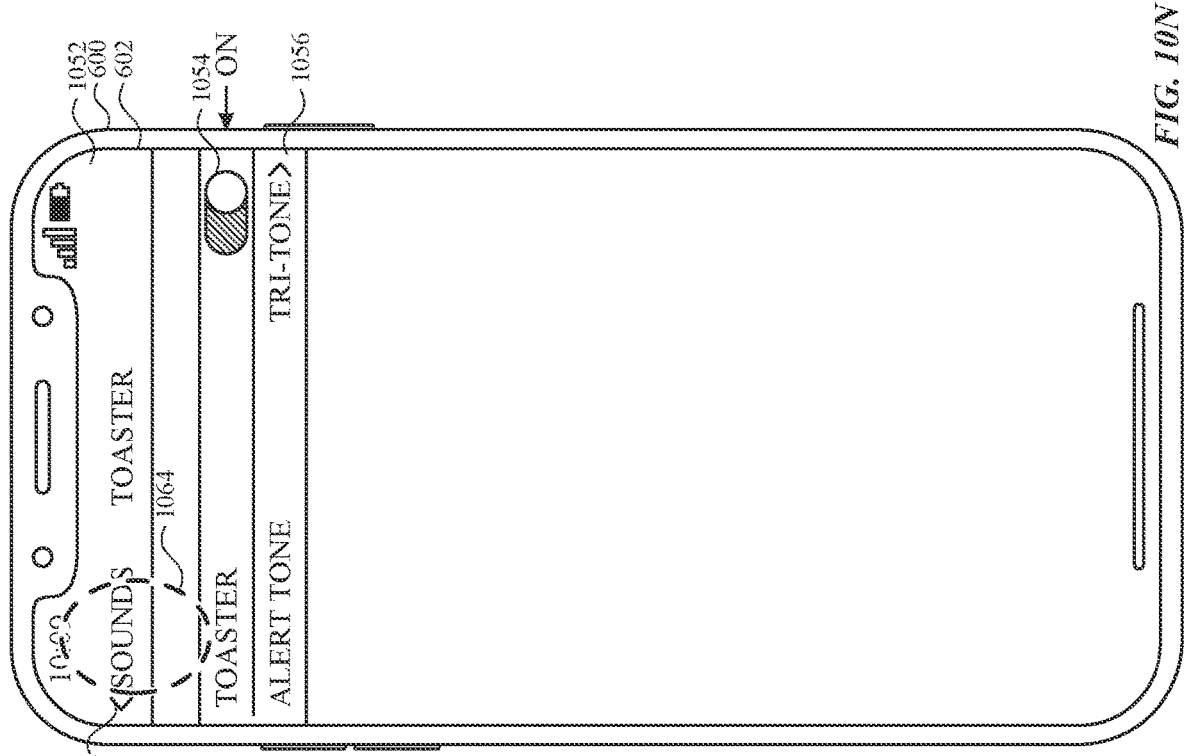
Figure 10M:
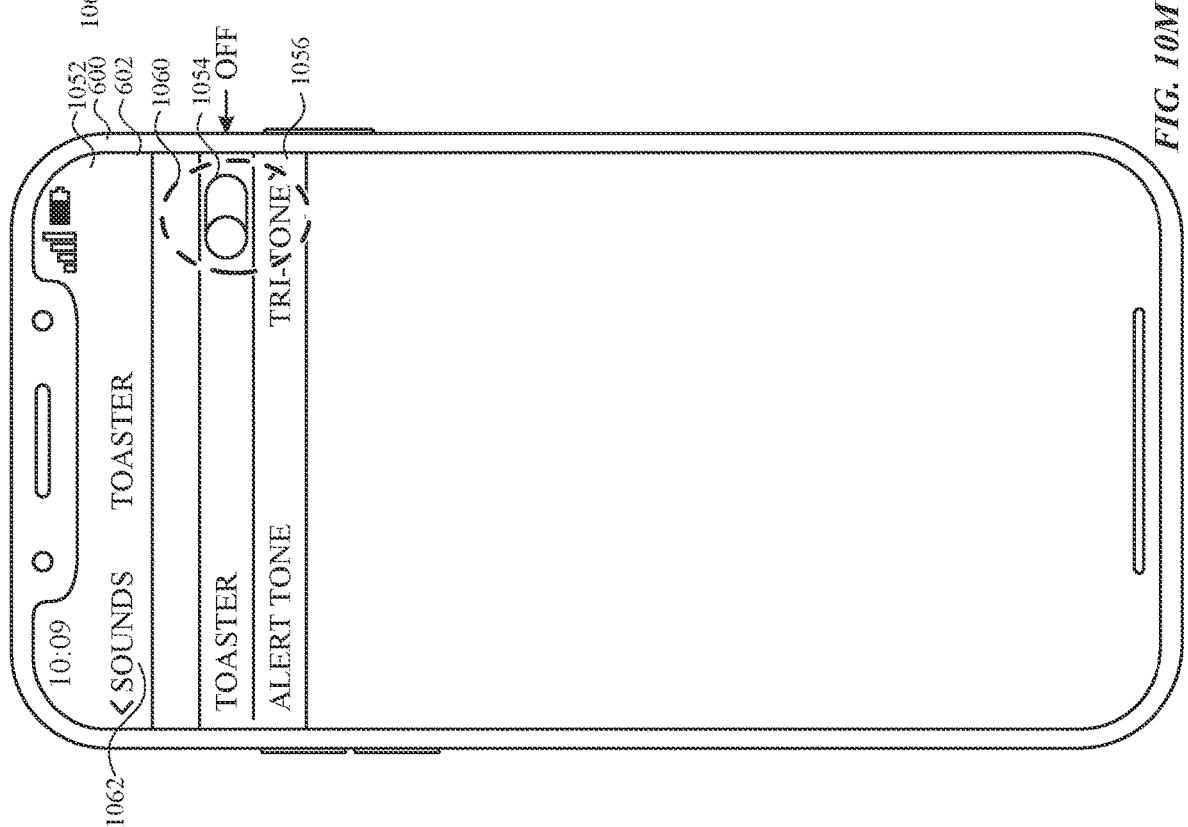
Figure 10R:
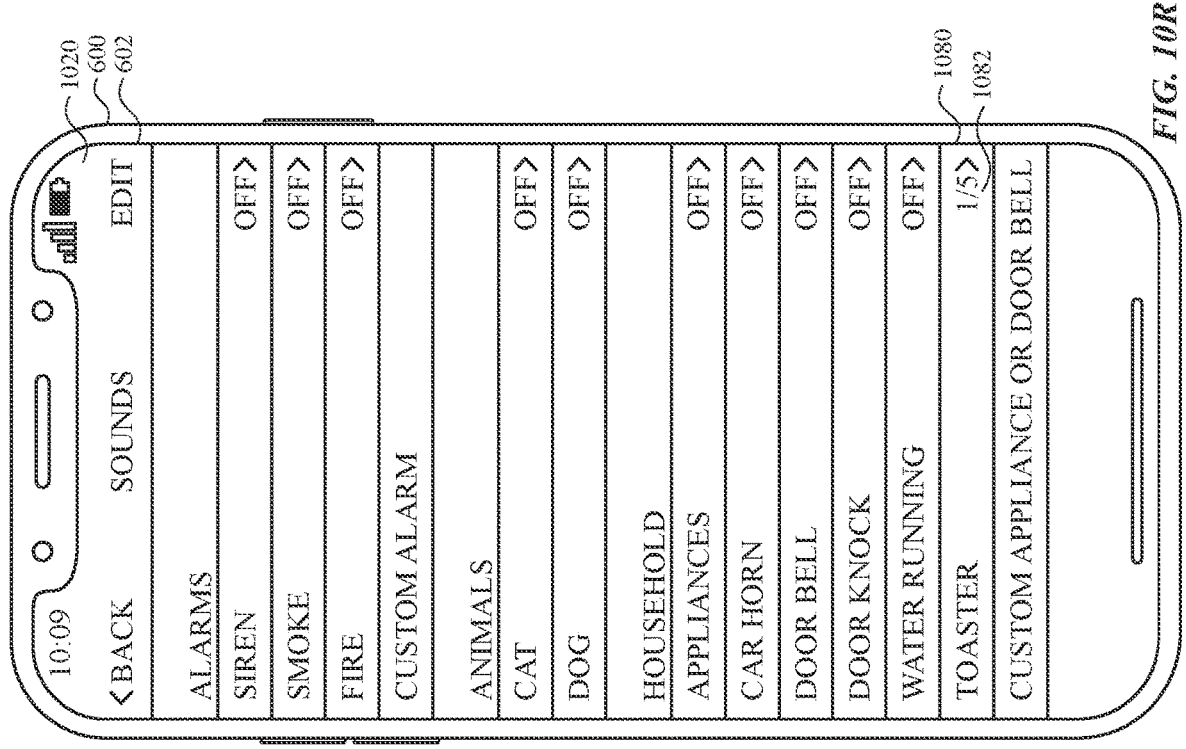
Figure 10Q:
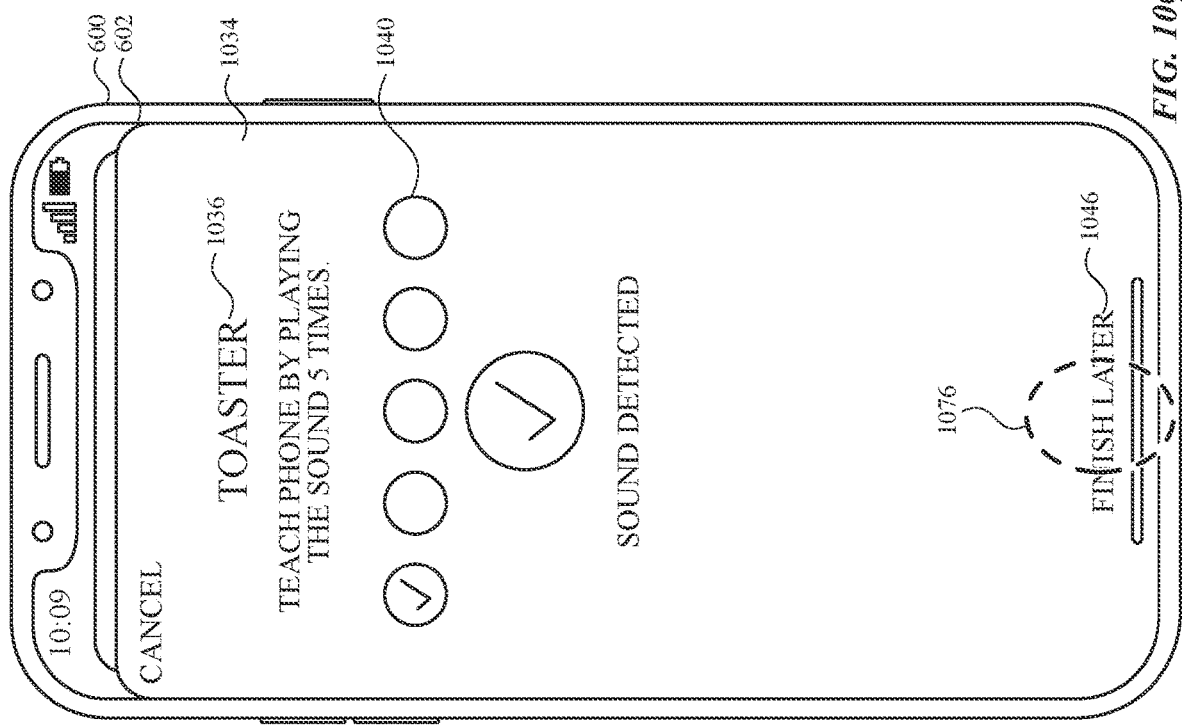
Figure 10T:
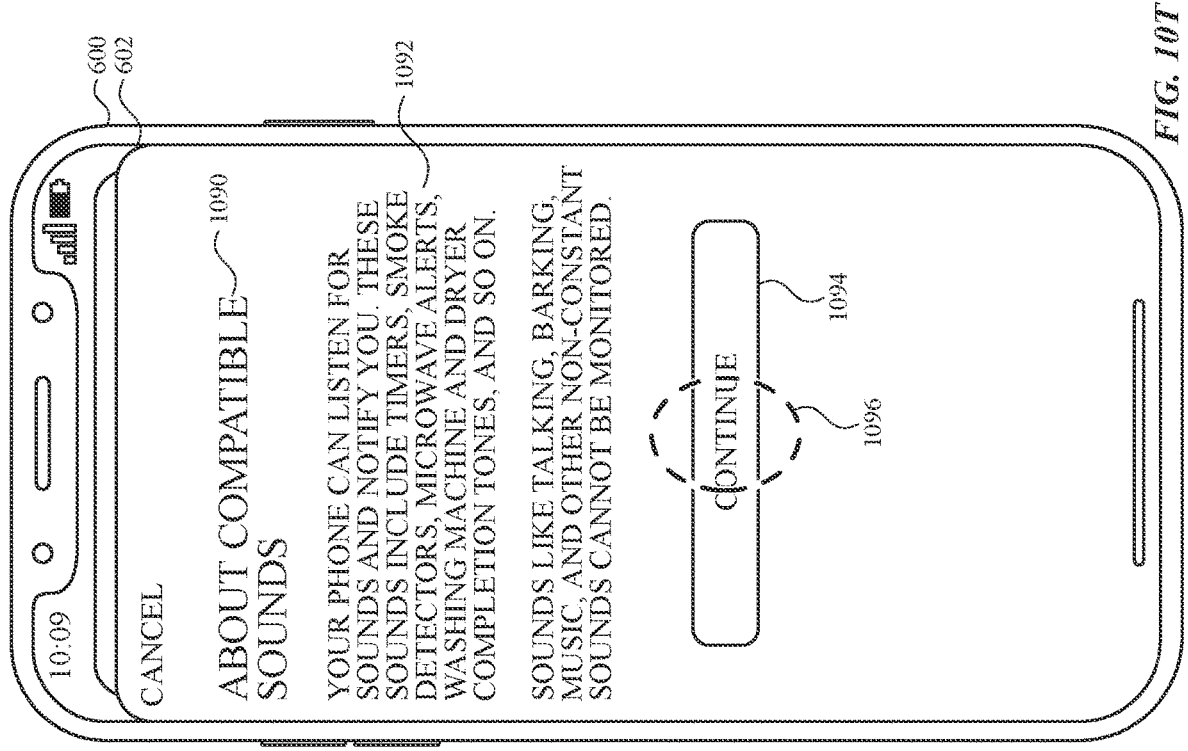
Figure 10S:
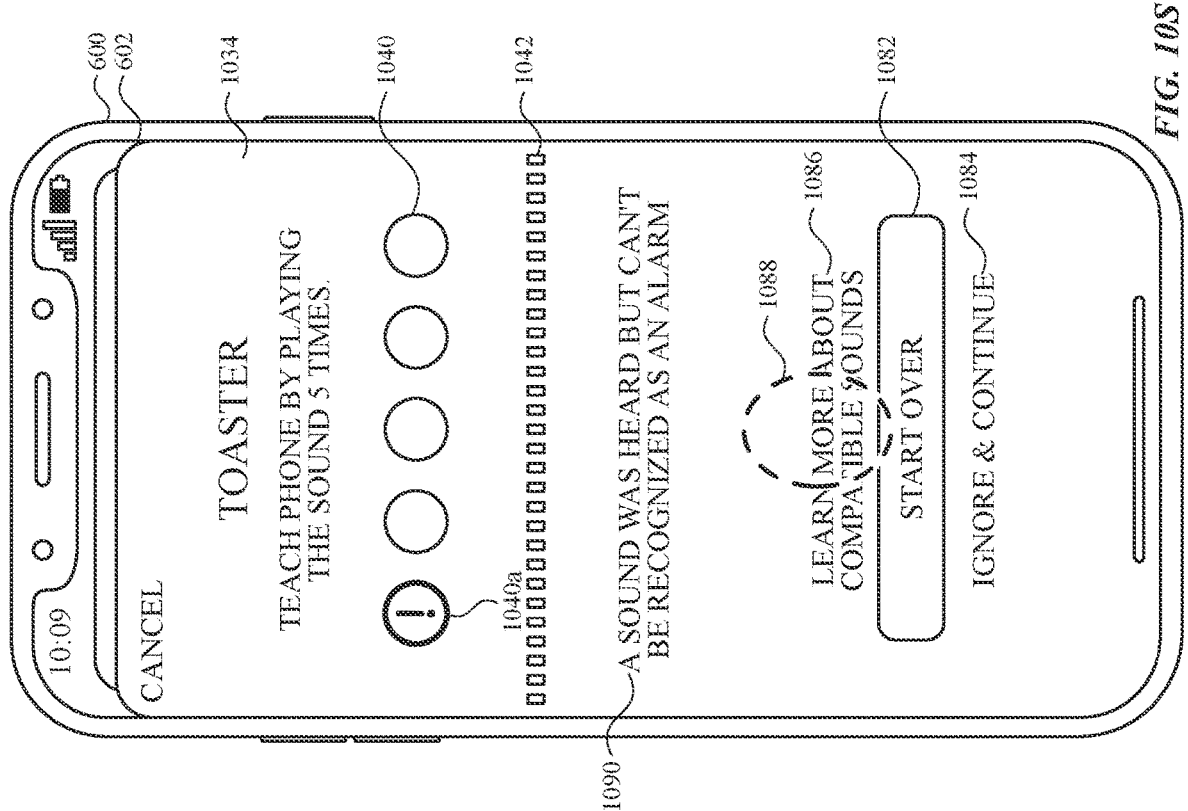
Figure 10U:
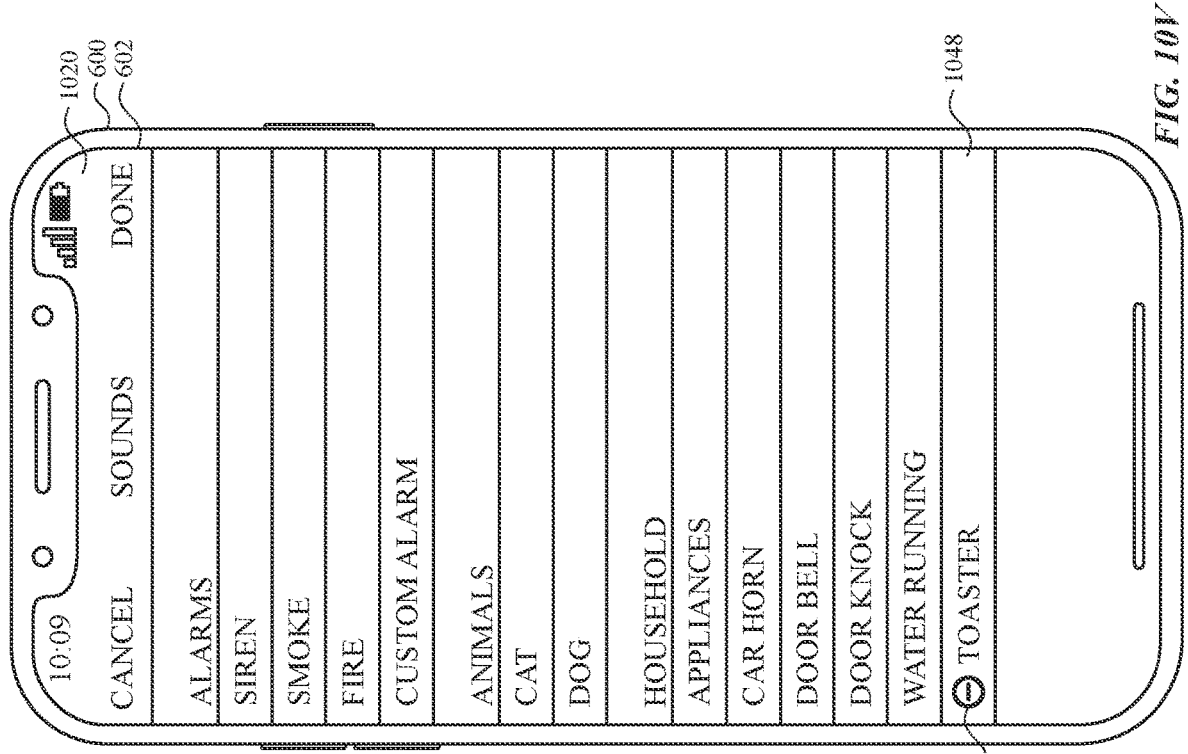
Figure 10V:
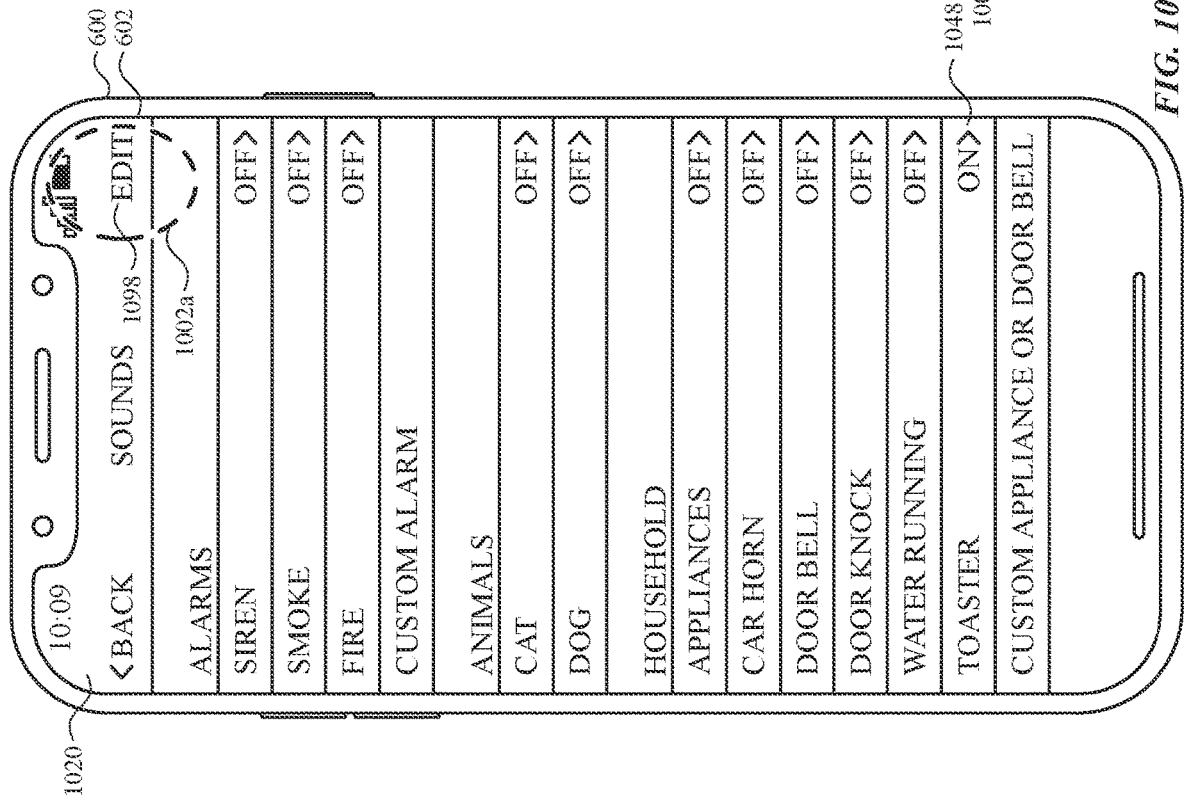
Figure 11:
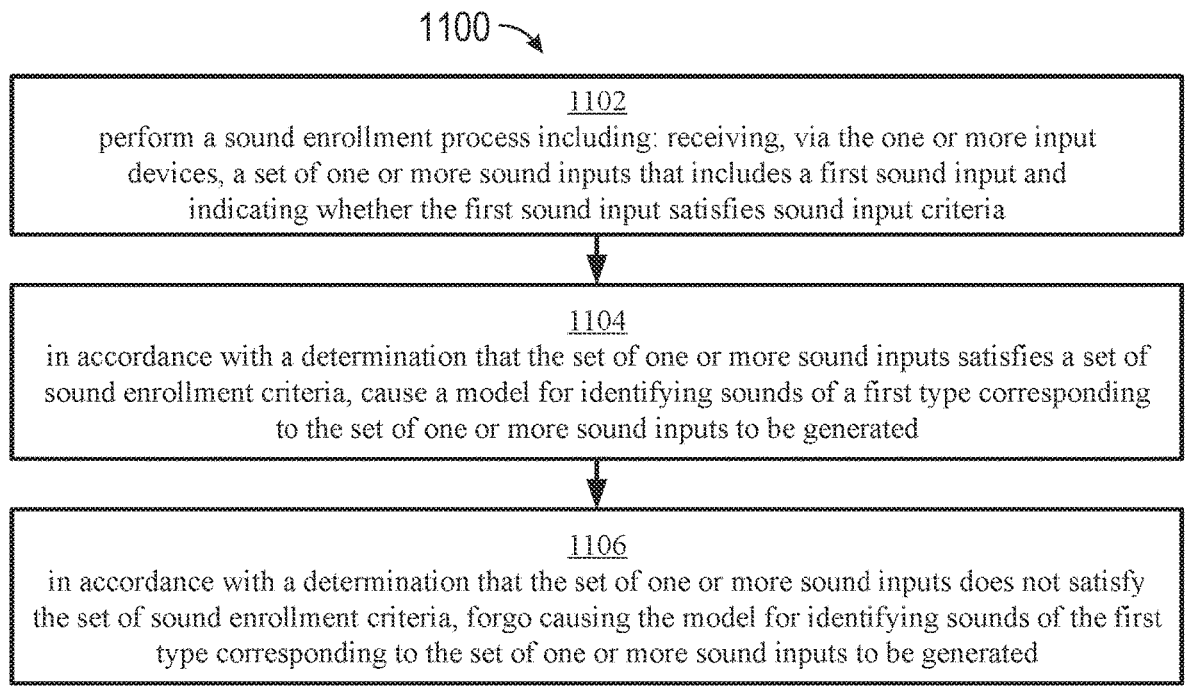
FIG. 11 is a flowchart of a process for providing notifications in accordance with some embodiments.

Below, FIGS. 1A-1B, 2, 3, 4A-4B, and 5A-5B provide a description of exemplary devices for performing the techniques for providing auditory features. FIGS. 6A-6M illustrate exemplary user interfaces for providing background sounds. FIG. 7 is a flow diagram illustrating methods of providing background sounds in accordance with some embodiments. The user interfaces in FIGS. 6A-6M are used to illustrate the processes described below, including the processes in FIG. 7. FIGS. 8A-8V illustrate exemplary user interfaces for providing auditory controls. FIG. 9 is a flow diagram illustrating methods of providing auditory controls in accordance with some embodiments. The user interfaces in FIGS. 8A-8V are used to illustrate the processes described below, including the processes in FIG. 9. FIGS. 10A-10V illustrate exemplary user interfaces for providing auditory controls. FIG. 11 is a flow diagram illustrating methods of providing notifications in accordance with some embodiments. The user interfaces in FIGS. 10A-10V are used to illustrate the processes described below, including the processes in FIG. 11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
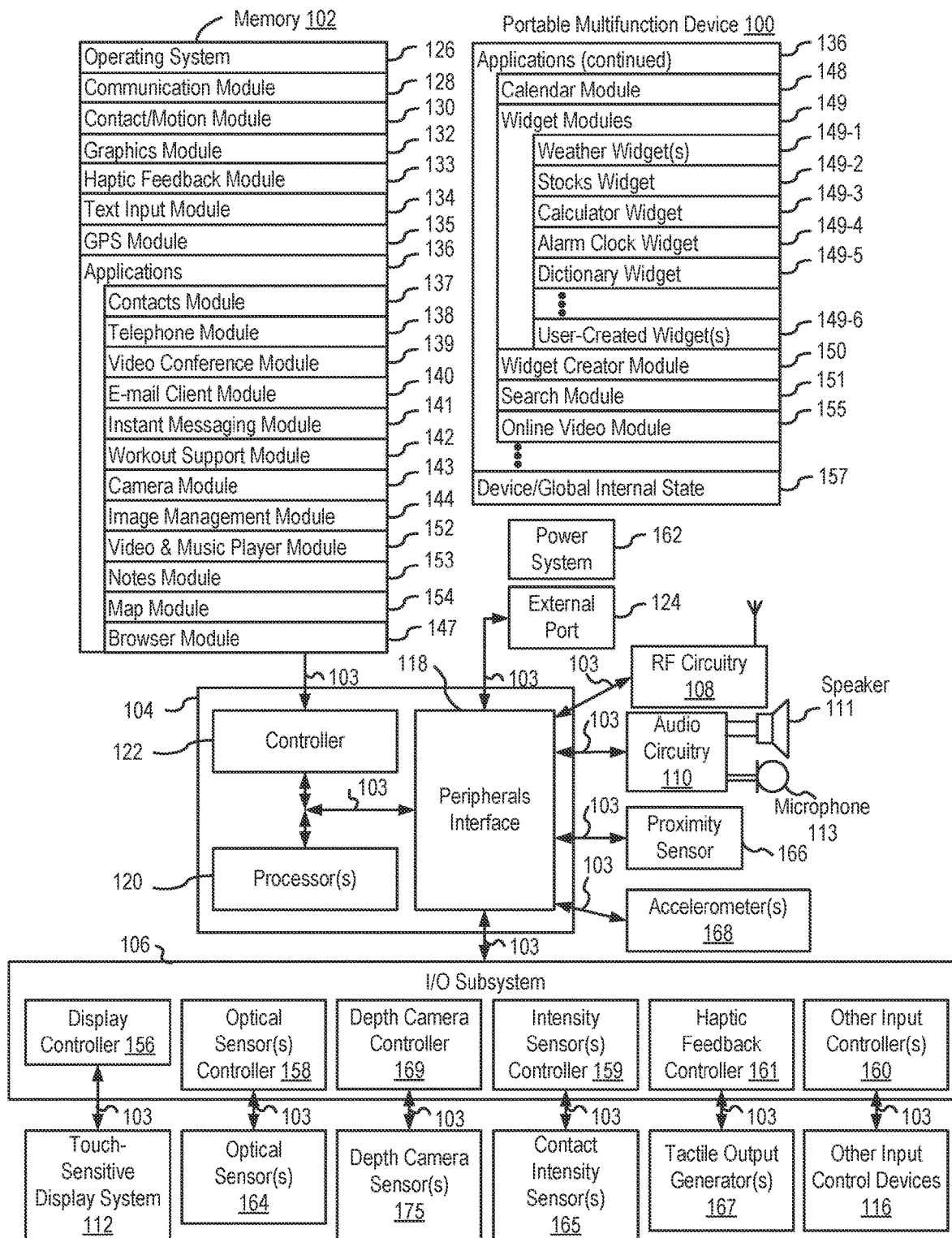
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
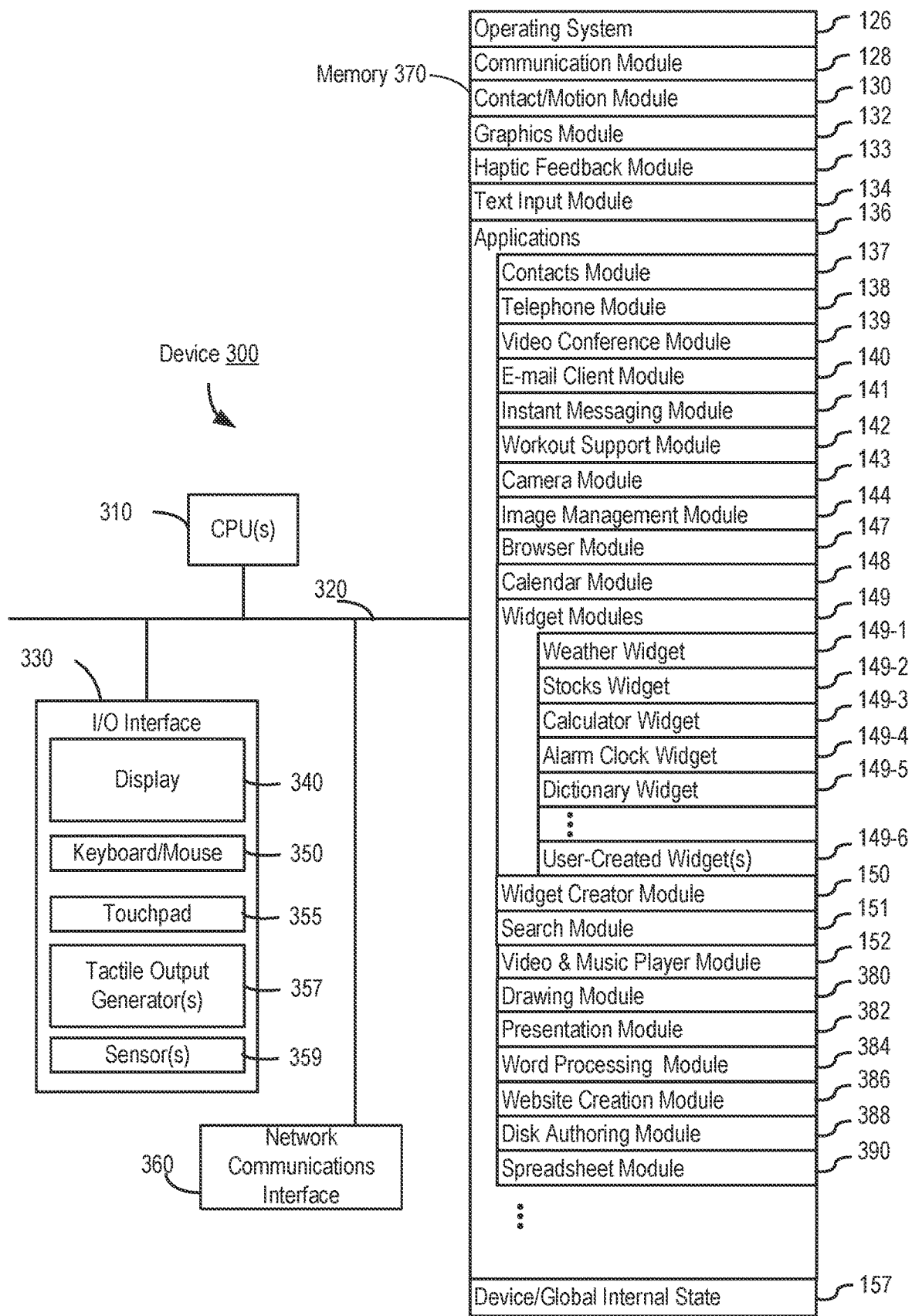
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
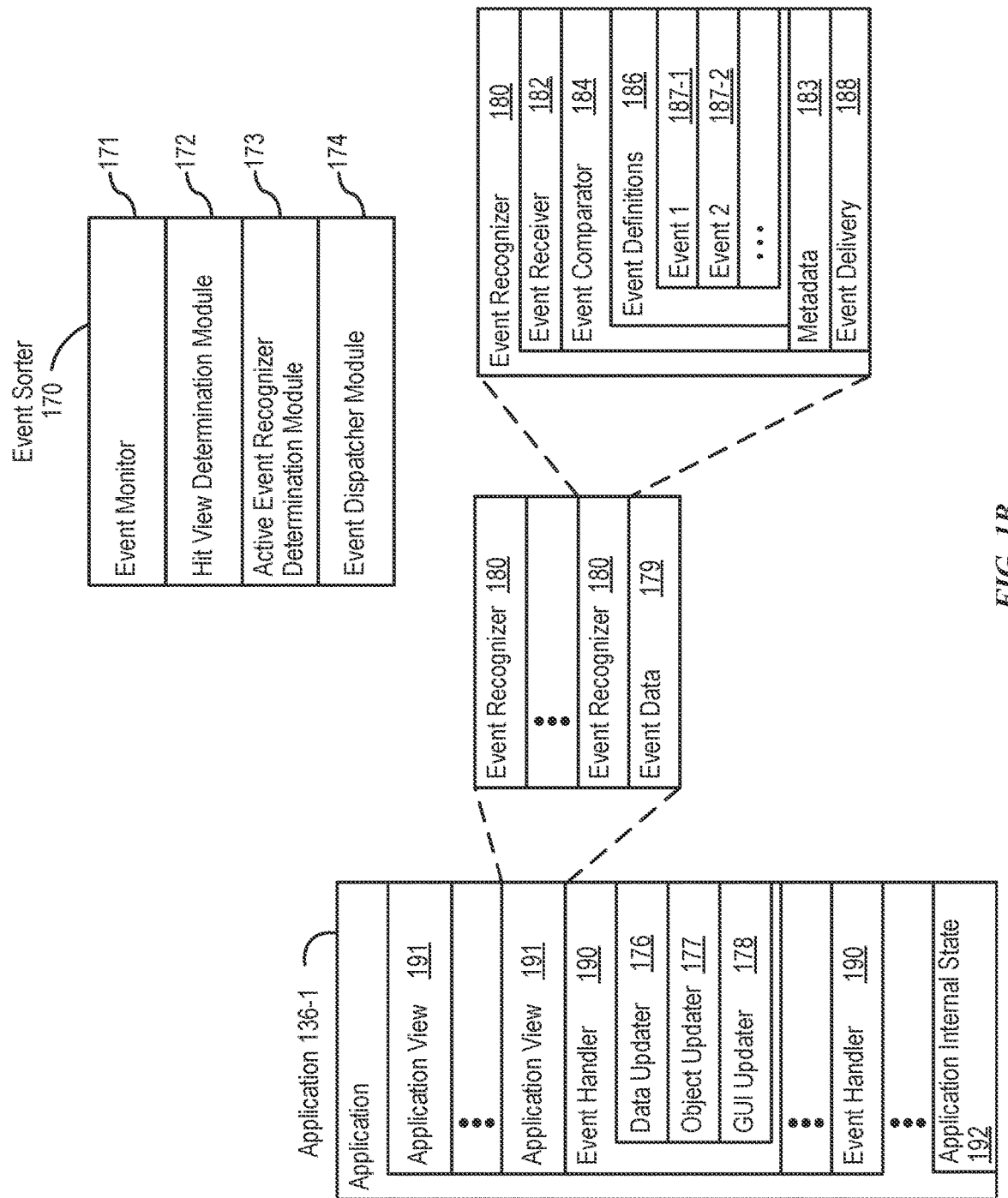
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
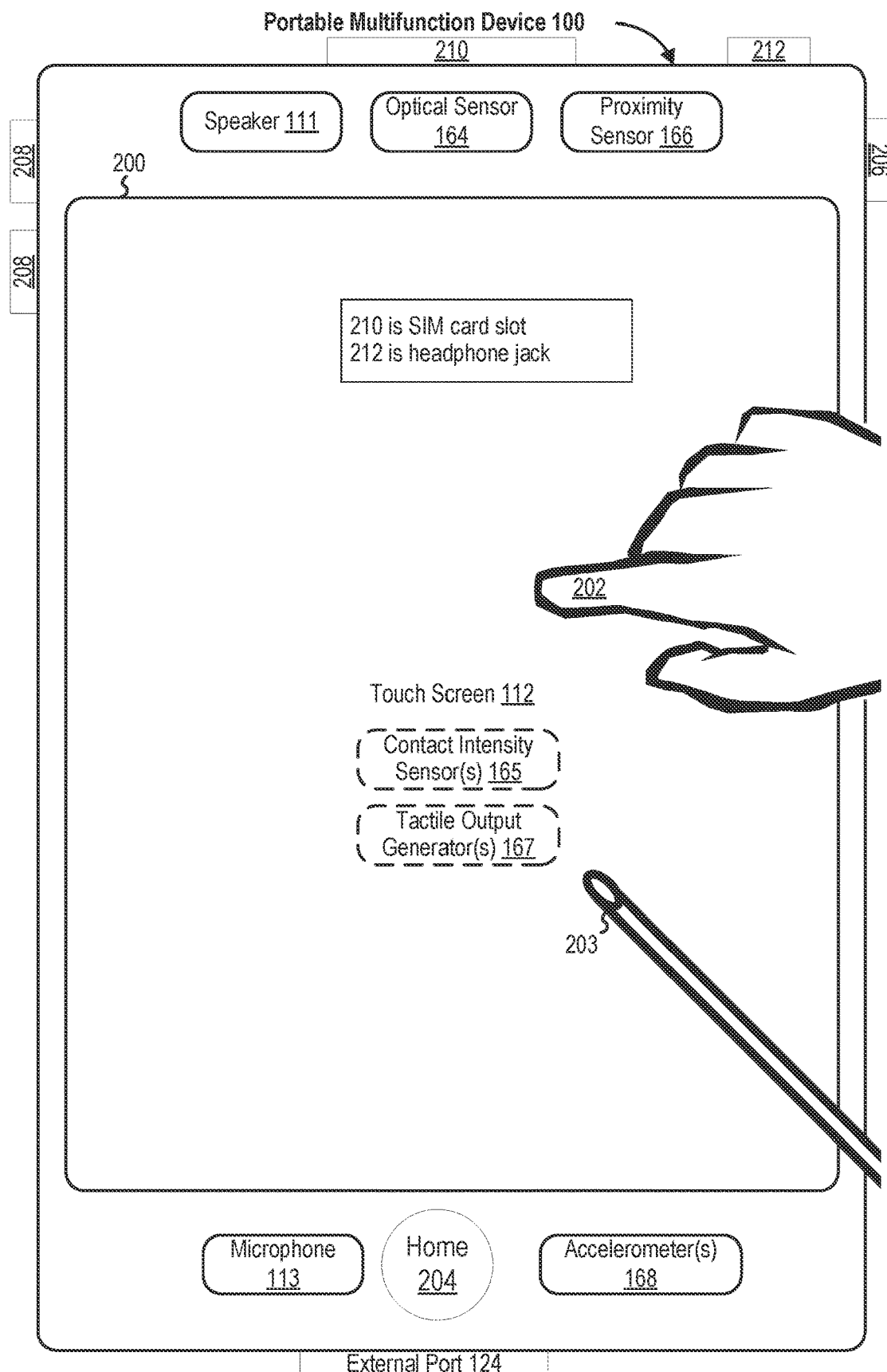
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
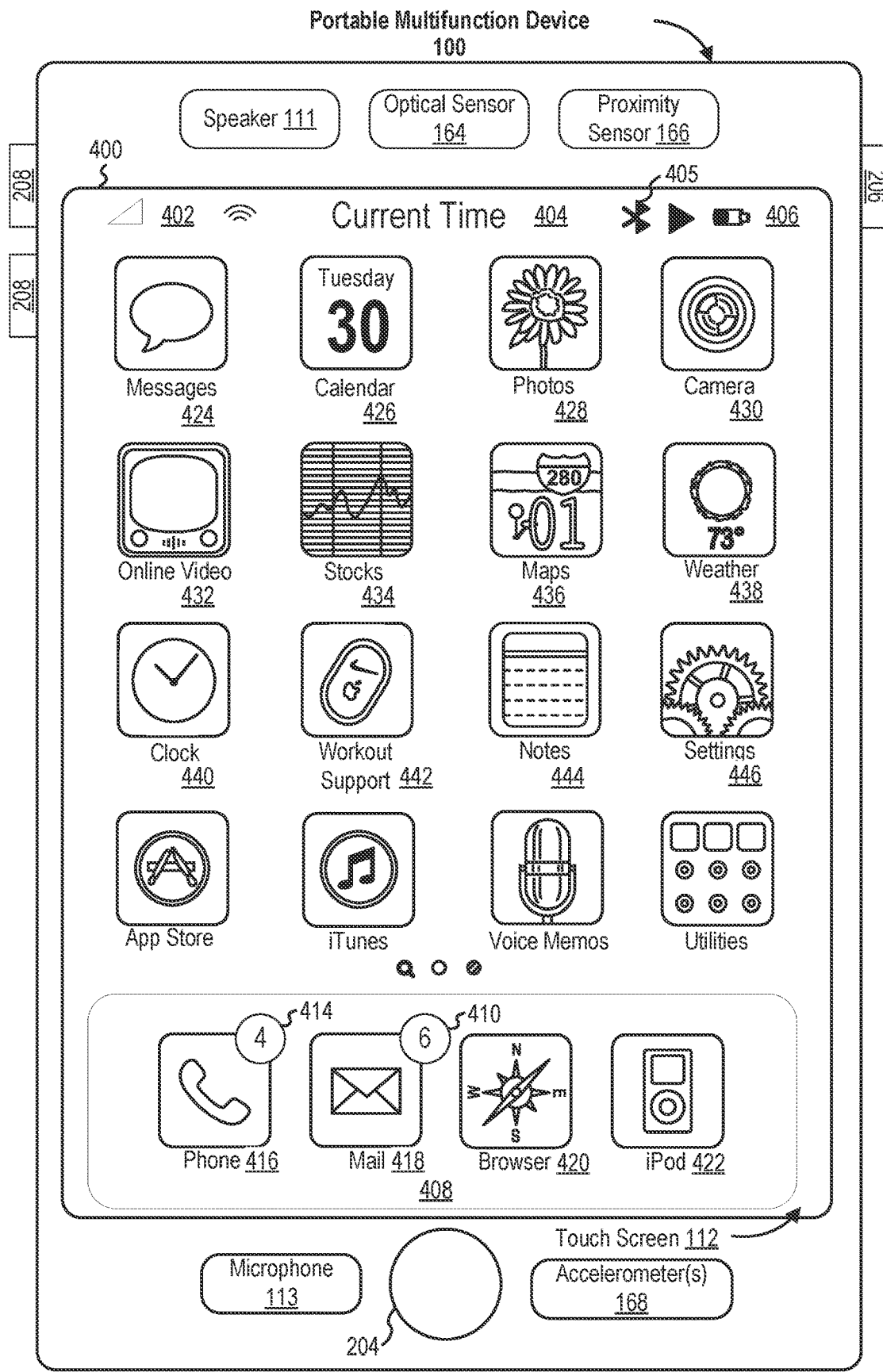
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
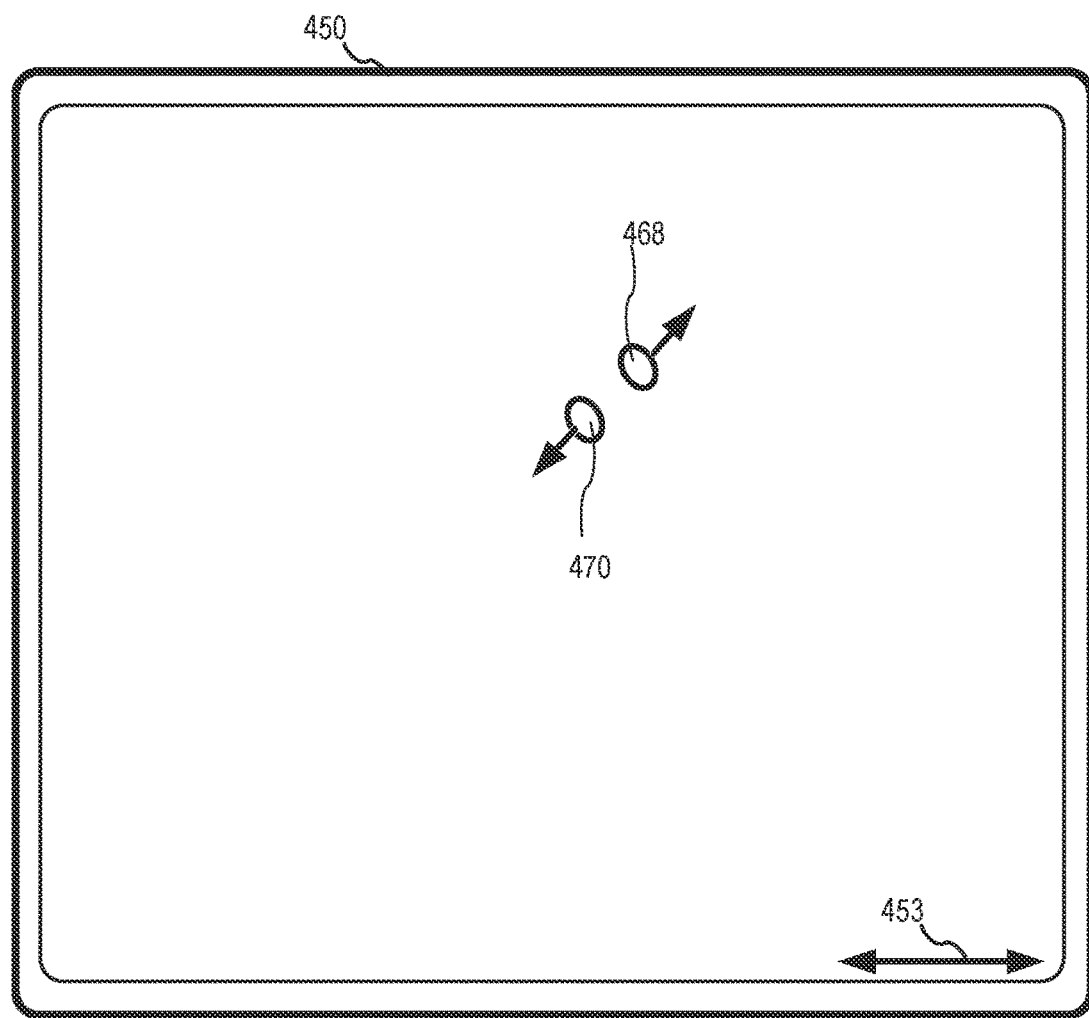
FIG. 4B illustrates an exemplary user interface for a multifunction device with a touch-sensitive surface that is separate from the display in accordance with some embodiments.
Figure 4B:
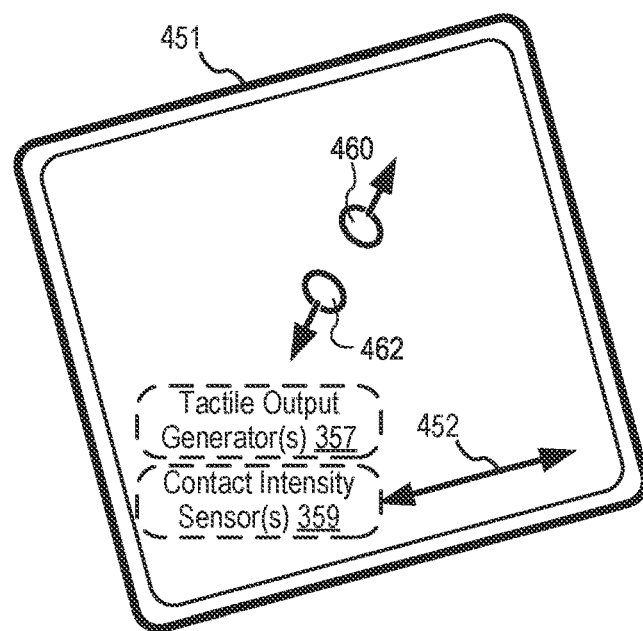

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
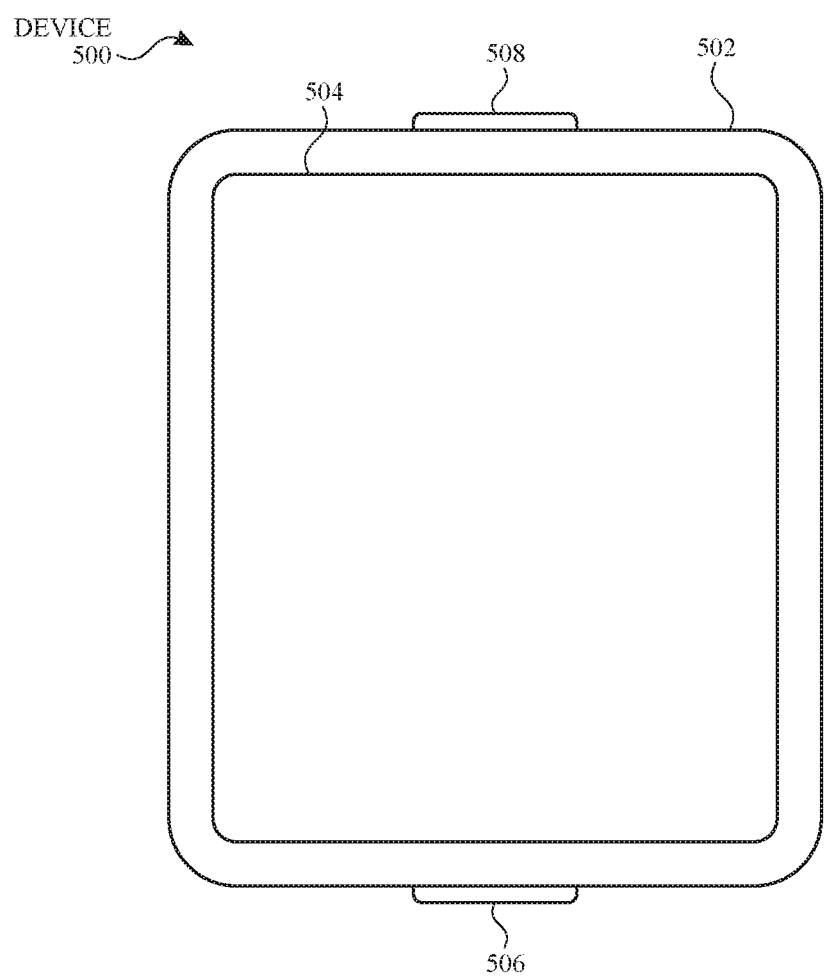
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
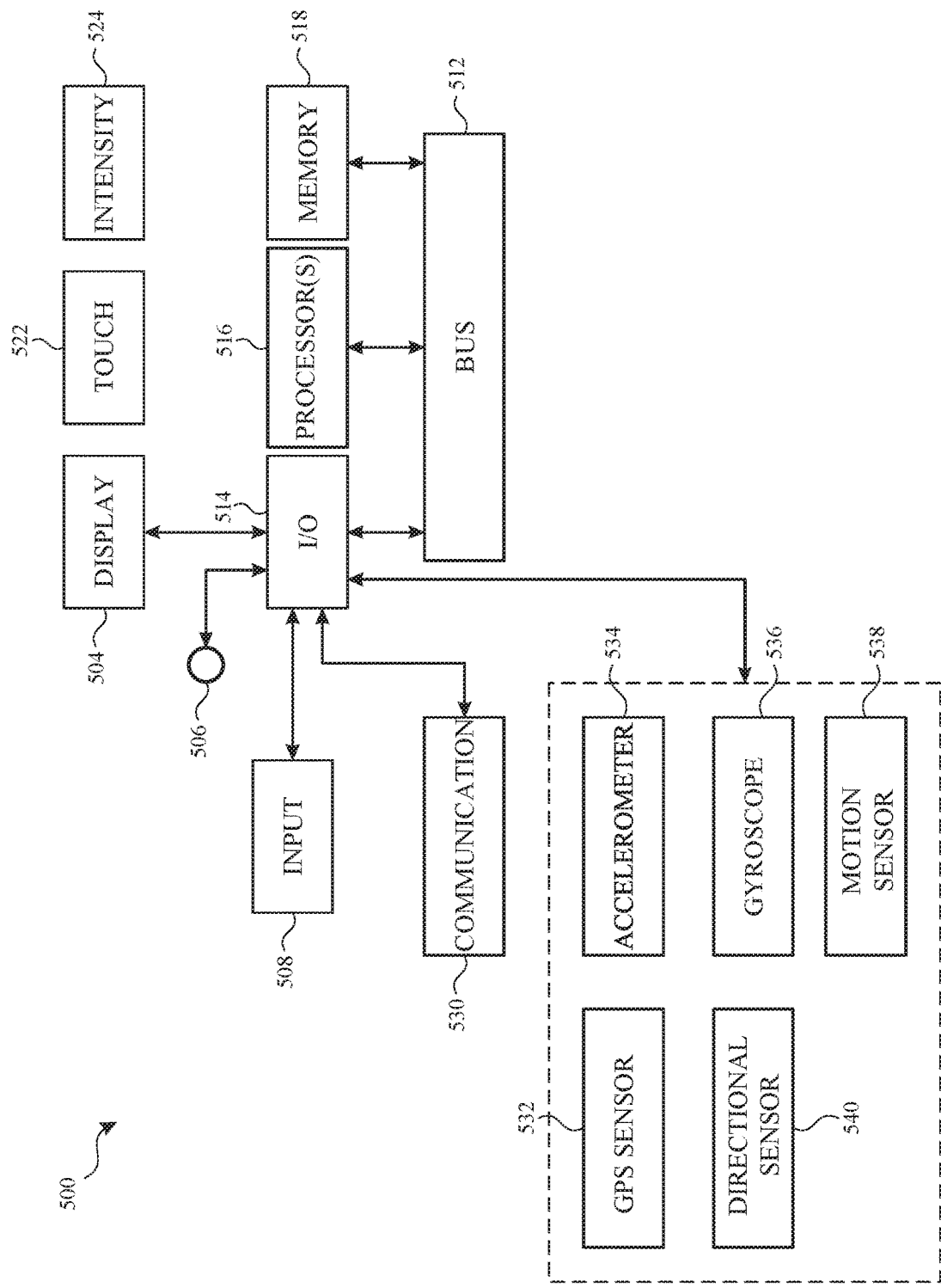
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for providing background sounds, in accordance with some embodiments. The user interfaces in these figures are used to illustrate the processes described below, including the processes in FIG. 7.

It will be appreciated that, for many users, everyday sounds can be distracting, discomforting, or overwhelming. Accordingly, exemplary user interfaces, such as those described herein, may be used to provide (e.g., play) background sounds to help minimize distractions and help such users focus, stay calm, or rest. In some embodiments, balanced, bright, or dark noise, as well as ocean, rain, or stream background sounds, may play (e.g., continuously play), for instance, in the background of a user's hearing to mask unwanted environmental or external noise. Additionally, such sounds can be mixed into or attenuated for other audio and system sounds.

FIG. 6A illustrates electronic device 600. In FIG. 6A, electronic device 600 is a portable multifunction device and has one or more components described above in relation to one or more of devices 100, 300, and 500.

In FIG. 6A, device 600 displays, on display 602, an audio settings interface 604. Audio settings interface 604 includes feature affordances 606a-e. In some embodiments, feature affordances 606a-e correspond to various audio-related functions of device 600. For example, feature affordance 606a corresponds to a headphone accommodation function, feature affordance 606b corresponds to a background sounds function, feature affordance 606c corresponds to a mono audio function, feature affordance 606d corresponds to a phone noise cancellation function, and feature affordance 606e corresponds to a headphones notification function.

In some embodiments, in response to selection of feature affordance 606b, device 600 displays a background sounds interface. In FIG. 6A, while displaying audio settings interface 604, device 600 detects selection of the feature affordance 606b. In FIG. 6A, the selection is a tap gesture 610 on feature affordance 606b. As shown in FIG. 6B, in response to detecting tap gesture 610, device 600 displays background sounds interface 620.

Background sounds interface 620 includes option 622, sound affordance 624, background sounds volume control 626, and concurrent volume control 628. In some embodiments, option 622 is used for toggling the use of background sounds on device 600. For example, in response to selection of option 622, device 600 toggles a state of option 622 (e.g., deactivates the option if activated, activates the option if deactivated). In FIG. 6B, in response to detecting a tap gesture 630 at option 622, device 600 deactivates the use of background sounds on device 600 and modifies the display of option 622 to indicate that the use of background sounds has been deactivated, as shown in FIG. 6C.

In some embodiments, sound affordance 624 is used to select a type of background sounds. For instance, in response to selection of sound type affordance 624, device 600 displays a sound selection interface. With reference to FIG. 6B, while displaying background sounds interface 620, device 600 detects selection of sound affordance 624. In FIG. 6B, the selection is a tap gesture 632 on sound affordance 624. As shown in FIG. 6D, in response to detecting tap gesture 632, device 600 displays sound selection interface 634.

In FIG. 6D, sound selection interface 634 includes candidate background sound affordances 636a-f, each of which corresponds to a respective type of background sounds. Candidate background sound affordance 636a corresponds to "balanced noise" background sounds, candidate background sound affordance 636b corresponds to "bright noise" background sounds, candidate background sound affordance 636c corresponds to "dark noise" background sounds, candidate background sound affordance 636d corresponds to "ocean" background sounds, candidate background sound affordance 636e corresponds to "rain" background sounds, and candidate background sound affordance 636f corresponds to "stream" background sounds.

In FIG. 6D, indicator 638 indicates that "bright noise" background sounds are currently selected on device 600. A user can, however, select a different background sound type by providing a user input corresponding to a selection of a candidate background sound affordance 636a-f. In FIG. 6D, while displaying the sound selection interface 634, device 600 detects user input 640 (e.g., tap) corresponding to a selection of candidate background sound affordance 636d. In response to user input 640, device 600 moves indicator 638 from candidate background sound affordance 636b, to candidate background sound affordance 636d. As a result, "ocean" background sounds are selected on device 600 and bright noise background sounds are not selected.

With reference back to FIG. 6B, background sounds volume control 626 includes slider 626*a*, which is used to adjust a volume level of background sounds provided by device 600. Concurrent volume control 628 includes option 628*a* and slider 628*b*. In some embodiments, option 628*a* is used for toggling whether background sounds are concurrently played with other audio provided by device 600, and slider 628*b* is used to adjust a volume level of background sounds when provided concurrently with other audio.

In some examples, when background sounds and other audio are provided concurrently, the volume level of the background sounds is adjusted according to both slider 626*a* and slider 628*b*. As an example, FIG. 6B illustrates slider 626*a* at a position corresponding to a volume level of "50", which corresponds to a volume level that is 50% of a maximum volume level, and slider 628*a* at a position corresponding to a volume level of "50". Accordingly, during concurrent playback of backgrounds and other audio, the volume level of background sounds is first adjusted (e.g., reduced) by 50% according to the position of slider 626*a* and then adjusted a second time by 50% according to the position of slider 628*b*, resulting in a volume level corresponding to "25", or 25% of a maximum volume level for background sounds.

In some embodiments, a volume level of background sounds is adjusted based on contextual information of device 600. Contextual information includes user-specific data stored on and/or accessible to device 600, as well as any information describing an operating state (time, day, week, whether device 600 is charging, whether device 600 is locked) or environment of device 600 (e.g., location, environmental noise). As an example, device 600 can play background sounds at different volumes based on a time of day. As another example, device 600 can play background sounds at a volume level commensurate with a volume level of environmental noise (e.g., external noise detected by device 600). In some embodiments, contextual information is used to adjust a volume level of backgrounds on the device 600 and/or a volume level of background sounds on the device 600 during concurrent playback with other audio.

In some embodiments, when option 628*a* is activated, device 600 can concurrently play background sounds with other audio provided by device 600. FIG. 6F illustrates an operation in which device 600 is playing background sounds while option 628*a* is activated. While playing the background sounds, device 600 detects user input 644 (e.g., tap) at play affordance 642. In response to the user input 644, device 600 determines that concurrent playback of background sounds and other audio is activated (by virtue of option 628*a* being activated) and initiates concurrent playback of background sounds and audiobook 646, as shown in FIG. 6G.

In some embodiments, when option 628*a* is deactivated, device 600 does not concurrently play background sounds with other audio provided by device 600. FIG. 6H illustrates an operation in which device 600 is playing background sounds while option 628*a* is deactivated. While playing background sounds, device 600 detects user input 648 (e.g., tap) at play affordance 642. In response to user input 648, device 600 determines that concurrent playback of background sounds and other audio is not permitted (by virtue of option 628*a* being deactivated), and as a result, ceases (e.g., stops, pauses) playing background sounds and plays audiobook 646, as shown in FIG. 6I.

As described, device 600 plays background sounds when a background sounds option is enabled. In some embodiments, device 600 is configured to play background sounds only when one or more additional conditions are met. As an example, device 600 can be configured to play background sounds only when a user of device 600 is determined to be wearing headphones. As another example, device 600 can be configured to forgo playing background sounds when a sound corresponding to an alert or alarm is detected near the user.

Figure 6J:
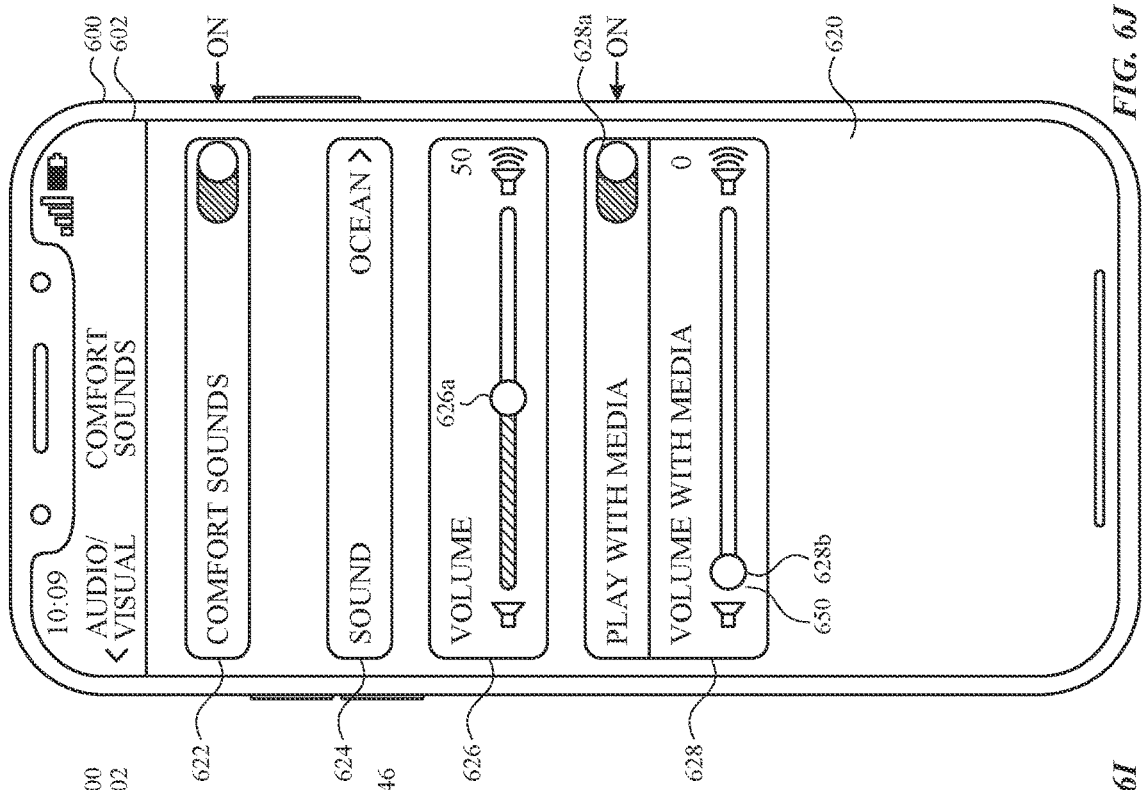
Figure 6I:
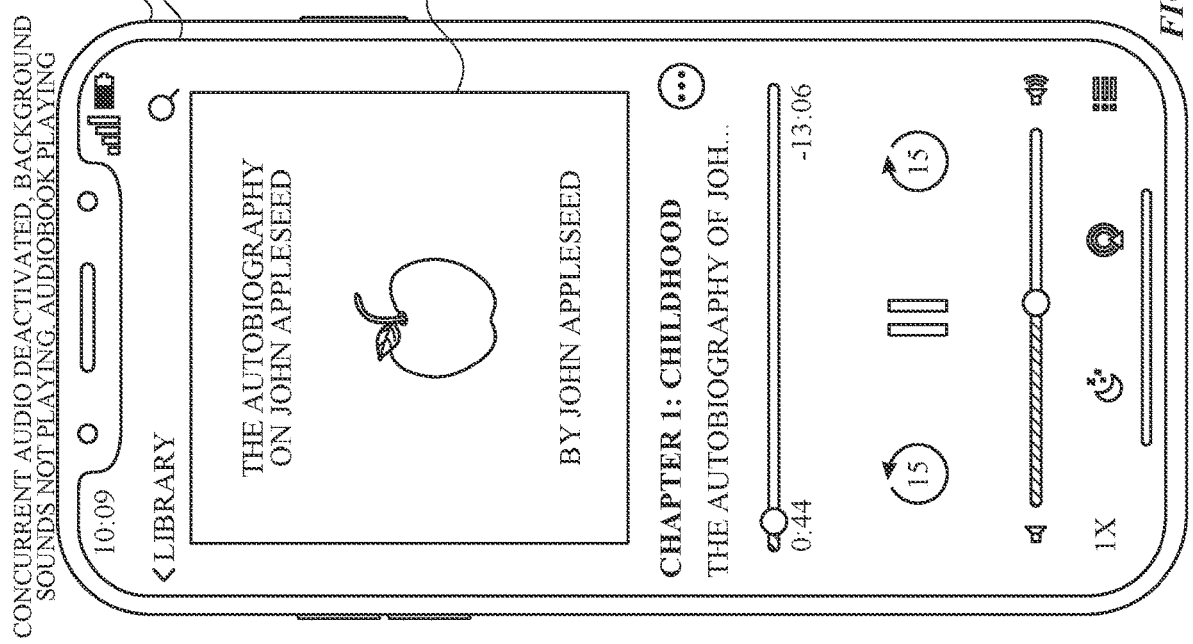

With reference to FIG. 6J, in some embodiments, slider 628*b* is located at position 650 such that the corresponding volume level of background sounds, when played with other media, is zero (e.g., slider 628*b* has a set magnitude of zero). In some embodiments, when slider 628*b* is located at position 650 (e.g., the volume level of background sounds during concurrent playback is zero), device 600 does not concurrently play background sounds (at zero volume) with other media, but rather pauses playback of the background sounds. When the other media is finished playing, device 600 resumes playback of the background sounds, for instance, from the point at which the background sounds were paused.

In some embodiments, device 600 provides (e.g., generates) background sounds in a random manner. As an example, device 600 can provide randomly selected segments of audio as background sounds. For instance, when playing "ocean" type background sounds, device 600 can provide (e.g., successively provide) randomly selected segments of ocean background sounds (thereby minimizing any perceived repetition of backgrounds by a user). As another example, device 600 can provide randomly arranged segments of audio as background sounds. For instance, when playing "balanced noise" type background sounds, device 600 can provide balanced noise audio with one or more randomly generated audio characteristics (e.g., randomized amplitude of one or more frequencies). In some embodiments, device 600 pauses and resumes playback of background sounds (e.g., when slider 628*a* is at position 650) even when background sounds are provided randomly.

Figure 6L:
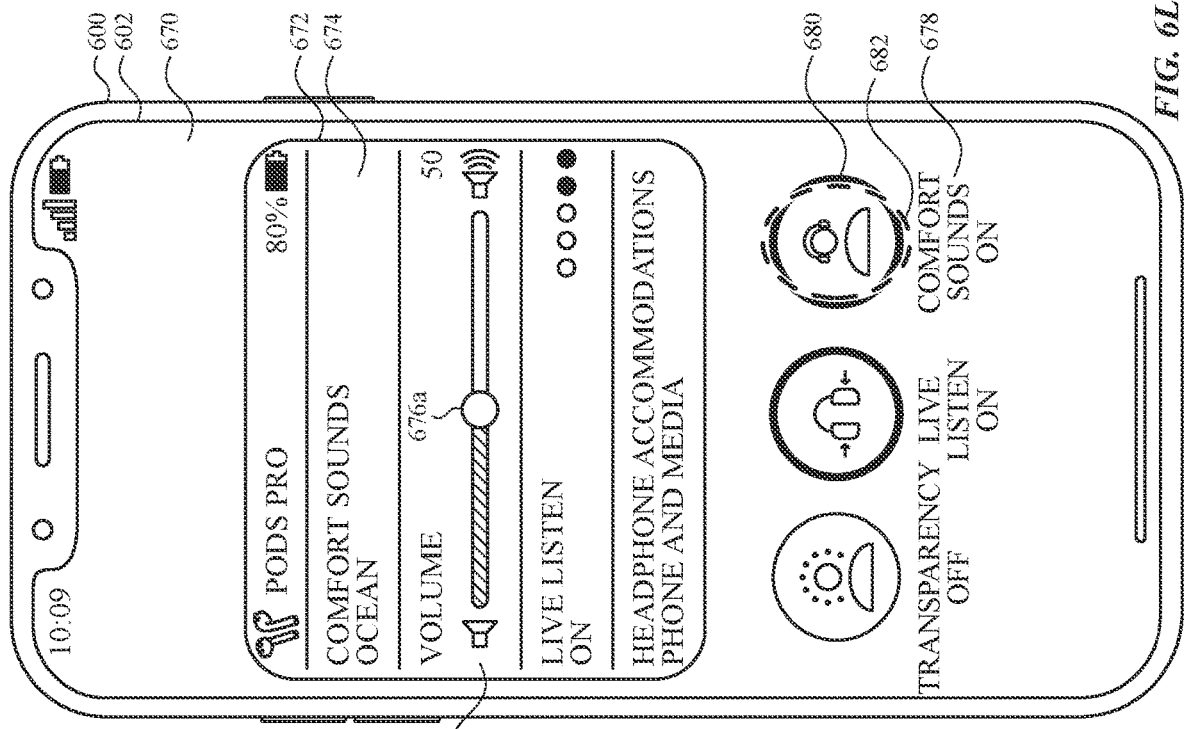
Figure 6K:
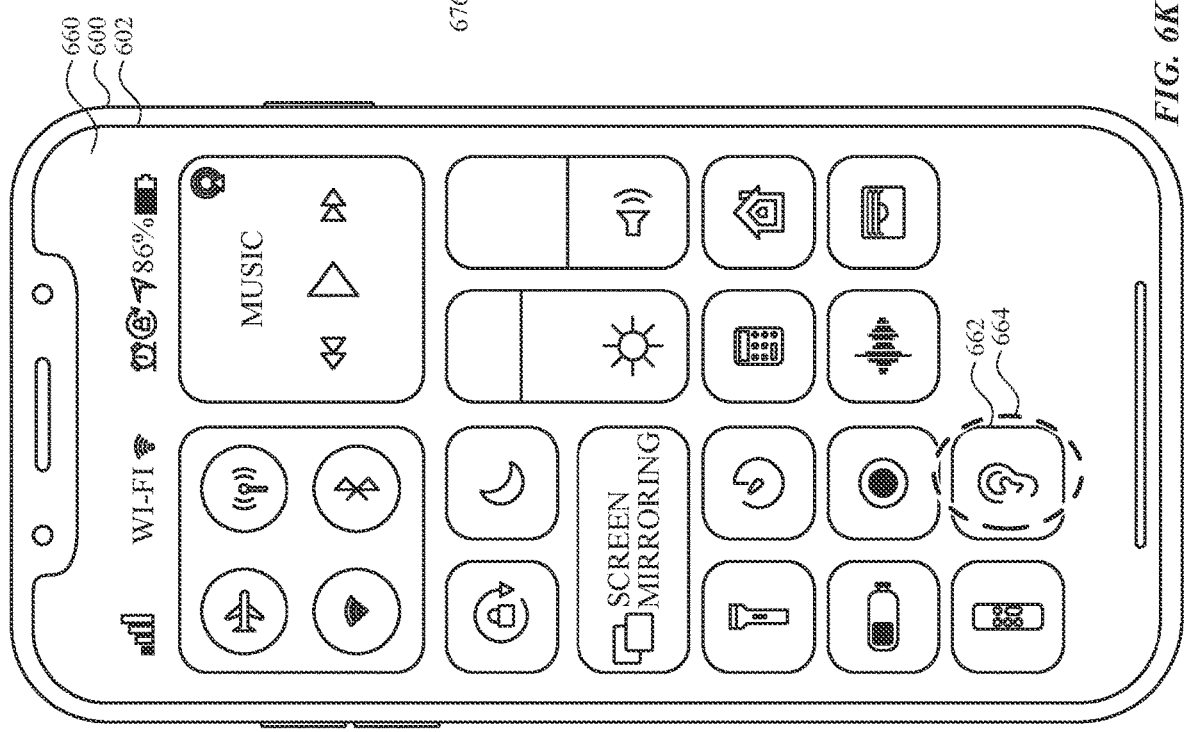

FIG. 6K illustrates an exemplary control center interface 660. In some embodiments, control center interface 660 is a user interface that can be displayed in response to a predetermined gesture (e.g., a swipe starting from the upper right edge of the display) received while most other user interfaces are being displayed. Control center interface 660 includes various affordances, including audio affordance 662, for controlling respective functions and/or components of device 600. In some examples, in response to selection of audio affordance 662, device 600 displays an audio interface. In FIG. 6K, while displaying control center interface 660, device 600 detects selection of audio affordance 662, a tap gesture 664 on audio affordance 662. As shown in FIG. 6L, in response to detecting tap gesture 664, device 600 displays audio interface 670.

Audio interface 670 includes region 672. Region 672 includes background sounds indicator 674 and volume control 676. Background sounds indicator 674 indicates whether background sounds are currently being provided by device 600, and if so, indicates a type of the background sounds provided (e.g., rain, ocean, stream). As shown in FIG. 6L, background sounds indicator 674 indicates that device 600 is currently playing "ocean" background sounds. Volume control 676 includes a volume slider 676*a*, which can be used to adjust a volume level of background sounds provided by device 600.

Audio interface 670 further includes status indicator 678 and option 680. Status indicator 678 indicates whether background sounds are currently playing on device 600. Option 680 is used for toggling playback of background sounds on device 600. For example, in response to selection of option 680, device 600 toggles a state of option 680 (e.g., deactivates the option if activated, activates the option if deactivated). As shown in FIG. 6M, for instance, in response to detecting a tap gesture 682 at option 680, device 600 deactivates playback of background sounds.

Further in response to detecting tap gesture 682, device 600 modifies one or more elements of audio interface 670 to indicate that background sounds have been deactivated. As an example, device 600 replaces indicator 674 with indicator 684, indicating that background sounds are currently "off". As another example, device 600 replaces indicator 678 with indicator 686, indicating that background sounds are currently "off". As yet another example, device 600 modifies the display of option 680 (e.g., removes bold focus).

FIG. 7 is a flow diagram illustrating a method for providing background sounds using a computer system in accordance with some embodiments. Method 700 is performed at a computer system (e.g., 100, 300, 500, 600) that is in communication with one or more input devices (e.g., 602). Some operations in method 700 are, optionally, combined, the orders of some operations are, optionally, changed, and some operations are, optionally, omitted.

As described below, method 700 provides an intuitive way for providing background sounds. The method reduces the cognitive burden on a user for selectively playing background sounds, for instance, during playback of other audio, thereby creating more efficient utilization of a computer system (e.g., computer system 100, 300, 500, 600). For battery-operated computer systems, enabling a user to more efficiently provide background sounds conserves power and increases the time between battery charges.

While playing an audio media item of a first type (e.g., sounds corresponding to 636a-f), the computer system receives (702), via the one or more input devices, a request (e.g., 644) to play an audio media item of a second type (e.g., 646). In some embodiments, audio media items of a first type are audio media items having no instrumental or vocal audio elements, such as noise (e.g., white noise) or nature sounds (e.g., ocean, rain, stream). In some embodiments, audio media items of the first type include randomly selected and/or arranged segments of audio. In some embodiments, audio media items of the first type are played at a volume level corresponding to a value of a background sounds volume feature. In some embodiments, the value of the background sounds volume feature is manually adjustable such that a user can selectively adjust the value of the background sounds volume feature, for instance, by adjusting a volume slider of a background sounds user interface. In some embodiments, the value of the background sounds volume feature is adjusted based on context of the computer system (e.g., environmental noise, user-specific data stored on the computer system (e.g., calendar, messages), proximity to other devices). In some embodiments, audio media items of a second type are audio media items including one or more instrumental and/or vocal audio elements, such as music, audio tracks for a video, audio books, or podcasts.

While playing an audio media item of a first type and in accordance with a determination that a set of concurrent audio criteria is satisfied, the computer system concurrently (e.g., simultaneously, coincidentally) plays (704) the audio media item of the first type (e.g., sounds corresponding to 636a-f) and the audio media item of the second type (e.g., 646). In some embodiments, the concurrent audio criteria includes a requirement that a concurrent playback feature (e.g., "play with media") is enabled on the computer system. In some embodiments, the concurrent playback feature is manually adjustable such that a user can selectively enable the concurrent playback feature, for instance, by toggling an affordance of a background sounds user interface. In some embodiments, the concurrent audio criteria includes a requirement that a value of a concurrent volume feature exceeds a threshold amount (e.g., zero). In some embodiments, the value of the concurrent volume feature is manually adjustable such that a user can selectively adjust the value of the concurrent volume feature, for instance, by adjusting a volume slider of a background sounds interface. In some embodiments, the volume level of the media item of the first type is determined according to both the magnitude of the background sounds volume feature and the magnitude of the concurrent volume feature. In some embodiments, the value of the concurrent volume feature is adjusted based on context of the computer system (e.g., environmental noise, user-specific data stored on the computer system (e.g., calendar, messages), proximity to other devices). In some embodiments, the computer system maintains playback of the audio media item of the first type. In some embodiments, the computer system restarts playback of the audio media item of the first type. In some embodiments, upon playing the audio media item of the second type, the computer system adjusts the volume of the audio media item of the first type, for instance, based on a magnitude of the background sounds volume feature and/or a magnitude of the concurrent volume feature.

While playing an audio media item of a first type and in accordance (706) with a determination that the set of concurrent audio criteria is not satisfied (e.g., the concurrent playback feature is disabled and/or the value of the concurrent volume feature does not exceed a threshold amount), the computer system ceases (708) (e.g., pauses) to play the audio media item of the first type.

While playing an audio media item of a first type and in accordance (706) with a determination that the set of concurrent audio criteria is not satisfied, the computer system plays (710) the audio media item of the second type. In some embodiments, when the computer system ceases playing the audio media item of the second type, the computer system resumes playing the media item of the first type. Concurrently playing a media item of a first type and a media item of a second type when a concurrent playback feature is enabled and ceasing to play the audio media of the first type while playing the audio media of the second type when the concurrent playback feature is disabled allows a user to quickly and efficiently control the manner in which concurrent playback of media items is implemented, which reduces the number of inputs needed to perform an operation.

In some embodiments, the audio media item of the first type includes audio selected from the group consisting of environmental sounds (e.g., sounds corresponding to 636d-f) (e.g., natural sounds (e.g., ocean, rain, and/or stream sounds); non-manmade sounds), irregular noise (e.g., sounds corresponding to 636a-c) (e.g., random noise (white noise, bright noise, balanced noise, dark noise)), and a combination thereof. In some embodiments, the media item of the first type does not contain speech/vocals or instrumental music/audio.

In some embodiments, the audio media item of the first type includes audio selected from the group consisting of randomly selected segments of audio, randomly arranged segments of audio, and a combination thereof. In some embodiments, the audio media item of the first type, or background sound, includes randomly selected and/or arranged segments of audio such that the audio is not repetitive or predicable for a user. In some embodiments, one or more auditory characteristics of the audio media item is adjusted such that transitions between segments of audio appear seamless.

In some embodiments, the set of concurrent audio criteria includes a criterion that is satisfied when a determination is made that a concurrent playback feature (e.g., 628*a*) (e.g., a concurrent playback setting that enables concurrent playback of audio of the first and second types) is active (e.g., enabled, been activated). In some embodiments, the concurrent playback feature is activated in response to toggling a corresponding option or affordance of a concurrent audio interface to an "on" state. In some embodiments, concurrent audio criteria is met when a further determination is made that a concurrent volume feature has a magnitude exceeding a predetermined threshold (e.g., a threshold of zero). Including a criterion in a set of concurrent audio criteria that is satisfied when a determination is made that a concurrent media feature is active allows for media items of a first type and media items of a second type to be selectively played concurrently based on whether the concurrent media feature is enabled, which performs an operation when a set of conditions has been met without requiring further user input.

In some embodiments, the concurrent playback feature (e.g., 628*a*) is manually configurable. In some embodiments, the concurrent playback feature can be activated (e.g., enabled) or deactivated (e.g., disabled) by user input that toggles a corresponding option or affordance of a background sounds interface to an "on" state or "off state", respectively; In some embodiments, the concurrent playback feature can be activated or deactivated by adjusting the magnitude of a concurrent volume feature; In some embodiments, the concurrent playback feature is activated when the magnitude of the concurrent volume feature exceeds a threshold magnitude (e.g., zero) and is deactivated when the magnitude of the concurrent volume feature does not exceed the threshold magnitude). Using a manually configurable concurrent playback feature allows a user to quickly and efficiently control the manner in which concurrent playback of media items is implemented, which reduces the number of inputs needed to perform an operation.

In some embodiments, concurrently playing the audio media item of the first type and the audio media item of the second type comprises adjusting a magnitude of a volume level of the audio media item of the first type from an initial volume to an adjusted volume based on a magnitude of a concurrent volume feature (e.g., 628*b*) (e.g., a concurrent volume setting that regulates the volume of the audio media item of the first time when concurrent playback occurs. In some embodiments, the magnitude of the concurrent volume feature is adjusted using a volume slider displayed in a background sounds interface.

In some embodiments, the set of concurrent audio criteria includes a criterion that is satisfied when a determination is made that a magnitude of a second concurrent volume feature (e.g., 628*b*) (e.g., a concurrent volume setting that regulates the volume of the audio media item of the first time when concurrent playback occurs; a feature that is the same or different than the concurrent volume feature) exceeds a threshold magnitude (e.g., 650). In some embodiments, concurrent playback of the first and second media items occurs when the magnitude of the concurrent volume feature exceeds a threshold magnitude (e.g., zero) and is deactivated when the magnitude of the concurrent volume feature does not exceed the threshold magnitude; In some embodiments, when the magnitude of the concurrent volume feature does not exceed the threshold magnitude, playback of the media item of the first type is paused during playback of the media item of the second type, and optionally, resumes when playback of the media item of the second type ceases.

In some embodiments, the computer system adjusts, based on contextual information, a magnitude of at least one of a background sounds volume feature (e.g., 626*a*) for adjusting a volume level of the media item of the first type and a third concurrent volume feature (e.g., 628*b*) for adjusting a volume level of the media item of the first type when the media item of the first type is concurrently played with the media item of the second type. In some embodiments, a volume level of the audio media item of the first type is adjusted based on contextual information, for instance, of the computer system. Contextual information includes user-specific data stored on and/or accessible to the computer system (e.g., user calendar), a location of the computer system, a current time (e.g., time, day, week, month). In some embodiments, contextual information further includes environmental noise detected by the computer system and/or proximity of the computer system to one or more other computer systems and/or devices. In some embodiments, additionally or alternatively, a volume level of second media item is adjusted based on contextual information. In some embodiments, because a volume level of the first media item is adjusted accordingly to a background sounds volume feature and/or a concurrent volume feature, a magnitude of a background sounds volume feature is adjusted based on contextual information and a magnitude of a concurrent volume feature is adjusted based on contextual information. Adjusting a magnitude of a volume level based on contextual information allows for an intuitive and efficient automated adjustment of volume, which performs an operation when a set of conditions has been met without requiring further user input.

In some embodiments, playing the audio media item of the first type includes, in accordance with a determination that the computer system is in a first context state (e.g., based on contextual information about the computer system), playing the audio media item of the first type with first audio content (e.g., sounds corresponding to 636*a-f*), and, in accordance with a determination that the computer system is in a first context state, playing the audio media item of the first type with second audio content, different than the first audio content. In some embodiments, the first and/or second audio content are selected based on contextual information about the computer system. In some embodiments, the content of the first audio media is generated based on a time of day; as an example, tonality of the first audio media item may be adjusted based on the time of day. In some embodiments, content of the first audio media item is adjusted based on a proximity of the computer system to one or more other computer systems and/or devices. Playing audio media items based on a context state of a computer system allows for an improved technique for selecting background sound content, which performs an operation when a set of conditions has been met without requiring further user input.

In some embodiments, the computer system is further in communication with a display generation component (e.g., 602). In some embodiments, the computer system displays, via the display generation component, a first user interface (e.g., 620). In some embodiments, the first user interface includes a background sounds user-interactive graphical user interface object (e.g., 622) (e.g., affordance) that, when selected, enables playback of the audio media item of the first type when a determination is made that a set of playback criteria are met. In some embodiments, the background sounds affordance is used to selectively enable playback of media items of the first type on the computer system. In some embodiments, the background sounds interface includes a setting for adjusting volume of the media item of the first type. In some embodiments, the first user interface includes an option for selectively enabling concurrent playback of media items of the first type and media items of the second type. In some embodiments, the first user interface includes a setting for adjusting volume of playback of media items of the first type when concurrently played with media items of the second type. In some embodiments, the set of playback criteria include a criterion that is met when external speakers (e.g., wired or wireless headphones) are connected to the computer system). In some embodiments, the first user interface (e.g., 620) includes a first audio content user-interactive graphical user interface object (e.g., 624) that, when selected, causes display of a second user interface (e.g., 634). In some embodiments, the second user interface includes a second audio content user-interactive graphical user interface object (e.g., 636a-f) that, when selected, causes third audio content (e.g., background noise; ocean sounds; rain sounds; stream sounds) to be included in the audio media item of the first type during playback and a third audio content user-interactive graphical user interface object (e.g., 636a-f) that, when selected, causes fourth audio content (e.g., background noise; ocean sounds; rain sounds; stream sounds; content), different from the third audio content, to be included in the audio media item of the first type during playback.

In some embodiments, the computer system detects, via the one or more input devices, a first input (e.g., 630) (e.g., a tap, a mouse click, a key press) corresponding to the background sounds user-interactive graphical user interface object (e.g., 622). In some embodiments, in response to detecting the first input, the computer system enables (e.g., a modifying a setting of the computer system) playback of the audio media item of the first type when a determination is made that the set of playback criteria are met.

In some embodiments, while the computer system is enabled to playback the audio media item of the first type, when a determination is made that the set of playback criteria are met, the computer system plays the audio media item of a first type.

In some embodiments, while displaying the second user interface, the computer system detects, via the one or more input devices, a second input (e.g., 640) (e.g., a tap, a mouse click, a key press). In some embodiments, while displaying the second user interface, in response to detecting the second input and in accordance with a determination that the second input corresponds to the second audio content user-interactive graphical user interface object (e.g., 636a-f), the computer system configures the computer system to include the third audio content in the audio media item of the first type during playback (e.g., subsequent playback).

In some embodiments, while displaying the second user interface, in response to detecting the second input and in accordance with a determination that the second input corresponds to the third audio content user-interactive graphical user interface object (e.g., 636a-f), the computer system configures the computer system to include the fourth audio content in the audio media item of the first type during playback (e.g., subsequent playback).

In some embodiments, the computer system displays, via the display generation component, a fourth user interface (e.g., 670) including a background sounds status indicator (e.g., 622, 674), a volume user-interactive graphical user interface object (e.g., 626a, 676a), and a background sounds enable user-interactive graphical user interface object (e.g., 622, 680). In some embodiments, the computer system detects via the one or more input devices, a third input (e.g., 630, 682) (e.g., a tap, a mouse click, a key press, a swipe gesture). In some embodiments, in accordance with a determination that the third input corresponds to a swipe gesture (e.g., leftward swipe gesture, rightward swipe gesture) at a location corresponding to the volume user-interactive graphical user interface object (e.g., volume slider), the computer system adjusts a volume level of the media item of the first type from a second initial volume to a second adjusted volume based on a direction and magnitude of the swipe gesture. In some embodiments, the control center user interface includes a volume slider which can be used to adjust the volume of media items of the first type. In some embodiments, adjusting the volume level in this manner, is analogous to adjusting a volume level of a background audio volume feature of a background sounds interface of a settings menu. In some embodiments, in accordance with a determination that the third input corresponds to a selection of the background sounds enable user-interactive graphical user interface object (e.g., 630, 682), the computer system selectively activates (e.g., activating or deactivating) a background sounds feature. In some embodiments, in accordance with a determination that the third input corresponds to a selection of the background sounds enable user-interactive graphical user interface object, the computer system modifies a visual characteristic of the background sounds status indicator (e.g., 622, 680). In some embodiments, when the background sounds feature is deactivated, the background sounds status indicator is modified to indicate that backgrounds sounds are "off". In some embodiments, when the background sounds feature is activated, the background sounds status indicator is modified to indicate that background sounds are enabled. In some embodiments, the background sounds status indicator is modified to indicate a type of background sounds.

Note that details of the processes described above with respect to method 700 (e.g., FIG. 7) are also applicable in an analogous manner to the methods described below. For example, methods 900, 1100 optionally includes one or more of the characteristics of the various methods described above with reference to method 700. For example, while playing an audio media item of a first type (e.g., background sounds), a user can use auditory controls to initiate playback of an audio media item of a second type, at which time the computer system determines whether to concurrently play the media items. For brevity, these details are not repeated below.

FIGS. 8A-8V illustrate exemplary user interfaces for providing auditory controls, in accordance with some embodiments. The user interfaces in these figures are used to illustrate the processes described below, including the processes in FIG. 9.

In some implementations, exemplary user interfaces are used to provide sound actions for switch control. This may allow users, such as users who are non-speaking and/or have limited mobility, to invoke actions by providing speech inputs including sounds corresponding to the actions, (e.g., a click, pop, or "ee" sound) rather than with physical buttons, switches, and verbal commands.

In FIG. 8A, device 600 displays, on display 602, an accessibility interface 804. The accessibility interface 804 includes various affordances, including switch control affordance 806, for controlling various accessibility functions of device 800.

In some examples, in response to selection of switch control affordance 806, device 600 displays a switch control interface. In FIG. 8A, while displaying accessibility interface 804, device 600 detects selection of switch control affordance 806, a tap gesture 808 on switch control affordance 806. As shown in FIG. 8B, in response to detecting tap gesture 808, device 600 displays switch control interface 810.

Switch control interface 810 includes option 812 and switch setup affordance 814. In some embodiments, option 812 is used for toggling the use of switch control on device 800. In some embodiments, switch control, when implemented on device 800, enables, on device 800, the use of any number of switches for controlling one or functions. A "switch" corresponds to an input of a particular type and an action that is performed by the device 600 in response to receiving the input. Switches can be used to associate actions with any number of input types, including but not limited to, inputs from external devices (e.g., Bluetooth devices), touch inputs (e.g., single taps, double taps, triple taps), gestures (hand gestures, head gestures), sounds, and the like.

In response to selection of option 812, device 600 toggles a state of option 812 (e.g., deactivates the option if activated, activates the option if deactivated). In FIG. 8B, in response to detecting a tap gesture 816 at option 812, device 600 activates switch control on device 600 and modifies the display of option 812 to indicate that switch control has been activated, as shown in FIG. 8C.

In FIG. 8C, switch setup affordance 814 includes indicator 814a, which indicates a number of switches configured on device 800. In response to selection of switch setup affordance 814, device 600 displays a switch setup interface (e.g., as seen in FIG. 8D). By way of example, while displaying switch control interface 810, device 600 detects selection of switch setup affordance 814. In some examples, the selection is a tap gesture 816 on switch setup affordance 814. As shown in FIG. 8D, in response to detecting tap gesture 808, device 600 displays switch setup interface 820.

Switch setup interface 820 includes switch affordances 821a-c and add switch affordance 822. Each switch affordance 821a-c corresponds to a respective switch configured on device 800, and accordingly is indicative of a pairing between an action and a type of input. For instance, switch affordance 821a corresponds to a switch for a sound "oo" (e.g., of a speech input) and a "move right" action, switch affordance 821b corresponds to a switch for a screen tap and a "move right" action, and switch affordance 821c corresponds to a switch for a sound "eh" (e.g., of a speech input) and a "move left" action.

Figure 8F:
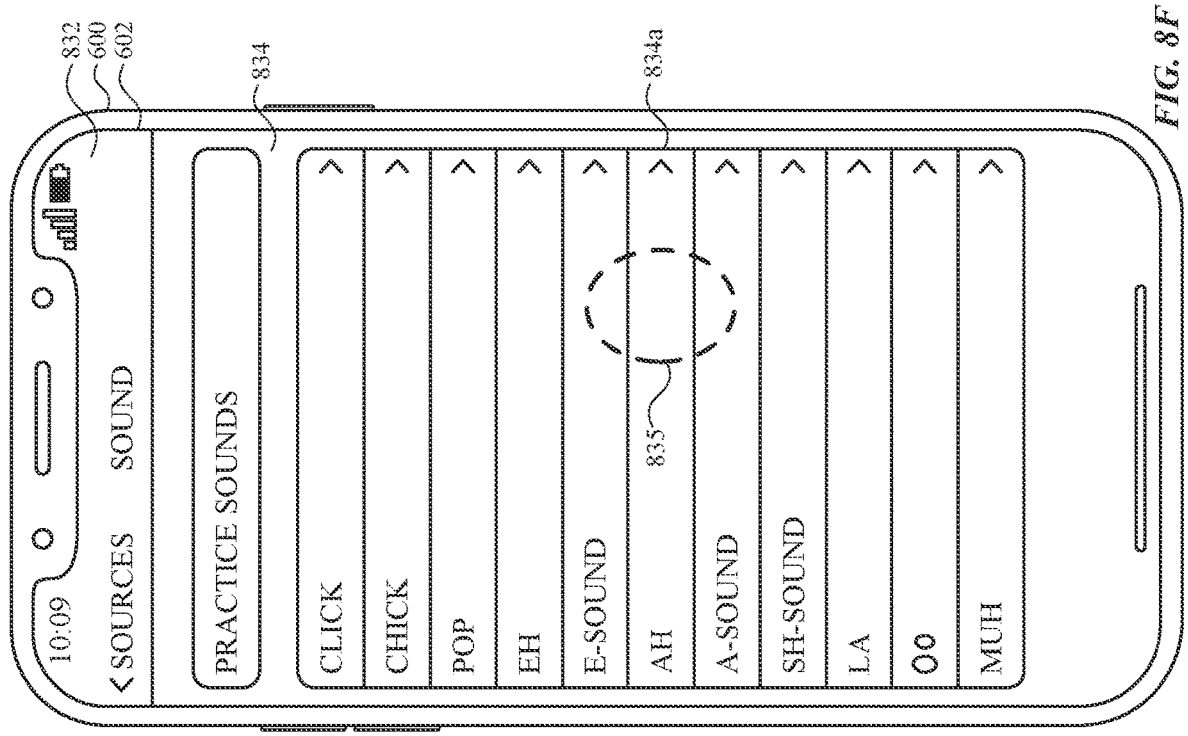
Figure 8E:
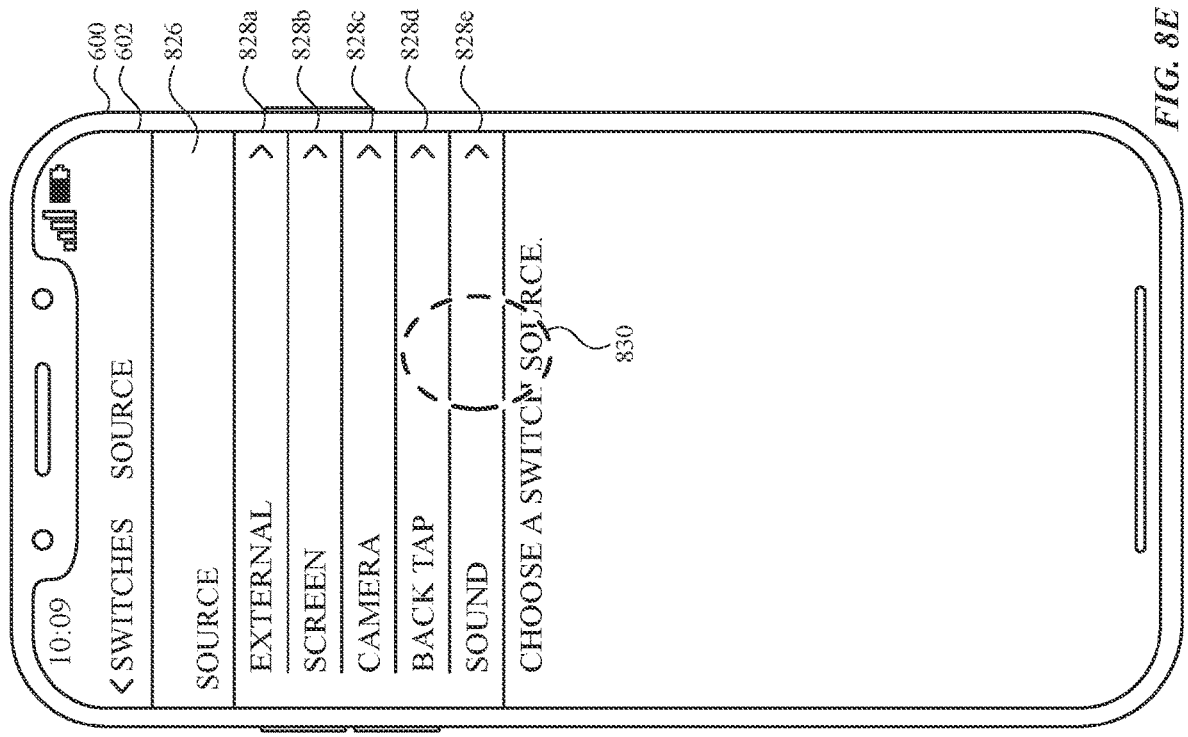

In some embodiments, in response to selection of add switch affordance 822, device 600 initiates a process for adding a switch to (e.g., configuring a switch on) device 800. By way of example, while displaying switch setup interface 820, device 600 detects selection of add switch affordance 822. In FIG. 8D, the selection is a tap gesture 824 on add switch affordance 822. As shown in FIG. 8E, in response to detecting tap gesture 824, device 600 displays source selection interface 826.

Source selection interface 826 includes source affordances 828a-e. Each source affordance of source affordances 828a-e corresponds to a set of input types that can be associated with a respective action. For example, source affordance 828a corresponds to external inputs (e.g., inputs provided by another device), source affordance 828b corresponds to screen inputs (e.g., tap input on display 802), source affordance 828c corresponds to camera inputs (e.g., recognition by a camera of device 600 of particular user gestures), source affordance 828d corresponds to back tap inputs (e.g., tap input on a backside of a chassis of device 800), and source affordance 828e corresponds to sounds (e.g., voiced sounds, phonemes).

In some embodiments, a user can select a source affordance 828a-e and subsequently select an input type for a switch. For instance, in response to selection of a source affordance 828a-e, device 600 displays an input selection interface. By way of example, while displaying source selection interface 826, device 600 detects selection of source affordance 828e. In FIG. 8E, the selection is a tap gesture 830 on source affordance 828e. As shown in FIG. 8F, in response to detecting tap gesture 830, device 600 displays input selection interface 832.

Input selection interface 832 includes a plurality of candidate sounds 834 (recall that selected source affordance 828e corresponded to sound inputs), such as candidate sound 834a. While displaying input selection interface 820, device 600 detects selection of candidate sound 834a, corresponding to an "ah" sound. In FIG. 8F, the selection is a tap gesture 835 on candidate sound 834a. As shown in FIG. 8G, in response to detecting tap gesture 835, device 600 displays action selection interface 836.

Action selection interface 836 includes candidate actions 837, such as candidate action 837a. While displaying action selection interface 836, device 600 detects selection of candidate sound 837a, corresponding to a "select item" action. In FIG. 8G, the selection is a tap gesture 838 on candidate sound 837a.

In response to selection tap gesture 838, device 600 provides a switch with candidate sound 834a ("ah") associated with candidate action 837a ("select item"). As a result, device 600 is configured such that, in response to detecting an input including the sound "ah", device 600 performs the action "select item". Further in response to detecting tap gesture 838, device 600 displays switch control interface 810. As shown in FIG. 8H, indicator 814a is modified to reflect the updated number of switches configured on device 800.

In FIG. 8I, input selection interface 820 further includes a practice affordance 839. In some embodiments, in response to selection of practice affordance 839, device 600 displays a sound practice interface. By way of example, while displaying input selection interface 820, device 600 detects selection of practice affordance 840. In FIG. 8I, the selection is a tap gesture 840 on practice affordance 839. As shown in FIG. 8J, in response to detecting tap gesture 840, device 600 displays sound practice interface 841.

Sound practice interface 840 includes live preview 846 and candidate sounds 848. In operation, while displaying practice interface 840, device 600 receives, using an audio input device (e.g., microphone) of device 800, a speech input from a user. In some embodiments, while receiving the speech input, device 600 provides a live preview of the speech input, such as live preview 846. As shown in FIG. 8K, live preview 846 is a visual waveform indicative of one or more auditory characteristics of the speech input. In some embodiments, device 600 prompts a user to provide a speech input (e.g., "Listening for sound").

In some embodiments, sound practice interface 840 can be used to assist users in practicing the pronunciation of various sounds. Accordingly, upon receiving speech input 850 ("oo") of FIG. 8K, device 600 determines whether speech input 850 includes a sound that corresponds to (e.g., matches) a candidate sound 848. If speech input 850 is determined to correspond to a candidate sound 848, device 600 indicates that a matching sound was received and, optionally, highlights the matching candidate sound. As shown in FIG. 8L, for instance, device 600 replaces display of live preview 846 with indicator 851 indicating that a match was found ("Great") and further bolds the matching sound (e.g., bolds candidate sound 848g corresponding to the sound "oo"). If a speech input is determined to not include a sound matching a candidate sound 848, device 800, optionally, provides a notification that the speech input does not include a sound matching a candidate sound.

In some embodiments, a user can select a specific candidate sound to practice pronunciation of the candidate sound. With reference to FIG. 8M, while displaying practice interface 840, device 600 detects selection of candidate sound 848a ("eh"), a tap gesture 852 on candidate sound input 848a. As shown in FIG. 8N, in response to detecting tap gesture 852, device 600 displays learn affordance 854, which can be selected to allow a user to practice pronunciation of candidate sound 848a, as described with respect to FIGS. 8O-8Q. In some embodiments, selection of candidate sound 848a causes device 600 to audibly provide (e.g., output) candidate sound 848a.

With reference to FIG. 8N, while displaying practice sounds interface 840, device 600 detects selection of learn affordance 854, a tap gesture 856 on learn affordance 854. As shown in FIG. 8O, in response to detecting tap gesture 856, device 600 displays learn interface 860 for candidate sound 848a.

Learn interface 860 includes live preview 862, sound indicator 864, sound description 866 and play affordance 868. Sound indicator 864 indicates a current sound of the learn affordance (e.g., the sound "eh" corresponding to selected candidate sound 848a). Selection of the play affordance 868 causes device 600 to provide (e.g., output) the sound indicated by sound indicator 864 (e.g., "eh").

In some embodiments, while displaying learn interface 860, device 600 receives a speech input from a user. In some examples, while receiving the speech input, device 600 provides live preview 862 of the speech input. In some embodiments, in response to receiving the speech input, device 600 determines, and indicates, whether the speech input includes a sound matching the sound of learn interface 860.

In some embodiments, learn interface 860 provides information regarding the manner in which one or more sounds may be pronounced. Sound description 866, for instance, includes information describing the manner in which a user can pronounce an "eh" sound. In some embodiments, sound description 866 exceeds a display area of device 800, and additional portions of sound input description 866 are displayed in response to one or more inputs (e.g., swipe gesture 860), as shown in FIGS. 8O-8P.

In some embodiments, a user may wish to learn about a different sound than the current sound of learn interface 860, for instance, without having to select a different sound using practice sounds interface 840. Accordingly, in some embodiments, device 600 changes the current sound of learn interface 860 in response to an input (e.g., swipe gesture). With reference to FIG. 8Q, while displaying learn interface 860, device 600 detects a swipe gesture (e.g., horizontal swipe gesture), such as swipe gesture 872. In response to swipe gesture 872, device 600 changes a current sound of learn interface 860 from "eh" to an "E-sound". In some embodiments, changing a sound in this manner includes replacing indicator 864 and sound description 866, with indicator 874 and sound description 876 respectively, as shown in FIG. 8R. Indicator 874 indicates that the current is an "E-sound" and sound description 876 describes the manner in which a user can pronounce an "E-sound".

Figure 8T:
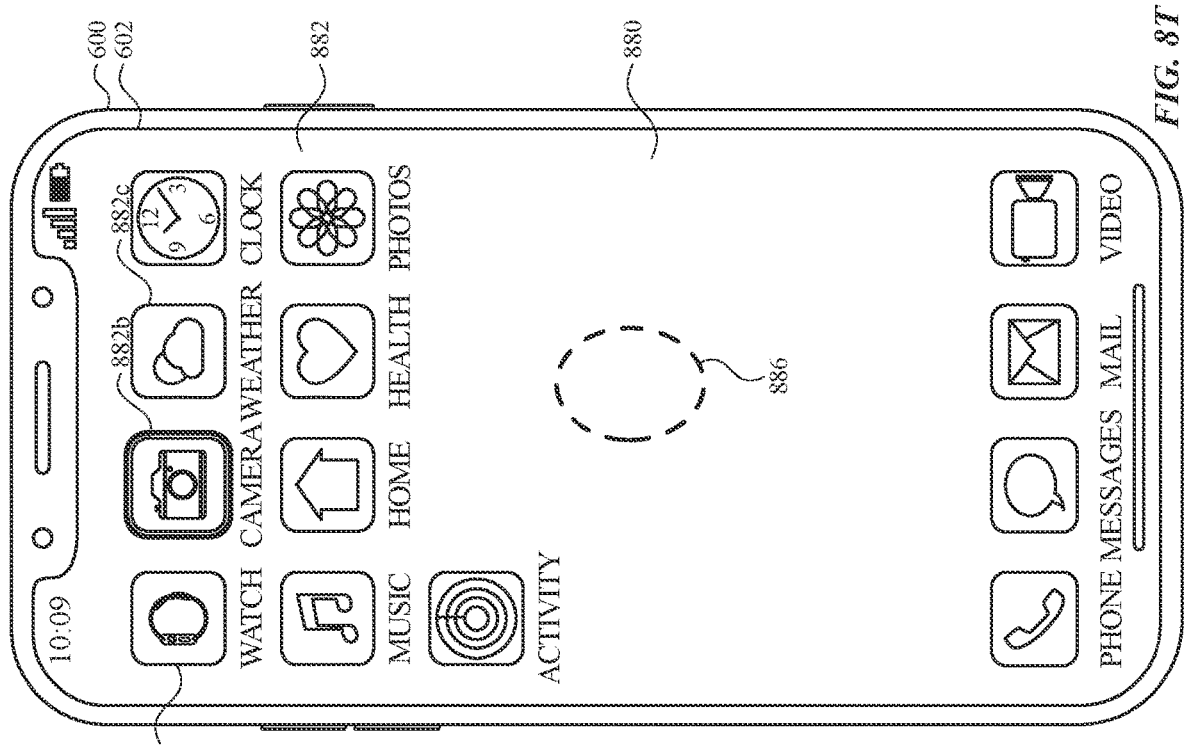
Figure 8S:
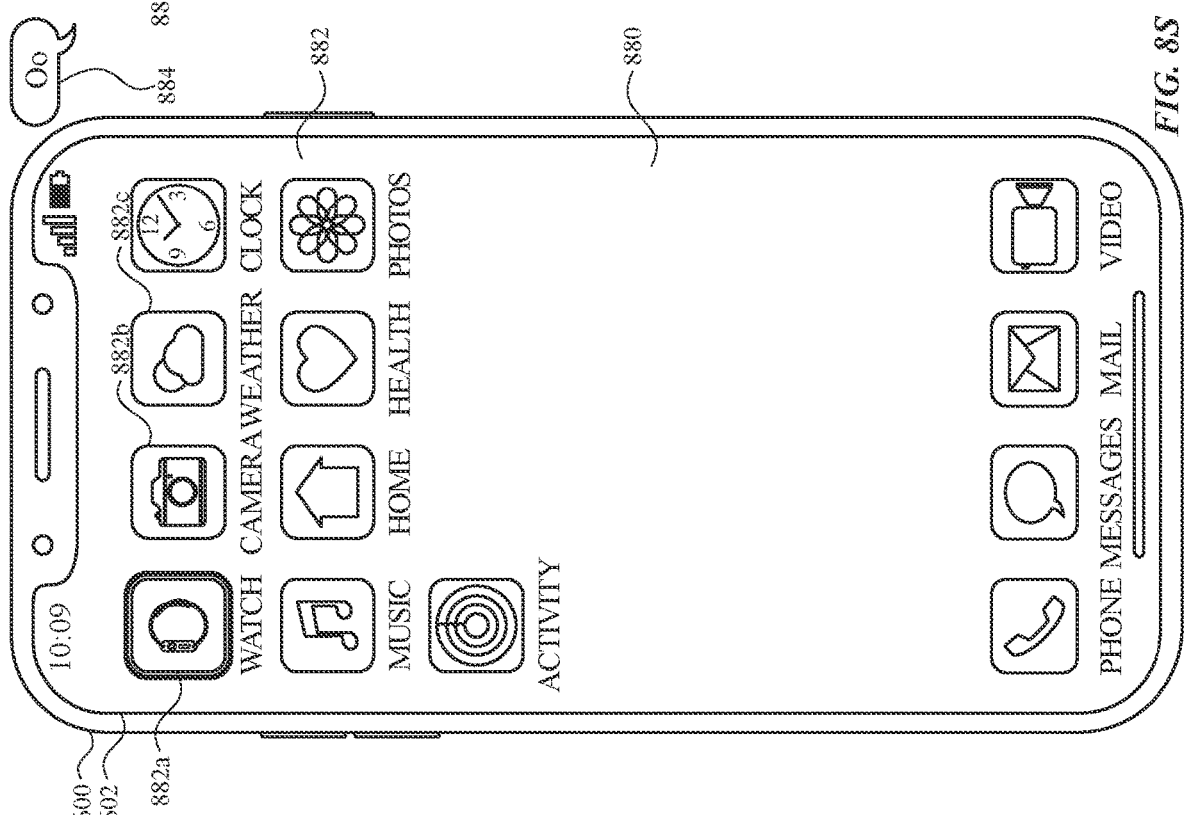

FIGS. 8S-8V illustrate an example operation of device 600 using switch control. In FIG. 8S, device 600 displays a home screen interface 880. Home screen interface 880 includes a variety of application affordances 882 (e.g., application affordances 882a-c), which when selected cause device 600 to execute (e.g., initiate execution of, continue execution of) an application corresponding to the selected application affordance. As shown in FIG. 8S, home screen interface 880 is displayed with a focus on application affordance 882a, as indicated by the bolding around application affordance 882a.

While device 600 displays home screen interface 880 with a focus on application affordance 882a, device 600 receives speech input 884 including a sound "oo". As shown in FIG. 8T, in response to receiving speech input 884, device 600 moves a focus of home screen interface 880 from application affordance 882a to application affordance 882b (recall that a switch of device 600 corresponds the sound "oo" with a "move right" action).

Thereafter, device 600 detects an input on display 802, such as tap input 886. As shown in FIG. 8U, in response to receiving tap input 886, device 600 moves a focus of home screen interface 880 from application affordance 882b to application affordance 882c (recall, from FIG. 8D, that a switch of device 600 corresponds a tap input with a "move right" action).

Thereafter, device 600 receives an input, such as speech input 888 ("eh"). As shown in FIG. 8V, in response to receiving speech input 888, device 600 moves a focus of home screen interface 880 from application affordance 882c to application affordance 882b (recall, from FIG. 8D, that a switch of device 600 corresponds the sound "eh" with a "move left" action).

FIG. 9 is a flow diagram illustrating a method for providing auditory controls using a computer system in accordance with some embodiments. Method 900 is performed at a computer system (e.g., 100, 300, 500, 600) that is in communication with a display generation component and one or more input devices. Some operations in method 900 are, optionally, combined, the orders of some operations are, optionally, changed, and some operations are, optionally, omitted.

As described below, method 900 provides an intuitive way for providing auditory controls. The method reduces the cognitive burden on a user for providing auditory controls, thereby creating a more efficient human-machine interface. For battery-operated computing devices, enabling a user to provide auditory controls faster and more efficiently conserves power and increases the time between battery charges.

While displaying, via the display generation component (e.g., 602), a user interface (e.g., 880) including a set of user interface objects (e.g., 882), the computer system (e.g., 800) receives (902), via the one or more input devices, a first speech input (e.g., 884) associated with a first predetermined action. In some embodiments, the computer system displays a user interface including the set of user interface objects. In some embodiments, the set of user interface objects includes one or more affordances and/or other objects that can be used to navigate and/or interact with the computer system. In some embodiments, the speech input is a phrase or word. In some embodiments, the speech input is a recognized speech sound and, optionally be a voiced sound ("eh", "ah"). In some embodiments, a user may select a sound from a list of candidate predetermined sounds to associate the selected sound with a particular action. In some embodiments, other types of inputs (non-speech inputs, such as touch inputs or gesture inputs) may also be associated with actions. In some embodiments, predetermined actions include actions for navigating and/or interacting with the computer system; by way of example, predetermined actions include actions for navigating user interfaces displayed by the computing system, such as "select", "move to next", "move to previous", "deselect"; as another example, predetermined actions include actions for controlling various system features, such as "increase volume", "decrease volume", or "go to settings".

In response (904) to receiving the first speech input and in accordance with a determination that a first user interface object (e.g., 882*a*) of the set of user interface objects is currently selected (e.g., highlighted, in focus), the computer system performs (906) the first predetermined action based on the first user interface object. In some embodiments, only a single user interface object of the set of user interface objects is selected at any given time. In some embodiments, performing an action based on a user interface object includes performing the predetermined action based on a relative location of the object in a user interface; if, for instance, the predetermined action is "move to next", the computing system deselects the first user interface object and select a user interface object determined to be "next". In some embodiments, performing an action based on a user interface object includes performing the action on the first user interface object (e.g., deleting the object in response to a request to "delete").

In response (904) to receiving the first speech input and in accordance with a determination that a second user interface object (e.g., 882*b*) of the set of user interface objects is currently selected (and optionally, that the first user interface object is not selected), the computer system performs (908) the first predetermined action based on the second user interface object. In some embodiments, without being based on the first object, without regard to the first object. Performing a predetermined action based on a first user interface object and performing the predetermined action based on the second user interface object allows a user to quickly and efficiently control the manner a computer system operates, which reduces the number of inputs needed to perform an operation.

In some embodiments, the speech input (e.g., 884) is a first sound (e.g., sound corresponding to 848*g*) of a plurality of predetermined sounds (e.g., sounds corresponding to 848*a-h*). In some embodiments, the speech input is a phrase or word. In some embodiments, the speech input is a recognized sound and/or may be a voiced sound ("eh", "ah"). In some embodiments, the sound is selected from a list of candidate predetermined sounds and associates with a particular action such that subsequent detection of the sounds causes the computer system to perform the particular action.

In some embodiments, the plurality of predetermined sounds includes a second sound (e.g., 848*a*) that is associated with a second predetermined action, different from the first predetermined action. In some embodiments, while displaying, via the display generation component, the user interface (e.g., 880), the computer system receives, via the one or more input devices, a second speech input (e.g., 888) that is determined to include (e.g., that is determined to be) the second sound (e.g., sound corresponding to 848*a*). In some embodiments, the speech input is a phrase or word. In some embodiments, the speech input is a recognized speech sound and may be a voiced sound ("eh", "ah"). In some embodiments, a user selects a sound from a list of candidate predetermined sounds to associate the selected sound with a particular action. In some embodiments, other types of inputs (non-speech inputs, such as touch inputs or gesture inputs) are also associated with actions. In some embodiments, predetermined actions include actions for navigating and/or interacting with the computer system; by way of example, predetermined actions include actions for navigating user interfaces displayed by the computing system, such as "select", "move to next", "move to previous", "deselect"; as another example, predetermined actions include actions for controlling various system features, such as "increase volume", "decrease volume", or "go to settings").

In some embodiments, in response to the second speech input and in accordance with a determination that the first user interface object of the set of user interface objects is currently selected, the computer system performs the second predetermined action based on the first user interface object. In some embodiments, performing an action based on a user interface object includes performing the predetermined action based on a relative location of the object in a user interface; if, for instance, the predetermined action is "move to next", the computing system deselects the first user interface object and select a user interface object determined to be "next". In some embodiments, performing an action based on a user interface object includes performing the action on the first user interface object (e.g., deleting the object in response to a request to "delete").

In some embodiments, in response to the second speech input and in accordance with a determination that a second user interface object of the set of user interface objects is currently selected. In some embodiments, and that the first user interface object is not selected), the computer system performs the second predetermined action based on the second user interface object. In some embodiments, without being based on the first object, without regard to the first object. Performing a predetermined action based on a first user interface object and performing a predetermined action based on the second user interface object allows for further improved control over the manner in which a computer system operates, which reduces the number of inputs needed to perform an operation.

In some embodiments, the computer system displays, via the display generation component, a second user interface (e.g., 820) (e.g., a switch interface including switch affordances illustrating associations between input types and actions) that includes a first action graphical user interface object (e.g., 821*a*) that is indicative of an association between the first sound and the first predetermined action. In some embodiments, the switch interface includes one or more indicators illustrating an association between sound type inputs and actions. In some embodiments, the first action graphical user interface object is a user-interactive object (e.g., an affordance) that is selectable to modify one or more settings associated with the first sound and/or the first predetermined action.

In some embodiments, the computer system displays, via the display generation component, a second user interface (e.g., 820) (e.g., a switch interface including switch affordances illustrating associations between input types and actions) that includes a second action graphical user interface object (e.g., 821*c*) that is indicative of an association between the second sound and the second predetermined action. In some embodiments, the computer system displays an interface including an affordance for each "switch" configured on the computer system. In some embodiments, a switch represents a pairing of an input of a particular type and an action that can be performed by the computer system. In some embodiments, each switch corresponds an input type to an action such that providing an input of the input type causes the computer system to perform the corresponding action. In some embodiments, a same input type cannot correspond to multiple switches. In some embodiments, inputs assigned to actions are selected from a predetermined set of actions. In some embodiments, the predetermined set of actions includes a set of predetermined sounds. In some embodiments, once a type of input has been assigned to an action, the number of switches in a switch control interface is updated to reflect the current total number of switches recognized by the computer system. Displaying a user interface including multiple action graphical user interface objects indicative of association between sounds and predetermined actions enables the user to quickly and efficiently observe associations between sounds and predetermined actions, which provides improved visual feedback.

In some embodiments, while displaying, via the display generation component, the user interface (e.g., 880), the computer system receives, via the one or more input devices, a first non-speech input (e.g., 886) associated with the first predetermined action. In some embodiments, the non-speech input is any user input not including a speech input. In some embodiments, non-speech inputs include external inputs (e.g., inputs received from other computer systems and/or devices), screen inputs (e.g., taps on the display generation component), camera inputs (e.g., detection, by a camera of the computer system, of predetermined user movements), and tap inputs on a predetermined portion of the computer system (e.g., tap inputs on a backside of the computer system). In some embodiments, predetermined actions include actions for navigating and/or interacting with the computer system; by way of example, predetermined actions include actions for navigating user interfaces displayed by the computing system, such as "select", "move to next", "move to previous", "deselect"; as another example, predetermined actions include actions for controlling various system features, such as "increase volume", "decrease volume", or "go to settings").

In some embodiments, in response to receiving the first non-speech input and in accordance with a determination that a first user interface object (e.g., 882b) of the set of user interface objects is currently selected, the computer system performs the first predetermined action based on the first user interface object.

In some embodiments, in response to receiving the first non-speech input and in accordance with a determination that a second user interface object (e.g., 882c) of the set of user interface objects is currently selected, the computer system performs the first predetermined action based on the second user interface object. Performing a predetermined action in response to a speech input and performing the predetermined action in response to a non-speech input allows for improved control over the manner in which a computer system operates, which reduces the number of inputs needed to perform an operation.

In some embodiments, the second user interface (e.g., 820) further includes a third action user-interactive graphical user interface object (e.g., 821b) that is indicative of an association between the first non-speech input and the first predetermined action. In some embodiments, a speech input and a non-speech input map be associated with a same action. Displaying a user interface including an action user-interactive graphical user interface object that is indicative of an association between a non-speech input and a predetermined action enables the user to quickly and efficiently observe an associations between a non-speech input type and a corresponding action, which provides improved visual feedback.

In some embodiments, the computer system displays a third user interface (e.g., 840) (e.g., a practice sounds interface that can be used to practice pronunciation of various predetermined speech inputs) that includes a first set of practice sound user-interactive graphical user interface objects (e.g., 848a-h) (e.g., a set of affordances). In some embodiments, the practice sounds interface prompts a user to provide a speech input corresponding to any of a set of predetermined sounds). In some embodiments, the set of practice sound user-interactive graphical user interface objects includes a first practice sound user-interactive graphical user interface object (e.g., 848g) (e.g., an affordance; an object that is associated with a first sound that can be associated with a predetermined action) (e.g., an affordance including a textual representation of a speech input (e.g., "eh") that is associated with a third sound. In some embodiments, the affordance is selected to play the sound corresponding to the affordance. In some embodiments, selecting the affordance places a focus on the affordance. In some embodiments, after placing a focus on the affordance, the computer system displays a learn affordance that can be selected to access a submenu for the speech input. In some embodiments, the submenu includes instructions for pronouncing the speech input and allows for further practice for the sound. In some embodiments, the third sound is the same as the first sound. In some embodiments, the set of practice sound user-interactive graphical user interface objects includes a second practice sound user-interactive graphical user interface object (e.g., 848b) that is associated with a fourth sound.

In some embodiments, while displaying the third user interface, the computer system receives, via the one or more input devices, a first user input (e.g., 850). In some embodiments, the user input is a speech input. In some embodiments, the computer system provides a live preview of speech inputs while the computer system receives the speech inputs. In some embodiments, the live preview is a dynamic waveform provided based on auditory characteristics of the speech input. In some embodiments, the user input is a non-speech input, such as a tap input or swipe input.

In some embodiments, in response to receiving the first user input (e.g., 850, 856) and in accordance with a determination that the first user input includes speech input, in accordance with a determination that the first user input includes the third sound, the computer system provides a first notification that the first user input corresponds to the third sound. In some embodiments, the first notification includes modifying a visual characteristic (e.g., highlighting) of the first practice sound user-interactive graphical user interface object (e.g., 848g) (e.g., if the received speech input matches the sound of a practice sound affordance, the computer system highlights the practice sound affordance). In some embodiments, highlighting the affordance includes visually modifying the affordance; for example, the computer system bolds an edge of the affordance.

In some embodiments, in response to receiving the first user input (e.g., 850, 856) and in accordance with a determination that the first user input includes speech input and in accordance with a determination that the first user input includes the fourth sound, the computer system provides a second notification that the first user input corresponds to the fourth sound. In some embodiments, the second notification includes modifying a visual characteristic (e.g., highlighting) of the second practice sound user-interactive graphical user interface object (e.g., 848*g*). In some embodiments, if the speech input does not match any member of the first set of practice sound user-interactive graphical user interface objects, no notification is provided (e.g., if the received speech input doesn't match the sound of the practice sound affordance, the computer system does not highlight the affordance. In some embodiments, the practice sounds interface includes multiple practice sound affordances and if the speech input matches the speech input of a different practice sound affordance, the computer system highlights the matching practice sound affordance.

In some embodiments, in response to receiving the first user input (e.g., 850, 856) and in accordance with a determination that the first user input does not include speech input (e.g., is non-speech input (e.g., a contact on a touch-sensitive surface (e.g., a tap); a mouse click; a key press)), in accordance with a determination that the first user input corresponds to the first practice sound user-interactive graphical user interface object (e.g., 848*a*), the computer system outputs (e.g., via one or more speakers) the third sound. In some embodiments, in response to receiving the first user input and in accordance with a determination that the first user input does not include speech input (e.g., is non-speech input (e.g., a contact on a touch-sensitive surface (e.g., a tap); a mouse click; a key press)) and in accordance with a determination that the first user input corresponds to the second practice sound user-interactive graphical user interface object, the computer system outputs (e.g., playing via one or more speakers) the fourth sound. In some embodiments, if the computer system detects selection of an input (e.g., tap input) selecting the practice sound affordance, the computer system provides (e.g., plays) the sound output using an audio output device of the computer system. In some embodiments, the computer system further displays a learn affordance in response selection of the practice sound affordance. Modifying a visual characteristic of a user-interactive graphical user interface object in response to a speech input that corresponds to a sound associated with the user-interactive graphical user interface object allows a user to quickly and efficiently recognize if a speech input was provided correctly, which provides improved visual feedback.

In some embodiments, the third user interface (e.g., 840) (e.g., practice sounds interface) includes a learn user-interactive graphical user interface object that is associated with the third sound (e.g., 854) (e.g., that is displayed after selecting the first practice sound user-interactive graphical user interface object). In some embodiments, the learn affordance is displayed in response to selection of a practice sound affordance).

In some embodiments, in accordance with a determination that the first user input corresponds to a selection (e.g., 856) of the learn user-interactive graphical user interface object (e.g., 854), the computer system displays a fourth user interface (e.g., 860) (e.g., learn interface for the sound selected in the practice sounds interface) including instructions (e.g., 866. 876) for providing a speech input corresponding to the third sound. In some embodiments, the learn interface includes a set of instructions that indicate the manner in which a user can pronounce the selected sound. In some embodiments, the learn interface includes an affordance for playing a sound corresponding to the selected sound.

In some embodiments, while displaying the fourth user interface (e.g., 860) (e.g., learn interface corresponding a selected sound), the computer system receives a third speech input. In some embodiments, in response to receiving the third speech input and in accordance with a determination that the third speech input corresponds to the third sound, the computer system provides a third notification that the third speech input corresponds to the third sound. In some embodiments, if the computer system receives a speech input that matches the sound of the learn interface, the computer system provides a notification indicating that a match was detected. In some embodiments, the notification is a displayed indicator, such as a checkmark or a word ("Great"). In some embodiments, in response to receiving the third speech input and in accordance with a determination that the third speech input does not correspond to the third sound, the computer system forgoes providing the third notification. In some embodiments, in response to the third speech input and in accordance with a determination that the third speech input does not correspond to the third sound, the computer system provides a fourth notification that the first speech input does not correspond to the third sound. In some embodiments, if the computer system receives a speech input that does not match the sound of the learn interface, the computer system provides a notification that the speech input was improper.

In some embodiments, while displaying the fourth user interface (e.g., 860), the computer system receives a second user input (e.g., 870, 872). In some embodiments, the second user input is a swipe gesture. In some embodiments, the computer system detects a swipe gesture on the learn interface.

In some embodiments, in response to the user input, the computer system replaces the instructions (e.g., 866, 876), for providing a speech input corresponding to third sound with instructions for providing a speech input corresponding to the a fifth sound. In some embodiments, in response to the swipe gesture, the computer system switches the learn interface to a different sound. In some embodiments, this functionality allows the user to navigate between various sounds (and view instructions for pronouncing each) while the learn interface is displayed. In some embodiments, instructions of the learn interface are not fully displayed within a displayed portion of the learn interface such that some of the instructions are "hidden"; In some embodiments, the computer system detects a scroll input (e.g., vertical scroll input) and reveals at least a portion of the hidden instructions in response to the scroll input.

Note that details of the processes described above with respect to method 900 (e.g., FIG. 9 are also applicable in an analogous manner to the methods described below/above. For example, methods 700, 1100 optionally includes one or more of the characteristics of the various methods described above with reference to method 1100. For example, one or more sound actions configured by a user, for instance, as described with reference to method 900 may be used to enroll sounds, as described with reference to method 1100. For brevity, these details are not repeated below.

FIGS. 10A-10V illustrate exemplary user interfaces for providing notifications, in accordance with some embodiments. The user interfaces in these figures are used to illustrate the processes described below, including the processes in FIG. 11.

In some implementations, exemplary user interfaces may be used to configure a device to provide notifications in response to detection of particular sounds, such as alarms. As a result, users, such as users who have limited hearing, can be notified about the occurrence of the sounds even if the users are otherwise unable to hear such sounds.

In FIG. 10A, device 600 displays, on display 602, an accessibility interface 1004. The accessibility interface 804 includes various affordances, including sound recognition affordance 1006, for controlling various accessibility functions of device 1000.

In some examples, in response to selection of sound recognition affordance 1006, device 600 displays a sound recognition interface. By way of example, while displaying accessibility interface 1004, device 600 detects selection of sound recognition affordance 1006, a tap gesture 1008 on sound recognition affordance 1006. As shown in FIG. 10B, in response to detecting tap gesture 1008, device 600 displays sound recognition interface 1010.

Sound recognition interface 1010 includes option 1012. In some embodiments, option 1012 is used for toggling the use of one sound recognition on device 1000. As will be described in more detail below, in some embodiments, device 600 can be configured to detect (e.g., recognize) one or more particular sounds, and in response to detecting a sound, to provide a notification alerting detection of the sound.

In response to selection of option 1012, device 600 toggles a state of option 1012 (e.g., deactivates the option if activated, activates the option if deactivated). In FIG. 10B, in response to detecting a tap gesture 1014 at option 1012, device 600 activates sound recognition on device 600 and modifies the display of option 1012 to indicate that sound recognition has been activated, as shown in FIG. 10C.

Further in response to selection of option 1012 (e.g., in response to device 600 activating sound recognition), device 600 displays, in sound recognition interface 1010, sound setup affordance 1016. In response to selection of sound setup affordance 1016, device 600 displays a sound setup interface. By way of example, while displaying sound recognition interface 1010, device 600 detects selection of sound setup affordance 1016, a tap gesture 1018 on sound setup affordance 1016. As shown in FIG. 10D, in response to detecting tap gesture 1018, device 600 displays sound setup interface 1020.

Sound setup interface 1020 includes various candidate sound affordances, each of which corresponds to a type of sound. In some embodiments, a candidate sound affordance can be used to configure device 600 to detect a sound corresponding to the candidate sound affordance. As an example, the "door bell" candidate sound affordance can be used to configured device 600 to detect a "door bell" sound.

In some instances, however, a user may desire to configure (e.g., train) device 600 to detect a custom sound (e.g., a sound that does not correspond to an affordance in sound setup interface 1020). Accordingly, sound setup interface 1020 includes a custom sound affordance 1022. In some embodiments, in response to selection of custom sound affordance 1022, device 600 initiates a sound enrollment process in which device 600 is configured to detect a custom sound.

Generally, during a sound enrollment process, device 600 receives a set of sound inputs corresponding to a custom sound, and based on the set of sound input, obtains (e.g., generates) a model which can be used to detect the custom sound. As explained in more detail below, during the sound enrollment process, device 600 receives each sound input of the set of sound inputs successively. For each sound input, device 600 determines whether the sound input satisfies sound input criteria. Based on the determination for each sound input, device 600 determines if the set of inputs satisfies sound enrollment criteria. If so, device 600 obtains the model.

In FIG. 10D, while displaying sound setup interface 1020, device 600 detects selection of custom sound affordance 1022, a tap gesture 1024 on custom sound affordance 1022. As shown in FIG. 10E, in response to detecting tap gesture 1024, device 600 displays sound label interface 1026.

Sound label interface 1026 includes name field 1028, which can be used for entry of a name for the custom sound, and continue affordance 1030. In response to selection of continue affordance 1016, device 600 displays a sound enrollment interface. In FIG. 10E, while displaying sound recognition interface 1026, device 600 detects selection of continue affordance 1030, a tap gesture 1032 on continue affordance 1030. As shown in FIG. 10F, in response to detecting tap gesture 1032, device 600 displays sound enrollment interface 1034.

Sound enrollment interface 1034 includes indicator 1036, instructions 1038, progress region 1040, live preview 1042, status indicator 1044, and postpone affordance 1046. Indicator 1034 indicates the name of the custom sound entered in name field 1028. Instructions 1036 include instructions for performing the sound enrollment process. As shown, instructions 1038 include instructions to provide a predetermined number (e.g., five) of sound inputs that include the custom sound. Status indicator 1044 indicates a state of device 600 during the sound enrollment process. Status indicator 1044 indicates that device 600 is waiting to receive a sound input.

In operation, while displaying the sound enrollment interface 1034, device 600 receives, using an audio input device (e.g., microphone) of device 1000, a sound input. In some embodiments, while receiving the sound input, device 600 provides a live preview of the custom sound input, such as live preview 1042. As shown in FIG. 10G, live preview 1042 is a visual waveform indicative of one or more auditory characteristics of the received sound input. In some examples, while receiving the sound input, device 600 ceases display of status indicator 1044.

After receiving the sound input, device 600 determines (e.g., analyzes the sound input to determine) whether the sound input meets sound input criteria. In some embodiments, device 600 provides an indication when determining whether the sound input satisfies the sound inputs criteria. As shown in FIG. 10H, for instance, while determining whether the sound input satisfies the sound input criteria, device 600 modifies display of progress indicator 1040a of progress region 1040.

If device 600 determines that the sound input meets sound input criteria, device 600 saves (e.g., stores) the sound input, and modifies display of progress indicator 1040a to show that the sound input satisfies the sound input criteria (e.g., device 600 modifies progress indicator 1040a to a checkmark). Optionally, device 600 replaces live preview 1042 with checkmark 1050 to indicate that the custom sound input meets the sound input criteria.

Thereafter, device 600 iteratively receives the remaining sound inputs at device 1000, until all sound inputs necessary to complete the sound enrollment process have been received. As described, for each received sound input, device 600 determines whether the sound input satisfies the sound input criteria and indicates the same. FIG. 10J illustrates an example in which device 600 has determined (and indicated) that all sound inputs satisfy the sound input criteria.

In some embodiments, sound input criteria includes a criterion that is met when a sound input include a sound of a particular type. By way of example, a sound input satisfies sound input criteria when the sound input includes a sound corresponding to an alarm or sound generated by an electronic device. In this manner, device 600 verifies that a sound is of a type that can be detected by device 600 (e.g., the sound is sufficiently discriminative). In some embodiments, sound input criteria includes a criterion that is met when a sound input is sufficiently similar to other sound inputs (e.g., the sound inputs include a sound that is sufficiently similar). In this manner, the device 600 verifies that variation between the sound inputs is small enough such that a reliable model can be generated using the sound inputs.

Once a sound enrollment process has been successfully completed, device 600 determines whether the set of inputs satisfies sound enrollment criteria. In some embodiments, the sound enrollment criteria includes a criterion that is met when a threshold number of sound inputs of the set of sound inputs satisfy the sound input criteria.

If the set of inputs satisfy the sound enrollment criteria, device 600 is configured to detect the custom sound. For example, if the set of inputs satisfies the sound enrollment criteria, device 600 obtains, based on the set of inputs, a model for detecting the custom sound to be generated.

In some embodiments, device 600 further adds a candidate sound affordance 1048 to sound setup interface 1020 that corresponds to for the custom sound (e.g., Toaster), as shown in FIG. 10K. In some embodiments, candidate sound affordance 1048 is used to configure one or more features for the custom sound.

By way of example, while displaying sound setup interface 1020, device 600 detects selection of candidate sound affordance 1048, a tap gesture 1050 on candidate sound affordance 1048. As shown in FIG. 10L, in response to detecting tap gesture 1050, device 600 displays the sound configuration interface 1052.

Sound configuration interface 1052 includes option 1054, audio affordance 1056, model indicator 1058, and back affordance 1062. Audio affordance 1056 indicates the audio output provided by device 600 in response to detection of the custom sound (e.g., "tri-tone"), and further can be used (e.g., selected) to select a different audio output. For example, in response to selection of audio affordance 1056, device 600 displays an audio selection interface (not shown), in which a user can select an audio output.

In some embodiments, sound configuration interface 1052 is displayed while device 600 is obtaining the model for the custom sound. With reference to FIG. 10L, model indicator 1058 indicates that device 600 is in the process of obtaining the model for the custom sound. In some embodiments, once the model has been obtained by device 1000, device 600 removes display of model indicator 1058, as shown in FIG. 10M.

In some embodiments, in response to selection of option 1054, device 600 toggles sound recognition for the custom sound. In FIG. 10M, in response to detecting a tap gesture 1060 at option 1054, device 600 activates sound recognition for the custom sound input on device 600 and modifies the display of option 1054 to indicate that sound recognition for the custom sound input has been activated, as shown in FIG. 10N.

Back affordance 1062 is selected to display (e.g., resume display of) sound setup interface 1020. While displaying sound input configuration interface 1052, device 600 detects selection of back affordance 1062, a tap gesture 1064 on back affordance 1064. With reference to FIG. 10O, in response to detecting tap gesture 1064, device 600 displays sound setup interface 1020. As shown, because sound recognition for the custom sound has been activated, candidate sound affordance 1048 indicates that sound recognition for the custom sound is activated (e.g., "on").

Once sound recognition for a custom sound has been activated (e.g., by performing a sound enrollment process for the custom sound on device 600 and/or activating an option for the custom sound), the device 600 can detect subsequent occurrences of the custom sound, and in response to detecting the custom sound, provide a notification indicating the same. As shown in FIG. 10P, device 600 displays a home screen interface 1070. Home screen interface 1070 includes a variety of application affordances, which when selected cause device 600 to execute (e.g., initiate execution of, continue execution of) an application corresponding to the selected application affordance. While displaying home screen 1070, device 600 detects an occurrence of the custom sound. In response, device 600 displays notification 1072, and optionally, provides audio output 1074 (e.g., "tri-tone"), indicating that the custom sound was detected (e.g., "Toaster was detected").

In some instances, a sound enrollment process may not be completed successfully. As an example, a user can elect to complete a sound enrollment process at a later time. With reference to FIG. 10Q, in response to selection of postpone affordance 1046 of sound enrollment interface 1034, device 600 saves (e.g., stores) a current state of the sound enrollment process and terminates the sound enrollment process. Thereafter, the sound enrollment process can be resumed. Sound setup interface 1020, as shown in FIG. 10R includes resume affordance 1080. Indicator 1082 of the resume affordance 1080 indicates the number of sound inputs that were provided during the sound enrollment process, and optionally, the number of sound inputs remaining in the sound enrollment process. In some embodiments, device 600 resumes the sound enrollment process in response to selection of resume affordance 1080.

As another example, during a sound enrollment process, device 600 may determine a sound input does not meet sound input criteria. As shown FIG. 10S, device 600 displays sound enrollment interface 1034 in an instance in which a sound input does not satisfy sound input criteria. In response to determining that a sound input does not meet the sound input criteria, device 600 modifies display of progress indicator 1040a to indicate that the sound input fails to meet the sound input criteria (e.g., changes progress indicator 1040a to an exclamation mark) and, optionally, displays fail indicator 1090 to indicate the same. Further in response to determining that a sound input does not meet the sound input criteria, device 600 displays restart affordance 1082, continue affordance 1084, and learn affordance 1086. In response to selection of restart affordance 1082, device 600 restarts the sound enrollment process. In response to selection of continue affordance 1084, device 600 progresses to the next iteration of the sound enrollment process.

In response to selection of learn affordance 1086, device 600 displays a compatible sounds interface. In FIG. 10S, while displaying sound enrollment interface 1034, device 600 detects selection of learn affordance 1086, a tap gesture 1088 on learn affordance 1086. As shown in FIG. 10T, in response to detecting tap gesture 1088, device 600 displays the compatible sounds interface 1090.

Compatible sounds interface includes information 1092 and continue affordance 1094. Information 1092 includes information regarding which sounds that are suitable for recognition by device 1000, and accordingly, which sounds satisfy sound input criteria. In response to selection of continue affordance 1094, device 600 displays (e.g., resumes display of) sound enrollment interface 1034. By way of example, while displaying compatible sounds interface 1090, device 600 detects selection of continue affordance 1094. In some examples, the selection is a tap gesture 1096 on continue affordance 1094. In response to detecting tap gesture 1096, device 600 displays sound enrollment interface 1034.

In some embodiments, one or more sound affordances can be removed (e.g., deleted) from a sound setup interface. As shown in FIG. 10U, for example, device 600 displays sound setup interface 1020 including custom sound affordance 1048 and edit affordance 1098. In response to selection of edit affordance 1098, device 600 displays a delete affordance for custom sound input affordances. By way of example, while displaying sound setup interface 1020, device 600 detects selection of edit affordance 1098. In some examples, the selection is a tap gesture 1002*a* on edit affordance 1098. As shown in FIG. 10V, in response to detecting tap gesture 1002*a*, device 600 displays delete affordance 1004*a*. In response to selection of delete affordance 1004*a*, device 600 removes custom sound affordance 1048 from sound setup interface 1020, and optionally, is configured such that device 600 no longer detects the custom sound and/or no longer provides a notification on detecting the custom sound.

FIG. 11 is a flow diagram illustrating a method for providing notifications using a computer system in accordance with some embodiments. Method 1100 is performed at a computer system (e.g., a smartphone, a tablet, a personal computer) (e.g., 100, 300, 500, 600) in communication with a display generation component (e.g., a television, a display controller, an internal or external touch-sensitive display system) and one or more input devices (e.g., a touch-sensitive surface, a hardware button, a microphone. Some operations in method 1100 are, optionally, combined, the orders of some operations are, optionally, changed, and some operations are, optionally, omitted.

As described below, method 1100 provides an intuitive way for providing notifications. The method reduces the cognitive burden on a user for providing notifications, thereby creating a more efficient human-machine interface. For battery-operated computing devices, enabling a user to providing notifications faster and more efficiently conserves power and increases the time between battery charges.

The computer system (e.g., 600) performs (1102) a sound enrollment process. In some embodiments, a sound enrollment process is a process in which the computing system learns to recognize a particular sound. In some embodiments, prior to performing the sound enrollment process, the computer system displays a label interface that can be used to name the sound to be enrolled.

While performing the sound enrollment process, receiving, via the one or more input devices, a set of one or more sound inputs that includes a first sound input (e.g., input represented by 1042). In some embodiments, during a sound enrollment process, one or more sound inputs are provided to the computing system by a user. In some embodiments, during the sound enrollment process, the computer system displays a sound enrollment interface that tracks progress of the sound enrollment process. In some embodiments, the sound enrollment interface includes a live preview of sound inputs received by the computer system. In some embodiments, a live preview is a dynamic waveform provided based on auditory characteristics of the speech input. In some embodiments, the sound enrollment interface includes a postpone affordance which can be selected to save a state of the sound enrollment process such that it can be resumed and/or completed at a later time. In some embodiments, the sound enrollment process can be resumed by selecting an affordance of a sound setup interface. In some embodiments, the affordance of the sound setup interface indicates a degree of completion of the sound enrollment process (e.g., a fraction indicating a number of completed samples).

While performing the sound enrollment process (in some embodiments, and in response to receiving the set of one or more sound inputs), indicating whether the first sound input satisfies sound input criteria (e.g., using indicator 1040*a*). In some embodiments, the sound input criteria includes a requirement that a sound input is a non-verbal sound; In some embodiments, the sound input criteria includes a requirement that a sound input is a sound and/or alarm provided by an electronic device (e.g., a device separate and/or distinct from the computing system). In some embodiments, the sound input criteria includes a requirement that each sound input is a sound input of a same type and/or sufficiently similar (e.g., each sound input is a same alarm). In some embodiments, indicating whether a sound input satisfies the sound input criteria includes providing an output indicating the same. In some embodiments, the computing system indicates whether a sound input satisfies the sound input criteria by providing a visual indicator (e.g., a green checkmark in the event a sound input satisfies the criteria or a red exclamation point in the event a sound input does not satisfy the criteria). In some embodiments, an indication is provided for each sound of set of one or more sound inputs.

While performing the sound enrollment process and in accordance with a determination that the set of one or more sound inputs satisfies a set of sound enrollment criteria (in some embodiments, and in response to receiving the set of one or more sound inputs), the computer system causes (1104) a model (e.g., classification model) for identifying sounds of a first type corresponding to the set of one or more sound inputs to be generated. In some embodiments, the set of sound enrollment criteria includes a criterion that is satisfied when each sound input of the set of one or more sound inputs each satisfy the sound input criteria. In some embodiments, the set of sound enrollment criteria is satisfied even if each sound input in the set of sound inputs does not satisfy the sound input criteria. In some embodiments, if each sound input satisfies the sound input criteria, the computing system generates a model for identifying if future sound inputs match the sound inputs provided during the sound enrollment process; In some embodiments, if a match is detected the computing system provides a notification indicating that a match has been detected; In some embodiments, the model is a machine-learned model, such as a classification network (e.g., neural network). In some embodiments, the generated model is adjusted to account for auditory hallucinations). In some embodiments, the model is generated by the computer system. In some embodiments, the model is generated by one or more remote computer systems in communication with the computer system, after the computer system transmits data corresponding to the set of one or more sound inputs.

While performing the sound enrollment process and in accordance with a determination that the set of one or more sound inputs does not satisfy the set of sound enrollment criteria (in some embodiments, and in response to receiving the set of one or more sound inputs), the computer system forgoes (1106) causing the model for identifying sounds of the first type corresponding to the set of one or more sound inputs to be generated. Indicating whether a sound input satisfies sound input criteria allows a user to quickly and efficiently recognize whether a sound input can be used to generate a model for recognizing a sound, which provides improved visual feedback.

In some embodiments, the computer system determines whether the set of one or more sound inputs satisfies the set of sound enrollment criteria. In some embodiments, the computer system determines whether the set of one or more sound inputs satisfies the set of sound enrollment criteria. In some embodiments, the computer system provides the set of one or more sound inputs to an external server, which in turn determines whether the set of one or more sound inputs satisfies the set of sound enrollment criteria. In some embodiments, the computer system displays a sound enrollment interface that tracks progress of the sound enrollment process. In some embodiments, while determining whether the set of one or more sound inputs satisfies a set of sound enrollment criteria, the computer system provides (e.g., displays) a notification indicating that the computer system is determining whether the set of one or more sound inputs satisfies a set of sound enrollment criteria. In some embodiments, the notification is an animation indicating that the computer system is analyzing one or more sound inputs).

In some embodiments, the sound input criteria includes a criterion that is satisfied when a determination is made that the first sound input is a non-verbal sound (e.g., as indicated by 1092). In some embodiments, the sound enrollment criteria includes a requirement that the one or more sound inputs are non-verbal sounds, such as alarms provided by an electronic device. Including a criterion in sound input criteria that is satisfied when a determination is made that the first sound input is a non-verbal sound reduces the complexity of configuring sound recognition and, as a result, allows a user to quickly and efficiently configure the computer system to recognize non-verbal sounds, such as alarms, which reduces the number of inputs needed to perform an operation.

In some embodiments, the set of sound enrollment criteria includes a criterion that is satisfied when a determination is made that each sound input of the set of one or more sound inputs is a sound input of a first type. In some embodiments, the sound enrollment criteria includes a requirement that each sound input is of a same or similar type (e.g., an alarm provided by a same device). In some embodiments, the computer system analyzes each sound input to determine whether the sound inputs are of sufficient similarity. Including a criterion in sound enrollment criteria that is satisfied when a determination is made that each sound input of the set of one or more sound inputs is a sound input of a same type improves the accuracy and efficacy of sound recognition, allowing for more reliable and efficient notification of detected sounds, which provides improved visual and/or auditory feedback.

In some embodiments, the set of one or more sound inputs includes a second sound input. In some embodiments, the computer system indicates whether the second sound input satisfies the sound input criteria. In some embodiments, during the sound enrollment process, the computer system provides an indication (e.g., notification) for each sound input indicating whether the sound input satisfies the sound enrollment criteria. In some embodiments, indicating whether the first sound input satisfies sound enrollment criteria includes, in accordance with a determination that the first sound input satisfies the sound input criteria, displaying, via the display generation component, a notification (e.g., 1040a) indicating that the first sound input satisfies the sound input criteria. In some embodiments, the notification is an affirmative or positive notification, such as a checkmark; In some embodiments, the notification is displayed with a color associated with a successful outcome (e.g., green).

In some embodiments, indicating whether the first sound input satisfies sound enrollment criteria includes, in accordance with a determination that the first sound input does not satisfy the sound input criteria, displaying, via the display generation component, a notification (e.g., 1040a) indicating that the first sound input does not satisfy the sound input criteria. In some embodiments, the notification is a negative notification, such as an exclamation point. In some embodiments, the notification is displayed with a color associated with an unsuccessful outcome (e.g., red). In some embodiments, the notification is a text string (e.g., "the sound was heard but cannot be recognized as an alarm"). In some embodiments, in response to determination that a sound input does not satisfy sound enrollment criteria, the computer system displays, in an sound enrollment interface, a restart affordance. In some embodiments, when selected, the restart affordance restarts the sound enrollment process. In some embodiments, in response to determination that a sound input does not satisfy sound enrollment criteria, the computer system displays, in the sound enrollment interface, a continue affordance. In some embodiments, when the continue affordance is selected, the enrollment process progresses to a next sampling step of the sound enrollment process despite the sound input not satisfying the sound enrollment criteria. In some embodiments, when the continue affordance is selected, the enrollment process repeats the failed sampling step of the sound enrollment process; In some embodiments, a threshold number of sound inputs must satisfying the sound enrollment criteria, or the sound enrollment process is terminated. In some embodiments, in response to determination that a sound input does not satisfy sound enrollment criteria, the computer system displays, in an sound enrollment interface, a learn affordance, which when selected, causes the computer system to display an interface describing sounds that are compatible with the sound enrollment process (e.g., sounds that satisfy the sound enrollment process).

In some embodiments, the sound enrollment process further includes, prior to receiving the set of one or more sound inputs, providing a prompt (e.g., 1044) (e.g., an audio prompt; a visual prompt) for a user to provide the set of one or more sound inputs. In some embodiments, in response to initiating the sound enrollment process, the computer system displays a sound enrollment interface including a prompt for a user to provide a set of sound inputs for enrolling a sound for subsequent detection by the computer system (e.g., "teach phone by playing the sound 5 times").

In some embodiments, the model is a machine-learned model generated based on the set of one or more sound inputs. In some embodiments, the model is generated by the computer system; In some embodiments, the set of one or more sound inputs are provided to a remote server (e.g., device), and the remote server generates the model. In some embodiments, the model includes one or more adjustments to account for auditory hallucinations. In some embodiments, the computer system adjusts one or more parameters of the model to allow the model to better account for auditory hallucinations. In some embodiments, adjusting for auditory hallucinations reduces the number of false positive detections of a sound. Including adjustments in a model to account for auditory hallucinations improves model accuracy, in turn reducing the likelihood of false positives and allowing for more reliable and efficient notification of detected sounds, which provides improved visual and/or auditory feedback.

In some embodiments, after the model is generated, the computer system receives (e.g., detects) a subsequent sound input. In some embodiments, in response to receiving the subsequent sound input and in accordance with a determination, based on the model, that the subsequent sound input is a sound input of the first type, the computer system provides (e.g., displays) a notification (e.g., 1072) indicating that a sound input of the first type was received (e.g., detected). In some embodiments, once a sound has been enrolled on the computer system using a sound enrollment process, the computer system thereafter receives sound inputs and determines, using the model generated during the sound enrollment process, if the received sound inputs match the enrolled type. In some embodiments, if a match is detected, the computer system provides a notification alerting a user that the enrolled sound has been detected).

In some embodiments, in response to receiving the subsequent sound input, in accordance with a determination, based on the model, that the subsequent sound input is not a sound input of the first type, the computer system forgoes providing a notification indicating that a sound input of the first type was received.

Note that details of the processes described above with respect to method 1100 (e.g., FIG. 11) are also applicable in an analogous manner to the methods described above. For example, methods 700, 900 optionally includes one or more of the characteristics of the various methods described above with reference to method 1100. For example, volume settings for concurrent audio features, such as those described with reference to method 700 may be adjusted using sound actions, such as those described with reference to method 1100. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide auditory features to users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to more accurately recognize user behavior and/or input (e.g., voice input). Accordingly, use of such personal information data enables more reliable device operation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing auditory features, the present technology can be configured to allow users to select to "opt in" or "opt out" of participation in the collection of personal information data during registration for services or anytime thereafter. In another example, users can select not to provide data indicating usage of background sounds and/or auditory controls. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, auditory controls can be implemented based on non-personal information data or a bare minimum amount of personal information, such as the auditory characteristics of sound provided by a user, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
      displaying, via the display generation component, a first user interface concurrently including:
         a background sounds user-interactive graphical user interface object that, when selected, enables a concurrent playback feature;
         a background sounds volume feature for adjusting a volume level of an audio media item of a first type; and
         a concurrent volume feature for adjusting a volume level of the audio media item of the first type when the audio media item of the first type is concurrently played with an audio media item of a second type;
      while playing the audio media item of the first type at a first volume level that is set via the background sounds volume feature, receiving, via the one or more input devices, a request to play the audio media item of the second type;
      in response to receiving the request to play the audio media item of the second type:
         in accordance with a determination that a set of concurrent audio criteria is satisfied, wherein the set of concurrent audio criteria includes a requirement that the concurrent playback feature is enabled on the computer system, via the background sounds user-interactive graphical user interface object, at the time the request to play the audio media item of the second type is received, concurrently playing:
            the audio media item of the first type at a second volume level that is different from the first volume level, wherein the second volume level is set via the concurrent volume feature; and
            the audio media item of the second type; and in accordance with a determination that the concurrent playback feature is disabled on the computer system at the time the request to play the audio media item of the second type is received:
            ceasing to play the audio media item of the first type; and
            playing the audio media item of the second type.

2. The computer system of claim 1, wherein the audio media item of the first type includes audio selected from the group consisting of environmental sounds, irregular noise, and a combination thereof.

3. The computer system of claim 1, wherein the audio media item of the first type includes audio selected from the group consisting of randomly selected segments of audio, randomly arranged segments of audio, and a combination thereof.

4. The computer system of claim 1, wherein the concurrent playback feature is manually configurable.

5. The computer system of claim 1, wherein concurrently playing the audio media item of the first type and the audio media item of the second type comprises:
   adjusting a magnitude of a volume level of the audio media item of the first type from the first volume level to an adjusted volume based on a magnitude of the concurrent volume feature.

6. The computer system of claim 1, wherein the set of concurrent audio criteria includes a criterion that is satisfied when a determination is made that a magnitude of a second concurrent volume feature exceeds a threshold magnitude.

7. The computer system of claim 1, further comprising adjusting, based on contextual information, a magnitude of at least one of:
   the background sounds volume feature for adjusting the volume level of the audio media item of the first type; and
   the concurrent volume feature for adjusting the volume level of the audio media item of the first type when the audio media item of the first type is concurrently played with the audio media item of the second type.

8. The computer system of claim 1, wherein playing the audio media item of the first type includes:
   in accordance with a determination that the computer system is in a first context state, playing the audio media item of the first type with first audio content; and
   in accordance with a determination that the computer system is in a second context state, different from the first context state, playing the audio media item of the first type with second audio content, different than the first audio content.

9. The computer system of claim 1, wherein displaying the first user interface includes concurrently displaying:
   the background sounds user-interactive graphical user interface object; and
   a first audio content user-interactive graphical user interface object that, when selected, causes display of a second user interface that includes:
      a second audio content user-interactive graphical user interface object that, when selected, causes third audio content to be included in the audio media item of the first type during playback; and
      a third audio content user-interactive graphical user interface object that, when selected, causes fourth audio content, different from the third audio content, to be included in the audio media item of the first type during playback.

10. The computer system of claim 9, the one or more programs including instructions for:

detecting, via the one or more input devices, a first input corresponding to the background sounds user-interactive graphical user interface object;

in response to detecting the first input, enabling playback of the audio media item of the first type when a determination is made that the set of playback criteria are met; and while the computer system is enabled to playback the audio media item of the first type when a determination is made that the set of playback criteria are met:

in accordance with a determination that the set of playback criteria are met, playing the audio media item of a first type.

11. The computer system of claim 9, the one or more programs including instructions for:

while displaying the second user interface:

detecting, via the one or more input devices, a second input; and in response to detecting the second input:

in accordance with a determination that the second input corresponds to the second audio content user-interactive graphical user interface object, configuring the computer system to include the third audio content in the audio media item of the first type during playback; and in accordance with a determination that the second input corresponds to the third audio content user-interactive graphical user interface object, configuring the computer system to include the fourth audio content in the audio media item of the first type during playback.

12. The computer system of claim 1, wherein:

the first user interface includes a background sounds status indicator, a volume user-interactive graphical user interface object, and a background sounds enable user-interactive graphical user interface object;

the one or more programs further include instructions for:

detecting, via the one or more input devices, a third input;

in accordance with a determination that the third input corresponds to a swipe gesture at a location corresponding to the volume user-interactive graphical user interface object, adjusting a volume level of the audio media item of the first type from a second initial volume to a second adjusted volume based on a direction and magnitude of the swipe gesture; and in accordance with a determination that the third input corresponds to a selection of the background sounds enable user-interactive graphical user interface object:

selectively activating a background sounds feature; and modifying a visual characteristic of the background sounds status indicator.

13. A non-transitory computer-readable storage medium storing one or more programs configured to be executed by one or more processors of a computer system that is in communication with a display generation component and one or more input devices, the one or more programs including instructions for:

displaying, via the display generation component, a first user interface concurrently including:

a background sounds user-interactive graphical user interface object that, when selected, enables a concurrent playback feature;

a background sounds volume feature for adjusting a volume level of the audio media item of the first type; and a concurrent volume feature for adjusting a volume level of a media item of a first type when the audio media item of the first type is concurrently played with an audio media item of a second type;

while playing the audio media item of the first type at a first volume level that is set via the background sounds volume feature, receiving, via the one or more input devices, a request to play the audio media item of the second type;

in response to receiving the request to play the audio media item of the second type:

in accordance with a determination that a set of concurrent audio criteria is satisfied, wherein the set of concurrent audio criteria includes a requirement that the concurrent playback feature is enabled on the computer system, via the background sounds user-interactive graphical user interface object, at the time the request to play the audio media item of the second type is received, concurrently playing:

the audio media item of the first type at a second volume level that is different from the first volume level, wherein the second volume level is set via the concurrent volume feature; and the audio media item of the second type; and in accordance with a determination that the concurrent playback feature is disabled on the computer system at the time the request to play the audio media item of the second type is received:

ceasing to play the audio media item of the first type; and playing the audio media item of the second type.

14. A method, comprising:

at a computer system in communication with a display generation component and one or more input devices:

displaying, via the display generation component, a first user interface concurrently including:

a background sounds user-interactive graphical user interface object that, when selected, enables a concurrent playback feature;

a background sounds volume feature for adjusting a volume level of an audio media item of a first type; and a concurrent volume feature for adjusting a volume level of the audio media item of the first type when the audio media item of the first type is concurrently played with an audio media item of a second type;

while playing the audio media item of the first type at a first volume level that is set via the background sounds volume feature, receiving, via the one or more input devices, a request to play the audio media item of the second type;

in response to receiving the request to play the audio media item of the second type:

in accordance with a determination that a set of concurrent audio criteria is satisfied, wherein the set of concurrent audio criteria includes a requirement that the concurrent playback feature is enabled on the computer system, via the background sounds user-interactive graphical user interface object, at the time the request to play the audio media item of the second type is received, concurrently playing:

the audio media item of the first type at a second volume level that is different from the first volume level, wherein the second volume level is set via the concurrent volume feature; and the audio media item of the second type; and in accordance with a determination that the concurrent playback feature is disabled on the computer system at the time the request to play the audio media item of the second type is received:

ceasing to play the audio media item of the first type; and playing the audio media item of the second type.

15. The non-transitory computer-readable storage medium of claim 13, wherein the audio media item of the first type includes audio selected from the group consisting of environmental sounds, irregular noise, and a combination thereof.

16. The non-transitory computer-readable storage medium of claim 13, wherein the audio media item of the first type includes audio selected from the group consisting of randomly selected segments of audio, randomly arranged segments of audio, and a combination thereof.

17. The non-transitory computer-readable storage medium of claim 13, wherein the concurrent playback feature is manually configurable.

18. The non-transitory computer-readable storage medium of claim 13, wherein concurrently playing the audio media item of the first type and the audio media item of the second type comprises:

adjusting a magnitude of a volume level of the audio media item of the first type from the first volume level to an adjusted volume based on a magnitude of the concurrent volume feature.

19. The non-transitory computer-readable storage medium of claim 13, wherein the set of concurrent audio criteria includes a criterion that is satisfied when a determination is made that a magnitude of a second concurrent volume feature exceeds a threshold magnitude.

20. The non-transitory computer-readable storage medium of claim 13, further comprising adjusting, based on contextual information, a magnitude of at least one of:

the background sounds volume feature for adjusting the volume level of the audio media item of the first type; and the concurrent volume feature for adjusting the volume level of the audio media item of the first type when the audio media item of the first type is concurrently played with the audio media item of the second type.

21. The non-transitory computer-readable storage medium of claim 13, wherein playing the audio media item of the first type includes:

in accordance with a determination that the computer system is in a first context state, playing the audio media item of the first type with first audio content; and in accordance with a determination that the computer system is in a second context state, different from the first context state, playing the audio media item of the first type with second audio content, different than the first audio content.

22. The non-transitory computer-readable storage medium of claim 13, wherein displaying the first user interface includes concurrently displaying:

the background sounds user-interactive graphical user interface object that, when selected, enables playback of the audio media item of the first type when a determination is made that a set of playback criteria are met; and a first audio content user-interactive graphical user interface object that, when selected, causes display of a second user interface that includes:

a second audio content user-interactive graphical user interface object that, when selected, causes third audio content to be included in the audio media item of the first type during playback; and a third audio content user-interactive graphical user interface object that, when selected, causes fourth audio content, different from the third audio content, to be included in the audio media item of the first type during playback.

23. The non-transitory computer-readable storage medium of claim 22, the one or more programs including instructions for:

detecting, via the one or more input devices, a first input corresponding to the background sounds user-interactive graphical user interface object;

in response to detecting the first input, enabling playback of the audio media item of the first type when a determination is made that the set of playback criteria are met; and while the computer system is enabled to playback the audio media item of the first type when a determination is made that the set of playback criteria are met:

in accordance with a determination that the set of playback criteria are met, playing the audio media item of a first type.

24. The non-transitory computer-readable storage medium of claim 22, the one or more programs including instructions for:

while displaying the second user interface:

detecting, via the one or more input devices, a second input; and in response to detecting the second input:

in accordance with a determination that the second input corresponds to the second audio content user-interactive graphical user interface object, configuring the computer system to include the third audio content in the audio media item of the first type during playback; and in accordance with a determination that the second input corresponds to the third audio content user-interactive graphical user interface object, configuring the computer system to include the fourth audio content in the audio media item of the first type during playback.

25. The non-transitory computer-readable storage medium of claim 13, wherein:

the first user interface includes a background sounds status indicator, a volume user-interactive graphical user interface object, and a background sounds enable user-interactive graphical user interface object;

the one or more programs further include instructions for:

detecting, via the one or more input devices, a third input;

in accordance with a determination that the third input corresponds to a swipe gesture at a location corresponding to the volume user-interactive graphical user interface object, adjusting a volume level of the audio media item of the first type from a second initial volume to a second adjusted volume based on a direction and magnitude of the swipe gesture; and in accordance with a determination that the third input corresponds to a selection of the background sounds enable user-interactive graphical user interface object:

selectively activating a background sounds feature; and modifying a visual characteristic of the background sounds status indicator.

26. The method of claim 14, wherein the audio media item of the first type includes audio selected from the group consisting of environmental sounds, irregular noise, and a combination thereof.

27. The method of claim 14, wherein the audio media item of the first type includes audio selected from the group consisting of randomly selected segments of audio, randomly arranged segments of audio, and a combination thereof.

28. The method of claim 14, wherein the concurrent playback feature is manually configurable.

29. The method of claim 14, wherein concurrently playing the audio media item of the first type and the audio media item of the second type comprises:

adjusting a magnitude of a volume level of the audio media item of the first type from the first volume level to an adjusted volume based on a magnitude of a concurrent volume feature.

30. The method of claim 14, wherein the set of concurrent audio criteria includes a criterion that is satisfied when a determination is made that a magnitude of a second concurrent volume feature exceeds a threshold magnitude.

31. The method of claim 14, further comprising adjusting, based on contextual information, a magnitude of at least one of:

the background sounds volume feature for adjusting the volume level of the audio media item of the first type; and the concurrent volume feature for adjusting the volume level of the audio media item of the first type when the audio media item of the first type is concurrently played with the audio media item of the second type.

32. The method of claim 14, wherein playing the audio media item of the first type includes:

in accordance with a determination that the computer system is in a first context state, playing the audio media item of the first type with first audio content; and in accordance with a determination that the computer system is in a second context state, different from the first context state, playing the audio media item of the first type with second audio content, different than the first audio content.

33. The method of claim 14, wherein displaying the first user interface includes concurrently displaying:

the background sounds user-interactive graphical user interface object; and a first audio content user-interactive graphical user interface object that, when selected, causes display of a second user interface that includes:

a second audio content user-interactive graphical user interface object that, when selected, causes third audio content to be included in the audio media item of the first type during playback; and a third audio content user-interactive graphical user interface object that, when selected, causes fourth audio content, different from the third audio content, to be included in the audio media item of the first type during playback.

34. The method of claim 33, further comprising:

detecting, via the one or more input devices, a first input corresponding to the background sounds user-interactive graphical user interface object;

in response to detecting the first input, enabling playback of the audio media item of the first type when a determination is made that the set of playback criteria are met; and while the computer system is enabled to playback the audio media item of the first type when a determination is made that the set of playback criteria are met:

in accordance with a determination that the set of playback criteria are met, playing the audio media item of a first type.

35. The method of claim 33, further comprising:

while displaying the second user interface:

detecting, via the one or more input devices, a second input; and in response to detecting the second input:

in accordance with a determination that the second input corresponds to the second audio content user-interactive graphical user interface object, configuring the computer system to include the third audio content in the audio media item of the first type during playback; and in accordance with a determination that the second input corresponds to the third audio content user-interactive graphical user interface object, configuring the computer system to include the fourth audio content in the audio media item of the first type during playback.

36. The method of claim 14, wherein:

the first user interface includes a background sounds status indicator, a volume user-interactive graphical user interface object, and a background sounds enable user-interactive graphical user interface object;

the method further includes:

detecting, via the one or more input devices, a third input;

in accordance with a determination that the third input corresponds to a swipe gesture at a location corresponding to the volume user-interactive graphical user interface object, adjusting a volume level of the audio media item of the first type from a second initial volume to a second adjusted volume based on a direction and magnitude of the swipe gesture; and in accordance with a determination that the third input corresponds to a selection of the background sounds enable user-interactive graphical user interface object:

selectively activating a background sounds feature; and modifying a visual characteristic of the background sounds status indicator.

* * * * *

UNITED STATES PATENT AND TRADEMARK OFFICE
CERTIFICATE OF CORRECTION

PATENT NO. : 12,425,695 B2
APPLICATION NO. : 17/504174
DATED : September 23, 2025
INVENTOR(S) : Mitchell R. Lerner et al.

Page 1 of 1

It is certified that error appears in the above-identified patent and that said Letters Patent is hereby corrected as shown below:

In the Claims

In Column 64, Lines 2-3, Claim 13, delete "volume level of the audio media item of the first type; and" and insert -- volume level of an audio media item of a first type; and --, therefor.

In Column 64, Line 5, Claim 13, delete "level of a media item of a first type" and insert -- level of the audio media item of the first type --, therefor.

Signed and Sealed this
Eleventh Day of November, 2025

John A. Squires
*Director of the United States Patent and Trademark Office*